United States Patent
Ito et al.

(10) Patent No.: US 10,147,028 B2
(45) Date of Patent: Dec. 4, 2018

(54) METHOD AND APPARATUS FOR PRODUCING INFORMATION CODE HAVING AN IMAGE DISPLAY REGION WITH A CODE FIGURE

(71) Applicant: DENSO WAVE INCORPORATED, Chita-gun, Aichi-pref. (JP)

(72) Inventors: Kunihiko Ito, Chiryu (JP); Kenichi Yoshida, Obu (JP); Masami Tanaka, Handa (JP); Motoaki Watabe, Toyokawa (JP); Takuya Yoda, Obu (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 0 days.

(21) Appl. No.: 14/876,502

(22) Filed: Oct. 6, 2015

(65) Prior Publication Data

US 2016/0162767 A1    Jun. 9, 2016

(30) Foreign Application Priority Data

Oct. 7, 2014  (JP) ................................ 2014-206651
Sep. 29, 2015  (JP) ................................ 2015-191783

(51) Int. Cl.
*G06K 19/06*    (2006.01)

(52) U.S. Cl.
CPC . *G06K 19/06037* (2013.01); *G06K 19/06046* (2013.01); *G06K 19/06065* (2013.01)

(58) Field of Classification Search
CPC ............. G06K 19/06103; G06K 19/06; G06K 19/06009; G06K 19/06037;

(Continued)

(56) References Cited

U.S. PATENT DOCUMENTS 5,541,396 A    7/1996  Rentsch
6,655,579 B1    12/2003  Delman et al.
(Continued)

FOREIGN PATENT DOCUMENTS

EP    2 515 258 A1    10/2012
JP    2001-167222 A    6/2001
(Continued)

OTHER PUBLICATIONS

Machine translation of WO 2014098134 A1, retrieved Aug. 31, 2016 from European Patent Office online, https://worldwide.espacenet.com/publicationDetails/description?CC=WO&NR=2014098134A1&KC=A1&FT=D&ND=3&date=20140626&DB=EPODOC&locale=en_EP.*

(Continued)

*Primary Examiner* — Suezu Ellis
(74) *Attorney, Agent, or Firm* — Oliff PLC

(57) ABSTRACT

A method and an apparatus for generating an information code is provided. In a generation apparatus, after data to be interpreted and data of an image to be displayed are acquired, a code figure that is provided with an image display region is generated and displayed on a display unit. After the code figure is displayed on the display unit in this way, when information designating an arrangement content of the image display region is inputted, an information code is generated. Specifically, an information code is generated in a form in which the image display region is newly arranged based on the arrangement content designated by the input, and a specification pattern region and a region to be interpreted are provided in positions other than that of the image display region. The information code generated in this way is displayed on the display unit.

20 Claims, 42 Drawing Sheets

(58) Field of Classification Search
CPC ....... G06K 19/06046; G06K 19/06056; G06K 19/06131
See application file for complete search history.

(56) References Cited

U.S. PATENT DOCUMENTS

| | | | |
|---|---|---|---|
| 7,032,823 B2 | 4/2006 | Nojiri | |
| 7,412,106 B1 | 8/2008 | Nadabar et al. | |
| 7,950,589 B2 | 5/2011 | Oouchi | |
| 8,235,303 B2 | 8/2012 | Mizukoshi et al. | |
| 8,434,690 B2 | 5/2013 | Ushijima et al. | |
| 8,532,299 B2 | 9/2013 | Hara | |
| 8,807,435 B2 | 8/2014 | Cok | |
| 8,925,796 B2 | 1/2015 | Tsuji | |
| 8,978,989 B2 | 3/2015 | Friedman et al. | |
| 9,111,164 B1* | 8/2015 | Anderton | G06K 7/1443 |
| 9,165,230 B2 | 10/2015 | Itakura et al. | |
| 9,177,238 B2 | 11/2015 | Windmueller et al. | |
| 9,436,852 B2 | 9/2016 | Sakina et al. | |
| 2007/0086638 A1* | 4/2007 | Ackley | G06F 17/3002 382/132 |
| 2007/0138286 A1* | 6/2007 | Kamijoh | G06K 19/06037 235/462.04 |
| 2007/0277150 A1 | 11/2007 | Oouchi | |
| 2009/0242649 A1* | 10/2009 | Mizukoshi | G06K 19/06037 235/494 |
| 2009/0255992 A1 | 10/2009 | Shen | |
| 2010/0044446 A1 | 2/2010 | Shah | |
| 2010/0310161 A1 | 12/2010 | Horovitz et al. | |
| 2012/0048927 A1 | 3/2012 | Hasegawa | |
| 2012/0138695 A1 | 6/2012 | Mizukoshi et al. | |
| 2012/0210233 A1 | 8/2012 | Davis et al. | |
| 2012/0256000 A1 | 10/2012 | Cok | |
| 2013/0001296 A1 | 1/2013 | Tsuji | |
| 2013/0026241 A1* | 1/2013 | Sakahashi | G06K 19/06037 235/494 |
| 2013/0043302 A1 | 2/2013 | Powlen et al. | |
| 2013/0278699 A1* | 10/2013 | Yoshikoshi | B41J 2/355 347/107 |
| 2014/0119647 A1 | 5/2014 | Cheong et al. | |
| 2015/0186704 A1* | 7/2015 | Tsuji | G06K 19/06037 235/462.09 |
| 2015/0317955 A1* | 11/2015 | Tanaka | G06K 1/12 235/494 |
| 2015/0332136 A1* | 11/2015 | Nosaka | G06K 19/06037 235/494 |
| 2015/0347889 A1* | 12/2015 | Nosaka | G06K 1/12 726/7 |
| 2016/0019407 A1* | 1/2016 | Yoshida | G06K 7/1443 235/437 |
| 2016/0042262 A1* | 2/2016 | Tanaka | G06K 19/06037 235/494 |
| 2016/0078335 A1* | 3/2016 | Annamalai | G06K 19/06103 382/284 |
| 2016/0092760 A1* | 3/2016 | Tanaka | G06K 19/06037 235/494 |
| 2016/0189016 A1 | 6/2016 | Windmueller et al. | |

FOREIGN PATENT DOCUMENTS

| | | | | |
|---|---|---|---|---|
| JP | 2004-206674 A | 7/2004 | | |
| JP | 2007-241327 A | 9/2007 | | |
| JP | 2008-152334 A | 7/2008 | | |
| JP | 2009-129410 A | 6/2009 | | |
| JP | 2009-259192 A | 11/2009 | | |
| JP | 2012-027558 A | 2/2012 | | |
| JP | 2012-053697 A | 3/2012 | | |
| JP | 2012-164236 A | 8/2012 | | |
| JP | 5057560 B2 | 10/2012 | | |
| JP | WO 2014098134 A1 * | 6/2014 | ....... G06K 19/06103 | |
| JP | WO 2016031809 A1 * | 3/2016 | ............... G06K 7/10 | |
| WO | 2007/107533 A2 | 9/2007 | | |

OTHER PUBLICATIONS

Feb. 25, 2014 International Search Report issued in International Patent Application No. PCT/JP2013/083901.
Jul. 2, 2015 International Preliminary Report on Patentability issued in International Patent Application No. PCT/JP2013/083901.
"Information technology—automatic identification and data capture techniques—QR code 2005 bar code symbology specification" International Standard ISO/IEC 18004; Second Edition; Sep. 1, 2006; Annex M; pp. 109.
Oct. 28, 2015 Written Opinion issued in Singapore Patent Application No. 11201504870W.
Oct. 28, 2015 Search Report issued in Singapore Patent Application No. 11201504870W.
Aug. 15, 2016 Final Rejection issued in U.S. Appl. No. 14/654,207.
Jan. 6, 2016 Office Action issue in U.S. Appl. No. 14/654,207.
Feb. 25, 2014 International Search Report issued in International Patent Application No. PCT/JP2013/083904.
Jul. 2, 2015 International Preliminary Report on Patentability issued in International Patent Application No. PCT/JP2013/083904.

* cited by examiner

FIG.13

SELECT CANVAS SHAPE

SHAPE [ RECTANGLE ▼ ]

☐ CENTER   X [ 0 ]   Y [ 0 ]

☐ SIZE     W [ 26 ]  H [ 26 ]

☐ ROTATION    [ 0 ]

☐ PAIR SPACING [ 0 ]

FIG.14A

FIX Mode
MD =0

FIXED INFORMATION: MD (1) | CEN (1) | SZ (1) | ANG (1) | MASK NO. (4)

FIG.14B

FIX Mode
MD =0
POS/SZ/ANG = 1

FIXED INFORMATION: MD (1) | POS (1) | SZ (1) | ANG (1) | MASK NO. (4)

EXTENDED INFORMATION: CENTER POS (4) | SIZE (3) | ANGLE (2)

FIG.14C

USER Mode
MD =1

FIXED INFORMATION: MD (1) | POINT NUM (5)

EXTENDED INFORMATION: POINT 1 (6) | ... | POINT 32 (6)

FIG.15

| NAME | LENGTH (bit) | Canvas mode |
|---|---|---|
| MD | 0 | 0: Fix mode<br>1: Manual mode |
| CEN | 1 | 0: CENTER POS is not used.<br>1: CENTER POS is used. |
| SZ | 1 | 0: SIZE is not used.<br>1: SIZE is used. |
| ANG | 1 | 0: ANGLE is not used.<br>1: ANGLE is used. |
| MASK NO. | 4 | 0 : square<br>1 : triangle<br>2 : circle<br>3 : star<br>⋮<br>15: heart |
| CENTER POS | 4 | Specyfy CENTER POS coordinates. |
| SIZE | 3 | Specyfy MASK SIZE. |
| ANGLE | 2 | Specyfy ANGLE. (0 - 45 degrees) |

FIG.16

| NAME | LENGTH (bit) | Canvas mode |
|---|---|---|
| MD | 1 | 0 : Fix mode<br>1 : Manual mode |
| POIN NUM | 5 | Specfy CANVAS POLYGON. (3 - 31) |
| POS 1 | 6 | |
| POS 2 | 6 | |
| POS 3 | 6 | |
| ⋮ | ⋮ | ⋮ |
| POS 32 | 6 | |

FIG.20
(A) 
(B) 
(C) 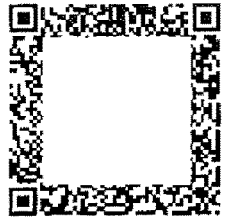
(D) 
(E) 
(F) 
(G) 
(H) 
(I) 
(J) 

FIG.21
(A) 
(B) 
(C) 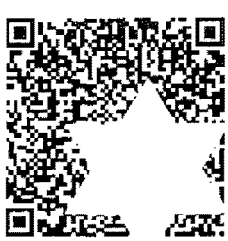
(D) 
(E) 
(F) 
(G) 
(H) 

FIG.22
(A) 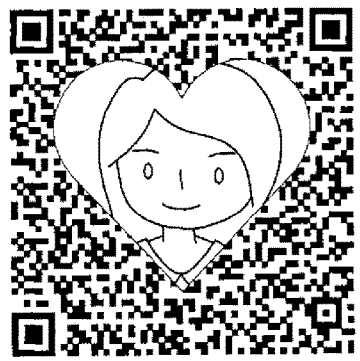
(B) 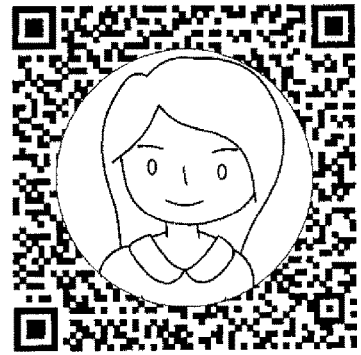
(C) 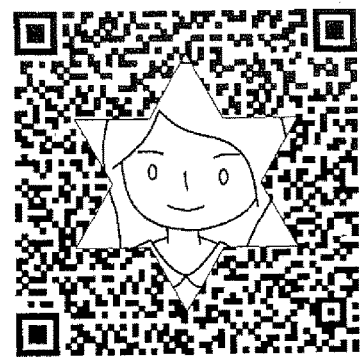
(D) 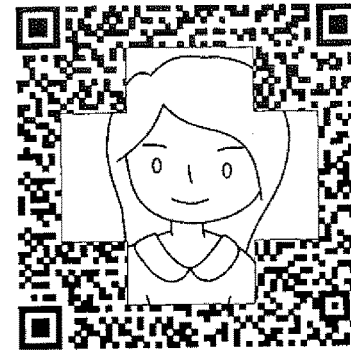
(E) 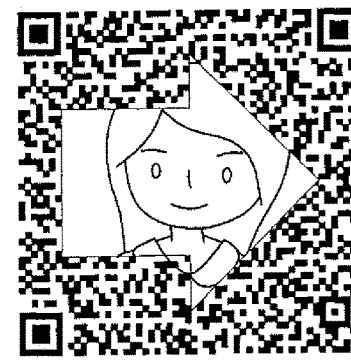
(F) 

FIG.25
(A) 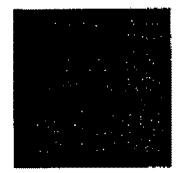
(B) 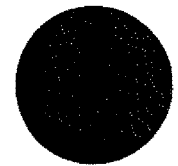
(C) 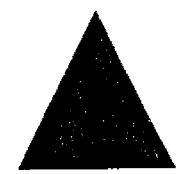
(D) 
(E) 

FIG.28
(A) 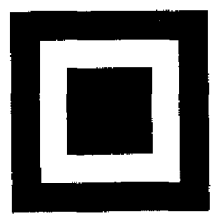
(B) 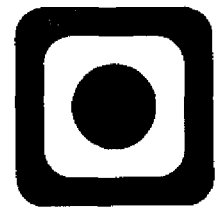
(C) 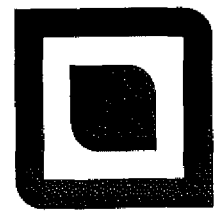
(D) 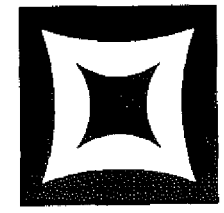
(E) 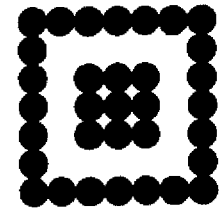
(F) 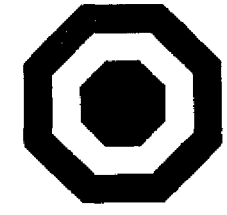
(G) 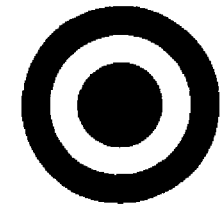

FIG.29
COLOR SETTING
BASIC COLORS(B)
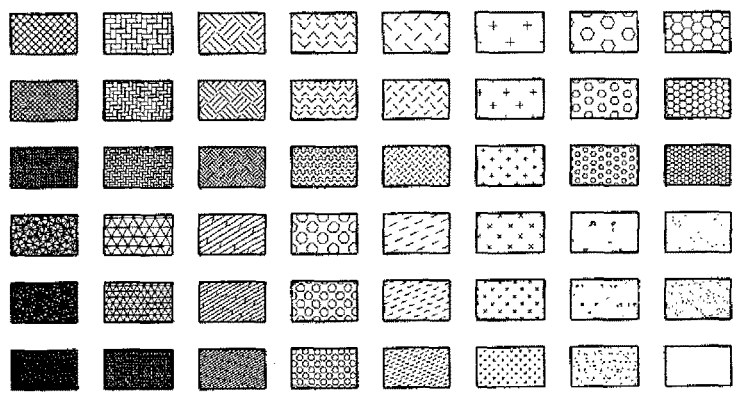
CUSTOM COLORS(C)
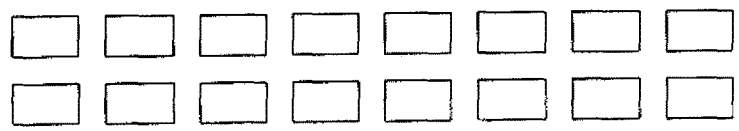
ADD CUSTOM COLOR(D) >>
OK   CANCEL

FIG.30

TRANSPARENCY LEVEL OPERATION

⦿ COLLECTIVELY [ 255 ]     ○ INDIVIDUALLY

COLOR/TRANSPARENCY LEVEL SETTING

|  | DARK CELLS | TRANSPARENCY LEVEL | LIGHT CELLS | TRANSPARENCY LEVEL |
|---|---|---|---|---|
| FP Cell | ▓ | 200 | ☐ | 200 |
| Data Cell | ▓ | 200 | ☐ | 200 |
| Canvas Edge | ☐ | 200 | | |

METHOD AND APPARATUS FOR PRODUCING INFORMATION CODE HAVING AN IMAGE DISPLAY REGION WITH A CODE FIGURE

CROSS-REFERENCE TO RELATED APPLICATIONS

This application is based on and claims the benefit of priority from earlier Japanese Patent Applications No. 2014-206651 filed on Oct. 7, 2014 and No. 2015-191783 filed on Sep. 29, 2015, the descriptions of which are incorporated herein by reference.

BACKGROUND

Technical Field

The present invention relates to a method and an apparatus for generating information codes, and in particular, to a method and an apparatus for generating a two-dimensional information code such as a QR code (registered trademark) in which an image is incorporated in the code region thereof.

Related Art

At present, uses of information codes have been diversified, and technologies of arranging a photograph or a graphic in a code region have been proposed. For example, the technology of JP 5057560 B obtains an inversely converted bit string by inverse transform of a bit string that forms a region read as a single value in a two-dimensional code, and generates a two-dimensional code by conversion of the inversely converted bit string, based on format information of two-dimensional code, thereby to generate a special two-dimensional code including a design region configured from a single gradation value.

In the technology of JP 5057560 B, when the design region is the special two-dimensional code configured from a white module, for example, the special two-dimensional code and given design data are composed such that a design configured from a gradation value in a range read as white is formed in the design region. Meanwhile, when the design region is the special two-dimensional code configured from a black module, for example, the special two-dimensional code and given design data are composed such that a design configured from a gradation value in a range read as a black is formed in the resign region.

[PTL 1] JP Patent No. 5057560

By the way, the existing technologies related to information codes lack an idea to freely insert an image at the time of generating a code, although there is a technology of expressing an image (a design or the like) different from a cell shape, in the code region, like JP 5057560 B. Therefore, while a design image or the like can be displayed in the code region, a size or a shape of a displayed image, an overall design of a final code, and the like may not be matched with requirements of a user, and in this regard, convenience of the user is impaired.

SUMMARY

Thus it is desired to provide a generation method, a generation apparatus, and a program, with which the user can freely set an image arrangement, in generating an information code into which an image different from cells is inserted.

In order to realize such a demand, various exemplary embodiments can be disclosed as follows.

According to a first exemplary embodiment, there is provided an information code generation method generating an information code in which cells that serve as units for displaying information are arrayed, using an information code generation apparatus that includes a display unit and an input unit. The method includes an image acquiring process for acquiring data of an image to be displayed that is an image differing from the cells; a data acquiring process for acquiring data to be interpreted; a figure display process for displaying, on a display unit, a code figure that is configured to be provided with an image display region that is a region in which at least a portion of the image to be displayed is presented; an input receiving process for receiving inputted information when, after the code figure is displayed on the display unit in the figure display process, information designating an arrangement content of the image display region is inputted through the input unit; a code generating process for generating an information code in a form in which the image display region is arranged based on the arrangement content received in the input receiving process, and a specification pattern region in which a specification pattern having a shape prescribed in advance is arranged and a region to be interpreted in which the data to be interpreted is recorded by a plurality of types of cells are provided in positions other than that of the image display region; and a code display process for displaying the information code generated in the code generating process on the display unit.

A second exemplary embodiment provides a program using an information code generation apparatus that includes a display unit and an input unit, and enabling the information code generation apparatus to generate an information code in which cells that serve as units for displaying information are arrayed. The program enables the information code generation apparatus to perform: an image acquiring step of acquiring data of an image to be displayed that is an image differing from the cells; a data acquiring step of acquiring data to be interpreted; a figure display step of displaying, on a display unit, a code figure that is configured to be provided with an image display region that is a region in which at least a portion of the image to be displayed is presented; an input receiving step of receiving inputted information when, after the code figure is displayed on the display unit at the figure display step, information designating an arrangement content of the image display region is inputted through the input unit; a code generating step of generating an information code in a form in which the image display region is arranged based on the arrangement content received at the input receiving step, and a specification pattern region in which a specification pattern having a shape prescribed in advance is arranged and a region to be interpreted in which the data to be interpreted is recorded by a plurality of types of cells are provided in positions other than that of the image display region; and a code display step of displaying the information code generated at the code generating step on the display unit.

A third exemplary embodiment provides an information code generation apparatus that includes a display unit and an input unit, and generates an information code in which cells that serve as units for displaying information are arrayed, the information code generation apparatus includes: an image acquiring unit that acquires data of an image to be displayed that is an image differing from the cells a data acquiring unit that acquires data to be interpreted; a figure display control unit that displays, on a display unit, a code figure that is configured to be provided with an image display region that is a region in which at least a portion of the image to be displayed is presented; an input receiving unit that receives inputted information when, after the code figure is displayed on the display unit by the figure display control unit, information designating an arrangement content of the image display region is inputted through the input unit; a code generating unit that generates an information code in a form in which the image display region is arranged based on the arrangement content received by the input receiving unit, and a specification pattern region in which a specification pattern having a shape prescribed in advance is arranged and a region to be interpreted in which the data to be interpreted is recorded by a plurality of types of cells are provided in positions other than that of the image display region; and a code display control unit that displays the information code generated by the code generating unit on the display unit.

In the first exemplary embodiment, a user can specify how to set the image display region after visually grasping an arrangement of the image display region, with the code graphic displayed in the graphic display process, and can generate an information code that reflects such specification in the subsequent code generation process. Therefore, the image display region can more easily become an arrangement that meets the user's requirements than a code generation method that determines the arrangement of the image display region in a single uniform way or randomly specifies the arrangement of the image display region. Therefore, an information code that accords with the user's requirements can be easily generated.

The above first exemplary embodiment can be developed into various other modifications.

In a first preferred mode, in the graphic display process, the code graphic is displayed in the display unit, the code graphic having a shape in which the specification pattern is provided in a predetermined position inside a code boundary portion, and the image display region is provided in a position different from the specification pattern. Then, in the code generation process, when the input to change the arrangement content of the image display region has been received in the input reception process, after the code graphic is displayed in the display unit in the graphic display process, an information code having a configuration in which a relative relationship between the specification pattern and the image display region in the code graphic is changed according to the arrangement content received in the input reception process is generated.

In this configuration, in generating the information code into which the image display region is inserted, first, the relative relationship between the specification pattern and the image display region can be visually grasped with the display of the code graphic, and then how to change the relative relationship can be specified. In this way, if the relative relationship of the image display region with respect to the graphic (specification pattern) can be changed by an input, after the relationship between the graphic (specification pattern) that serves as a rough indication and the image display region is displayed in advance, balance of the image display region in the entire code and balance of the image display region to the specification pattern can more easily accord with the user's requirements.

Another preferred mode includes the re-reception process, the regeneration process, and the re-display process. The re-reception process receives re-input information when a re-input of information is performed once or a plurality of times by the input unit, the information specifying the arrangement content of the image display region, after the information code generated in the code generation process is displayed in the display unit in the code display process. The regeneration process regenerates an information code in a manner that the image display region is provided in an arrangement according to at least the latest re-input information, and the specification pattern region and the region to be decoded are provided in positions other than the image display region, when the re-input information has been received once or a plurality of times in the re-reception process. The re-display process displays the generated information code in the display unit, when the information code that reflects the latest re-input information is generated in the regeneration process.

In this configuration, the arrangement of the image display region can be re-specified, after the arrangement of the image display region is specified and the information code is generated, and display of the generated information code is visually and specifically grasped. That is, the user can see the information code generated in a reflection of the requirements of the user, and can further modify the arrangement of the image display region. Therefore, a configuration that accords with the user's requirements can be easily obtained.

In another preferred mode, in the regeneration process, an information code is regenerated in a manner that the image display region is provided in an arrangement according to the received re-input information, and the specification pattern region and the region to be decoded are provided in the positions other than the image display region, every time the re-input information is received in the re-reception process. Then, in the re-display process, the regenerated information code is displayed in the display unit, every time the information code that reflects the re-input information is regenerated in the re-generation process.

In this configuration, the information code can be regenerated and re-displayed, every time the arrangement of the image display region is re-specified, after the information code is generated and displayed in a reflection of the requirements of the user. According to such a method, the user can provide an instruction again for more desirable arrangement after visually recognizing how the arrangement of the image display region has been changed according to each instruction, every time the instruction is given. If specific change instructions can be more appropriately performed as described above, an information code that further accords with the requirements of the user can be more smoothly and promptly generated.

In another preferred mode, in the graphic display process, the code graphic having a configuration in which the cells are arranged adjacent to an outer edge portion of the image display region is displayed. Then, in the code generation process, when input information that changes at least either a shape or a size of the outer edge portion of the image display region has been received in the input reception process, after the code graphic is displayed in the graphic display process, an information code is generated in a configuration in which the image display region is provided in a new arrangement according to at least either the shape or the size received in the input reception process, and the cells are arranged adjacent to the outer edge portion of the new image display region.

In this configuration, in generating the information code in which the cells are arranged adjacent to the outer edge portion of the image display region, the user can newly specify at least either the shape or the size of the outer edge portion of the image display region after visually grasping the image display region and its peripheral cell array, with the code graphic displayed in the graphic display process. Therefore, the arrangement of the image display region (especially, the size and the shape of the outer edge portion of the image display region) and the shape and the size of an inner edge portion of the cell array that surrounds the image display region, in the generated information code, can easily accord with the requirements of the user.

In another preferred mode, in the graphic display process, the code graphic having a configuration in which the cells are arranged adjacent to the outer edge portion of the image display region. Then, in the code generation process, when input information that changes a position of the outer edge portion of the image display region has been received in the input reception process, after the code graphic is displayed in the display unit in the graphic display process, an information code is generated in a configuration in which the image display region is provided in a new arrangement according to the position received in the input reception process, and the cells are arranged adjacent to the outer edge portion of the new image display region.

In this configuration, in generating the information code in which the cells are arranged adjacent to the outer edge portion of the image display region, the user can newly specify the position of the outer edge portion of the image display region after visually grasping the image display region and its peripheral cell array, with the code graphic displayed in the graphic display process. Therefore, the arrangement of the image display region (especially, the position of the outer edge portion of the image display region) and the position of the inner edge portion of the cell array that surrounds the image display region, in the generated information code, can easily accord with the requirements of the user.

In another preferred mode, in the graphic display process, the code graphic having a configuration in which the cells are arranged adjacent to the outer edge portion of the image display region is displayed. Then, in the code generation process, when input information that changes a rotation posture of the outer edge portion of the image display region has been received in the input reception process, after the code graphic is displayed in the display unit in the graphic display process, an information code is generated in a configuration in which the image display region is provided in a new arrangement according to the rotation posture received in the input reception process, and the cells are arranged adjacent to the outer edge portion of the new image display region.

In this configuration, in generating the information code in which the cells are arranged adjacent to the outer edge portion of the image display region, the user can newly specify the rotation posture of the outer edge portion of the image display region after visually grasping the image display region and its peripheral cell array, with the code graphic displayed in the graphic display process. Therefore, the arrangement of the image display region (especially, the rotation posture of the outer edge portion of the image display region) and the rotation posture of the inner edge portion of the cell array that surrounds the image display region, in the generated information code, can easily accord with the requirements of the user.

In another preferred mode, in the graphic display process, when data of a plurality of the images to be displayed has been acquired in the image acquisition process, the code graphic having a configuration in which the image display regions partially displaying at least the plurality of respective images to be displayed are provided is made displayable in the display unit. Then, in the code generation process, when an input that specifies a relative relationship among the plurality of image display regions has been received in the input reception process, after the code graphic is displayed in the display unit in the graphic display process, an information code having a configuration in which the relative relationship among the plurality of image display regions is determined in accordance with the relative relationship received in the input reception process.

According to this configuration, a characteristic information code that includes a plurality of image display regions can be generated. Furthermore, the relative relationship among the plurality of image display regions can be easily determined to a relationship that accords with the requirements of the user, in the information code.

In another preferred mode, in the graphic display process, a basic graphic is arranged, in which the specification pattern region, a cell array region in which a plurality of types of the cells are arrayed in positions other than the specification pattern region, and a free space different from the specification pattern region and the cell array region are provided, and the code graphic is displayed in the display unit, the code graphic being obtained by superimposing the basic graphic and the image to be displayed such that at least a part of the image to be displayed is included in the free space, and an outer edge portion of the free space becomes the outer edge portion of the image display region. Then, in the code generation process, when an input to change the outer edge portion of the free space has been made in the input reception process, after the code graphic that includes the image display region is displayed in the display unit in the graphic display process, an information code having a configuration in which a relative relationship between the image to be displayed and the free space in the code graphic is changed according to the arrangement content received in the input reception process is generated.

According to this configuration, a characteristic information code in which a part of the code is made to a free space can be generated. Then, in generating such a characteristic information code, the user can newly specify the outer edge portion of the free space (image display region) after visually grasping the free space (image display region) and its peripheral cell array, with the code graphic displayed in the graphic display process. Therefore, the relative relationship between the image to be displayed and the free space can easily be made to accord with requirements from the user.

In another preferred mode, in the figure display process, the code figure is displayed on the display unit such that, after the image to be displayed is displayed on the display unit, the basic figure is displayed such as to overlap the image to be displayed that is displayed on the display unit.

According to this configuration, it becomes easier to compare an object image on which the basic figure is overlapped with the object image on which the basic figure is not overlapped. Hence a relative spatial relationship between the object image and a free space can easily be made to accord with user's requests.

In another preferred mode, in the graphic display process, the code graphic having a configuration in which the specification pattern region, a data recording region in which the data to be decoded is recorded with a plurality of types of the cells, and a free space different from the specification pattern region and the data recording region are provided, and the image display region having the predetermined outer edge shape is provided in the free space is displayed in the display unit. Then, in the code generation process, when an input to specify arrangement content of the image display region in the free space has been made in the input reception process, after the code graphic is displayed in the display unit in the graphic display process, an information code having a configuration in which the arrangement of the image display region in the free space is changed according to the arrangement content received in the input reception process, and the plurality of types of cells is arrayed in positions other than the image display region after the change in the free space is generated.

In this method, a characteristic information code in which a part of the code is made into a free space can be generated. Then, in generating such a characteristic information code, the user can newly specify the arrangement of the image display region after visually recognizing the arrangement of the image to be displayed having the predetermined outer edge shape in the free space. Therefore, the arrangement of the image display region (for example, balance of the predetermined outer edge shape in the free space) an easily be made in accordance with the requirements of the user in the generated information code.

In another preferred mode, in the figure display process, the code figure is displayed on the display unit, the code figure being configured such that the specification pattern region, a data recording region in which the data to be interpreted is recorded by a plurality of types of cells, and a free space that differs from the specification pattern region and the data recording region are provided, and the image display region having the predetermined outer edge shape is provided within the free space. After the code figure is displayed on the display unit in the figure display process, when an input to designate the arrangement content of the image display region is inputted in the input receiving process, in the code generating process, an information code is generated that has a configuration in which the arrangement of the image display region within the free space is changed based on the arrangement content received in the input receiving process and a plurality of types of cells are arrayed in positions in the free space other than that of the image display region after the change.

Hence, by this configuration, it is possible to generate an information code characteristic of having the code region with a free space therein. When generating this distinguishing information code, it is possible to visually recognize arrangement of an object image being displayed in the free space, where the object image has a predetermined outer edge shape. After this recognition, an image display region for the image can be specified newly. As a result, the arrangement of the image display region (for example, balance of the predetermined outer edge shape in the free space) can easily be made in accordance with the requirements of the user in the generated information code.

In another preferred mode, in the code generation process, when degree of transparency identifying information, which specifies the degree of transparency, has been input by the input unit, after the code graphic is displayed in the display unit in the graphic display process, an information code is generated in a configuration in which the degree of transparency of at least one of the specification pattern arranged around the image display region and the cell other than the specification pattern is made to be the degree of transparency specified in the degree of transparency identifying information.

According to this method, the degree of transparency of at least one of the specification pattern or the cell other than the specification pattern can easily accord with the requirements of the user. Especially, the user can set the degree of transparency of the specification pattern or the cell other than the specification pattern after visually grasping a state of the image display region, with the code graphic displayed in the graphic display process. Therefore, balance between the image display region and the degree of transparency of the periphery can easily accord with the requirements of the user in the generated information code.

In another preferred mode, in the code generation process, when the degree of transparency identifying information that specifies the degree of transparency of any position has been input by the input unit, after the code graphic is displayed in the display unit in the graphic display process, an information code is generated in a configuration in which the degree of transparency of the position specified in the degree of transparency identifying information in the periphery of the image display region is made to be the degree of transparency specified in the degree of transparency identifying information.

According to this method, the user can specify a position and set the degree of transparency of the position. Therefore, the degree of freedom of the user in setting the degree of transparency becomes large, and an information code that accords with the requirements of the user can be easily generated.

In another preferred mode, in the code generation process, when color identifying information that specifies a color of the cell in any position has been input by the input unit, after the code graphic is displayed in the display unit in the graphic display process, an information code is generated in a configuration in which the color of the cell in the position specified in the color identifying information in the periphery of the image display region is made to be the color specified in the color identifying information.

In this method, the user can specify the position and set the color of the cell of the position. Especially, the user can set a pattern or a color of the periphery of the image display region in detail after visually grasping a state of the image display region, with the code graphic displayed in the graphic display process. Therefore, balance of the image display region, and the pattern and the color of the periphery can easily accord with the requirements of the user.

In another preferred mode, in the code generation process, when shape identifying information that specifies a shape of the cell has been input by the input unit, after the code graphic is displayed in the display unit in the graphic display process, an information code is generated in a configuration in which the shape of the cell arrayed in the periphery of the image display region is made to be the shape specified in the shape identifying information.

According to this method, the shape of the cell arrayed in the periphery of the image display region can easily accord with the requirements of the user. Especially, the user can set the shape of the cell in the periphery of the image display region after visually grasping a state of the image display region, with the code graphic displayed in the graphic display process. Therefore, balance of the image display region, and the pattern and the color of the periphery can easily accord with the requirements of the user.

In another preferred mode, in the code generation process, when design identifying information that specifies at least one of a shape, a pattern, and a color of the specification pattern has been input by the input unit, after the code graphic is displayed in the display unit in the graphic display process, an information code is generated in a configuration in which the design of the specification pattern region is made to be the design specified in the design identifying information.

According to this method, the design of the specification pattern region can easily accord with the requirements of the user. Especially, the user can set the design of the specification pattern after visually grasping a state of the image display region, with the code graphic displayed in the graphic display process. Therefore, the design of the entire code including the image display region and the specification pattern can easily accord with the requirements of the user.

According to the foregoing second exemplary embodiment, a program that exerts similar and advantageous effects to the first exemplary embodiment can be realized.

According to the foregoing third exemplary embodiment, a generation apparatus that exerts similar and advantageous effects to the first exemplary embodiment can be realized.

BRIEF DESCRIPTION OF DRAWINGS

In the accompanying drawings:

FIG. 13 is an explanatory diagram for describing an example of specifying a shape, a center position, a size, a rotation posture, and a relative relationship of an image display region in generating the information code by the information code generation apparatus according to the first embodiment;

FIG. 14A is an explanatory diagram for describing a configuration of a part (fixed information) of format information in the information code generated in the information code generation apparatus according to the first embodiment;

FIG. 14B is an explanatory diagram for describing an example of fixed information different from FIG. 14A;

FIG. 14C is an explanatory diagram for describing an example of fixed information different from FIGS. 14A and 14B;

FIG. 15 is an explanatory diagram conceptually describing a configuration of position data of when a specific position of a free space is identified in a fix mode;

FIG. 16 is an explanatory diagram conceptually describing a configuration of position data of when a specific position of a free space is specified in a user mode (manual mode);

FIG. 20 is an explanatory diagram conceptually describing examples of shape candidates of the free space in the fix mode;

FIG. 21 is an explanatory diagram conceptually describing examples in which the basic shape of the free space is rotated and arranged;

FIG. 22 is an explanatory diagram illustrating examples of image display regions having different outer edge shapes;

FIG. 25 is an explanatory diagram illustrating examples of cells having different shapes;

FIG. 28 is an explanatory diagram illustrating examples of position detection patterns having different designs;

FIG. 29 is an explanatory diagram illustrating an example of selective colors;

FIG. 30 is an explanatory diagram exemplarily illustrating a specific setting method about the degree of transparency and a color;

FIG. 35A is a diagram illustrating a state in which a free space is made blank, and FIG. 35B is a diagram illustrating a state in which a design is attached to the free space;

FIG. 36A is a diagram illustrating a state in which a free space is made blank, and FIG. 36B is a diagram illustrating a state in which a design is attached to the free space;

DETAILED DESCRIPTION OF THE PREFERRED EMBODIMENTS

First Embodiment

Hereinafter, a first embodiment that embodies the present invention will be described with reference to the drawings.

Figure 1:
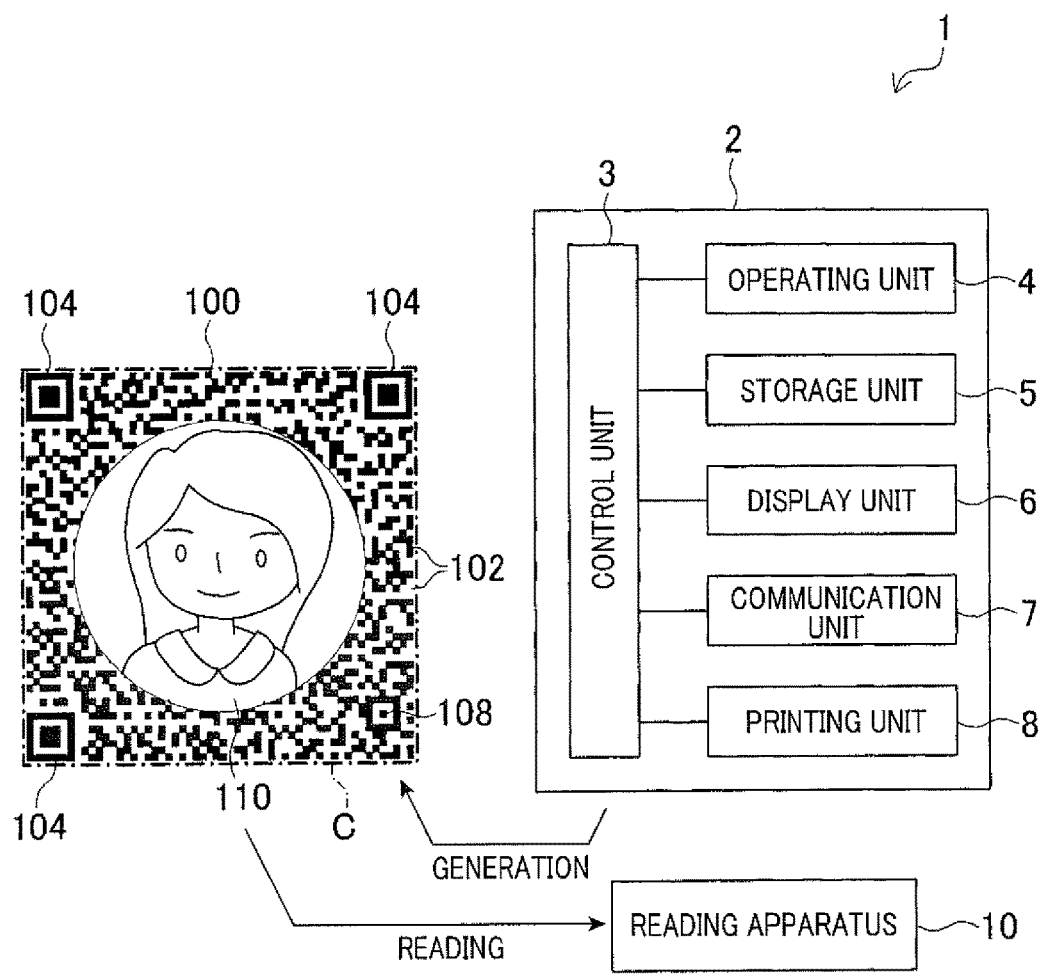
FIG. 1 is a schematic diagram exemplarily illustrating an information code usage system including an information code generation apparatus according to a first embodiment.

An information code usage system 1 illustrated in FIG. 1 has a configuration that includes an information code generation (or production) apparatus 2 and an information code reading apparatus 10. The information code generation (or production) apparatus 2 generates (or produces) an information code 100 in which cells are arrayed, the cell serving as a unit of displaying information. The information code reading apparatus 10 reads the information code 100 generated (or produced) by the information code generation (or production) apparatus 2.

(Information Code Generation Apparatus)

The information code generation apparatus 2 includes, for example, a control unit 3, an operating unit 4, a storage unit 5, a display unit 6, a communication unit 7, and a printing unit 8 (printer). The control unit 3 is configured from a mobile-type information processing device (a smart phone, a mobile phone, a tablet terminal, or another mobile-type information device), or a stationary-type information processing device such as a personal computer, and is made of a CPU (central processing unit) and the like. The operating unit 4 is made of known input means (a touch panel, a keyboard, a mouse, and another input unit), and the like.

The storage unit 5 is made of known storage means (for example, storage units such as a ROM (read-only memory), a RAM (random access memory, functioning as a non-transitory computer readable medium), and a non-volatile memory), and the like. The display unit 6 is made of known display means (a liquid crystal display and another display unit), and the like. The communication unit 7 functions as known communication means (a communication interface for performing wired communication or wireless communication with an external device, for example). The printing unit 8 is made of a hardware configuration similar to a known printer or the like, and can print the information code 100 and the like, based on print data from the control unit 3. Note that the printing unit 8 may be provided inside the generation apparatus 2, or may be configured from an external device that can perform communication with the generation apparatus 2.

(Information Code Reading Apparatus)

Figure 2:
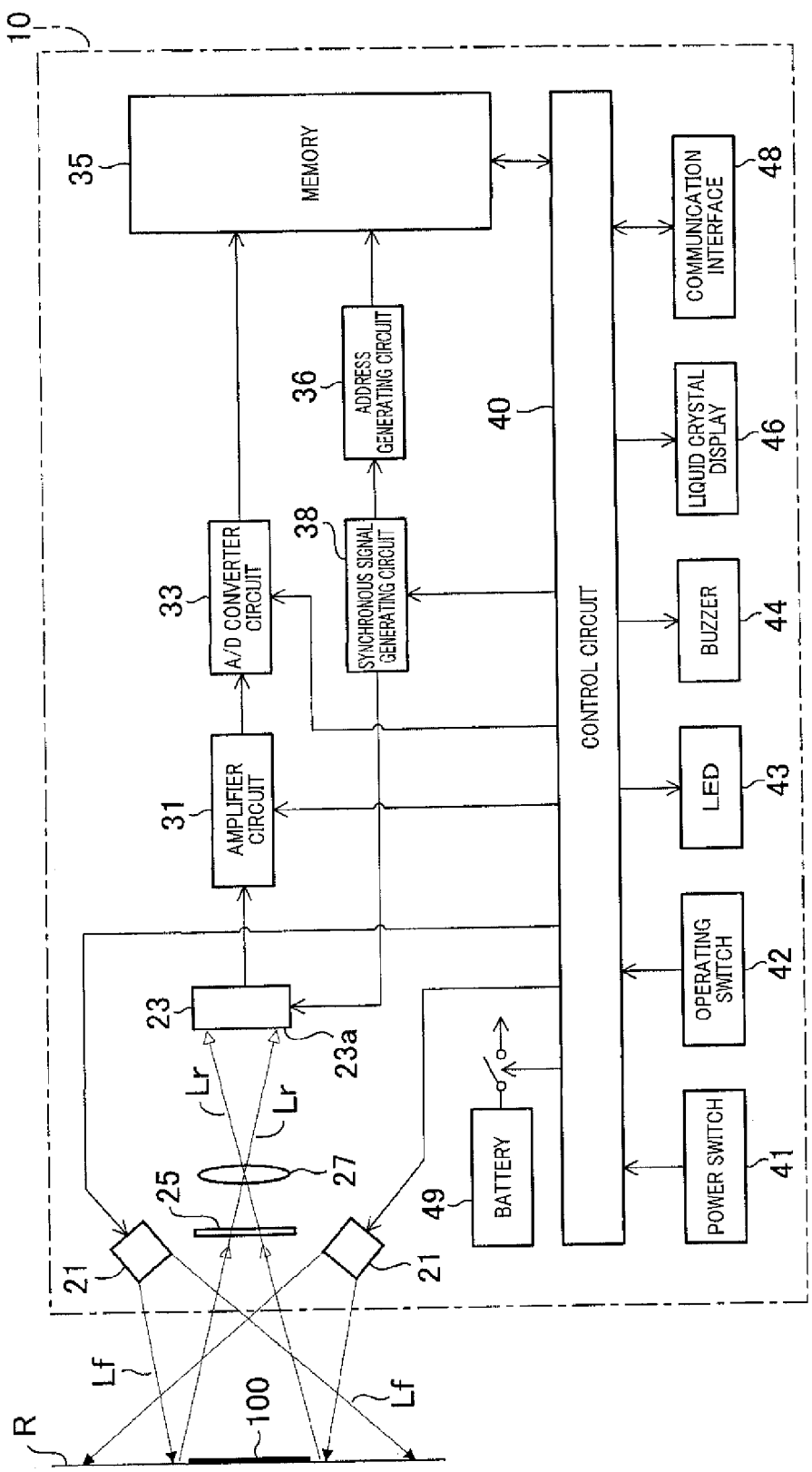
FIG. 2 is a block diagram exemplarily illustrating an electrical configuration of an information code reading apparatus that configures the information code usage system of FIG. 1.

Next, an overall configuration of the information code reading apparatus 10 will be described. As illustrated in FIG. 2, the information code reading apparatus 10 is configured from a code reader that can read a two-dimensional code in terms of hardware, and has a configuration in which a contour is configured from a case (not illustrated), and various electronic components are housed in the case.

The information code reading apparatus 10 is mainly configured from an optical system such as illumination light sources 21, a light-receiving sensor 23, a filter 25, and a imaging lens 27; a microcomputer system such as a memory 35, a control circuit 40, an operation switch 42, and a liquid crystal display unit 46; and a power source system such as a power source switch 41 and a battery 49. Note that these configuration systems are mounted on a printed wiring board (not illustrated) or in a case (not illustrated).

The optical system is configured from the illumination light sources 21, the light-receiving sensor 23, the filter 25, the imaging lens 27, and the like. The illumination light sources 21 function as illumination light sources that can emit illumination light Lf, and are configured from a red LED, a diffusion lens provided at an emission side of the LED, a condensing lens, and the like. In the present configuration, the illumination light sources 21 are provided at both sides across the light-receiving sensor 23, for example, and are configured to be able to irradiate an object to be read R with the illumination light Lf through a read port (not illustrated) formed in the case. As the object to be read R, for example, various objects such as a resin material, a metal material, a paper material, a display unit can be considered. In such an object to be read R, the information code 100 (described below) like FIG. 1 may be formed by means of printing or direct marking, or may be displayed by image display or the like.

The light-receiving sensor 23 corresponds to an example of an "imaging unit" that can image the information code 100 (described below), and is configured to be able to receive reflection light Lr irradiated on and reflected at the object to be read R and the information code 100. For example, an area sensor in which light-receiving elements that are solid-state imaging elements are two-dimensionally arrayed, such as a C-MOS or a CCD, corresponds to the light-receiving sensor 23. The light-receiving sensor 23 is mounted on a printed wiring board (not illustrated) in a manner of being able to receive incident light incident through the imaging lens 27 with a light-receiving surface 23a.

The filter 25 is configured from an optical low-pass filter that can allow passage of light of a wavelength equivalent to or less than the reflection light Lr, and can cut off passage of light of a wavelength exceeding the wavelength equivalent to the reflection light Lr. The filter 25 is provided between the read port (not illustrated) formed in the case and the imaging lens 27. Such a filter 25 suppresses incidence of unnecessary light with a wavelength exceeding the wavelength equivalent to the reflection light Lr on the light-receiving sensor 23. Further, the imaging lens 27 is configured from a lens-barrel and a plurality of condensing lenses housed in the lens-barrel. In the present configuration, the imaging lens 27 is configured to condense the reflection light Lr incident on the read port (not illustrated) formed in the case, and to form a code image of the information code 100 on the light-receiving surface 23a of the light-receiving sensor 23.

The microcomputer system is configured from an amplifier circuit 31, an A/D conversion circuit 33, a memory 35, an address generation circuit 36, a synchronization signal generation circuit 38, a control circuit 40, an operation switch 42, an LED 43, a buzzer 44, a liquid crystal display 46, a communication interface 48, and the like. The microcomputer system is mainly configured from the control circuit 40 that can function as a microcomputer (information processing device) and the memory 35, and can perform image processing of an image signal of the information code 100 imaged by the above-described optical system in hardware and software manners.

The image signal (analog signal) output from the light-receiving sensor 23 of the optical system is amplified with a predetermined gain by being input to the amplifier circuit 31, is then input to the A/D conversion circuit 33, and is converted from the analog signal into a digital signal. Then, the digitized image signal, that is, image data (image information) is input to the memory 35, and is accumulated in an image data accumulation region of the memory 35. Note that the synchronization signal generation circuit 38 is configured to be able to generate a synchronization signal to the light-receiving sensor 23 and the address generation circuit 36, and the address generation circuit 36 is configured to be able to generate a storage address of the image data to be stored in the memory 35, based on the synchronization signal supplied from the synchronization signal generation circuit 38.

The memory 35 is configured from known storage means, and a ROM, a RAM, a non-volatile memory, another storage unit, and the like correspond to the memory 35. The RAM of the memory 35 is configured to be able to secure a work region and a read condition table used by the control circuit 40 at the time of processing such as arithmetic and logical operations, in addition to the above-described image data accumulation region. Further, in the ROM, a predetermined program that can execute read processing described below and the like, and system programs that can control the hardware such as the illumination light source 21 and the light-receiving sensor 23 are stored in advance.

The control circuit 40 is configured as a microcomputer that can control the entire information code reading apparatus 10. The control circuit 40 is made of a CPU, a system bus, an input/output interface, and the like, and has an information processing function. Various input/output units (peripheral devices) are connected to the control circuit 40 through the built-in input/output interface, and in the case of the present configuration, the power source switch 41, the operation switch 42, the LED 43, the buzzer 44, the liquid crystal display 46, the communication interface 48, and the like are connected. Note that the communication interface 48 functions as a known communication interface for performing wired or wireless communication with an external device, and both the control circuit 40 and the communication interface 48 function as a communication unit in cooperation with each other 48, so that the reading apparatus 10 and the external device can perform mutual communication.

The power source system is configured from the power source switch 41, the battery 49, and the like. Conduction and cutoff of a drive voltage supplied from the battery 49 to/from the above-described units and circuits are controlled by ON/OFF of the power source switch 41 managed by the control circuit 40. Note that the battery 49 is configured as a secondary battery that can generate a predetermined direct current voltage, and for example, a lithium ion battery or the like corresponds to the battery 49. Note that, here, an example in which the reading apparatus 10 is configured as a mobile terminal that is driven by the battery 49 has been described. However, the reading apparatus 10 may be configured as a stationary-type reading device.

(Information Code)

Figure 5:
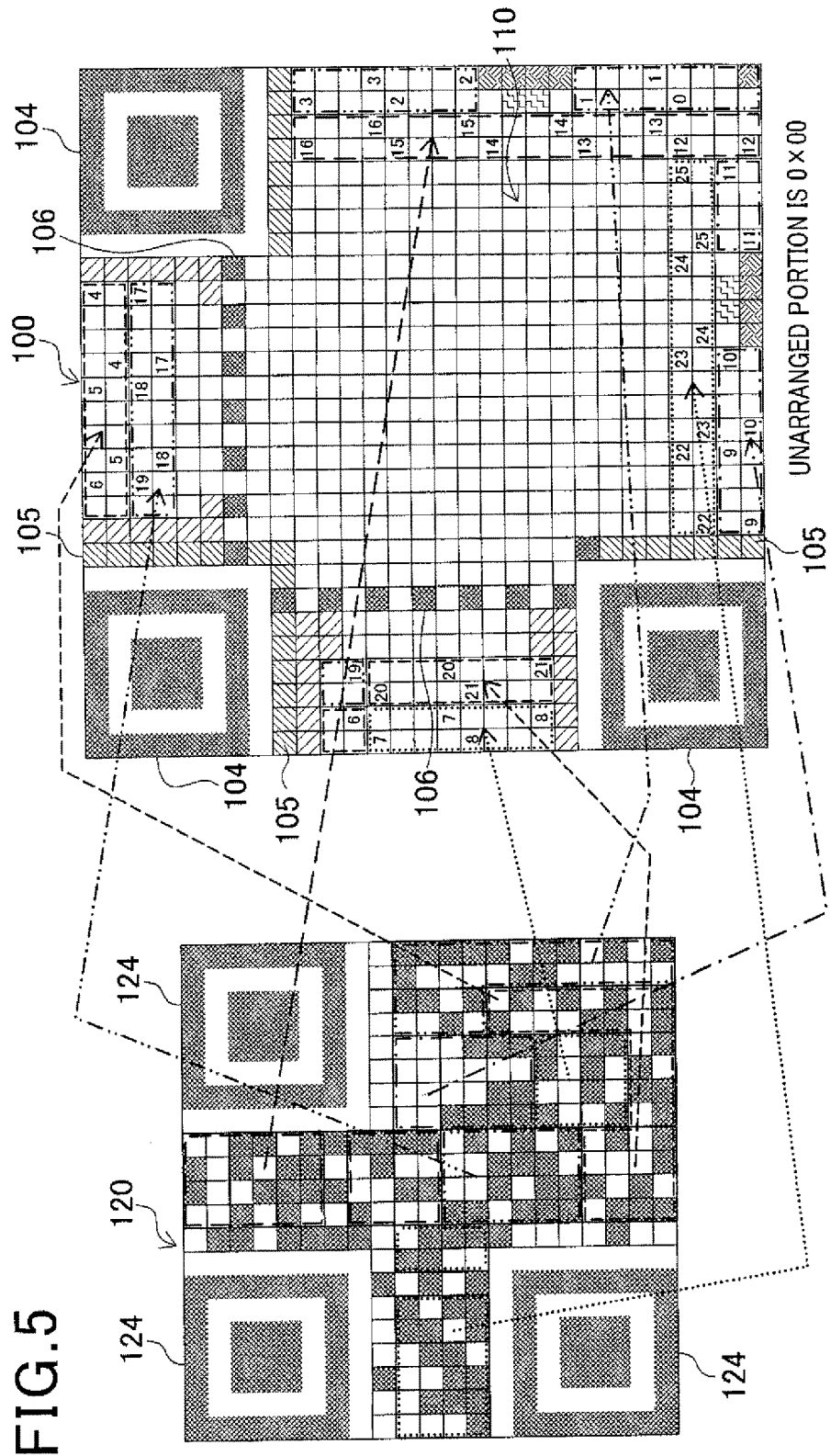
FIG. 5 is an explanatory diagram for describing a correspondence relationship between an arrangement of data words in the information code generated in the information code generation apparatus according to the first embodiment, and an arrangement of data words in another type of code.

With reference to FIGS. 1, 5, and other drawings, an information code 100 used in the information code usage system which uses the information code will now be described. Two codes exemplified in FIGS. 1 and 5 are configured based on the same basic scheme for configuring the codes and have similar characteristics, although arrangement of cells and the sizes of specification patterns are different from each other in the two codes. An information code 100 shown in FIGS. 1, 5 and other drawings is produced by the foregoing information code generating apparatus 2, for example, and has a predetermined code region in which cells 102, each corresponding to a unit for displaying pieces of information, are arranged. In the information code 100 shown in FIGS. 1, 5 and other drawings, the "code region" is a rectangular region which can contain all of a plurality of dark cells, and practically, is a minimum square or rectangular region which contains all of three position detecting patterns (finder patterns) 104.

In the example shown in FIG. 1, the outer edge (boundary) of the code region of the information code 100 is conceptually shown by using a chain line C. additionally, in the example shown in FIGS. 1, 5 and others, each of the plurality of cells 102 is composed of either a light colored (e.g., white) or a dark colored (e.g., black) which is rectangular in shape (for example, a square in its outer contour).

Inside the code ration, those cells 102 are arranged in a matrix form around a free space 110 (referred as a canvas region). In addition, in the information code 100, there is provided a light colored or dark colored margin region so as to surround the code region, i.e., so as to enclose the outer edge of the code region (the rectangular region enclosed by the chain line C in FIG. 1). The light colored margin region is formed outside the code region, but adjacently thereto, in the example shown in FIGS. 1, 5 and others.

The information code 100 has the code region whose outer edge (shown by the boundary C in FIG. 1) presents a rectangle (e.g., a square or an oblong). Inside the code region, there are provided specification pattern regions, data recording region, and error correction code recording regions. Predetermined-shape specification patterns are arranged in the specification pattern regions, data are recorded by the plurality of types of cells 102 in the data recording region, and error correction codes are recorded by the plurality of types of cells 102 in the error correction code recording region.

As illustrated in FIGS. 1, 5 and others, the specification patterns of the information code 100 can be provided as being the same in their shapes and positions as specification patterns defined by a known predetermined version of a QR code (registered trademark) (in the example shown in FIG. 5, a predetermined version of a QR code standardized by JIS or other rules). Hence, in the example show in FIGS. 1 and 5, a position detection pattern 104 serving as a specification pattern is arranged at each of three corners of the code region. An alignment pattern, which is also one of the specification patterns, is mapped at a predetermined position of the code region.

In this way, at the predetermined positions in the code region of the information code 100, there are arranged the fixed-shaped specification patterns (i.e., the position detecting patterns 104 and alignment patterns 108 (omitted from FIG. 5). The specification pattern regions are composed of regions in which, for example, light colored and dark colored cells are arranged to represent a fixed pattern (a fixed figure) larger in size than the unit cell. In this configuration, by way of example, a plurality of versions for information codes are previously arranged. Hence, when information codes having the same version are provided, the number of rows and the number of columns are the same as those among the information codes, and the same specification pattern regions are arranged at the same positions in each of those information codes, but the data recording region, the error correction code recording region, and the free space (i.e., the canvas region) are different from each other among the information codes The reader 10 may use many methods to interpret the number of rows and the number of columns, which are composed of cells, of the information code 100, the shapes and positions of the specification patterns, the position of format information, candidate positions of code words (i.e., addresses specifying the arrangement order of code words), and others. For example, a plurality of versions may be set depending on types of the information code 100, where, for each of the versions, the number of rows of cells and the number of columns of cells, the shapes and positions of the specification patterns, the positions of format information, and candidate positions (addresses) of code words may be predetermined.

When version information is arranged at predetermined positions (reserved regions) in the code region, the reader 10 can read the version information at the predetermined positions. Based on this version information, the reader 10 can understand the number of rows of cells and the number of columns of cells, the shapes and positions of the specification patterns, the position of the format information, the candidate positions (addresses) of code words in the information code 100. The reader 10 may use an alternative approach to understand the foregoing pieces of information.

In addition, inside the code region, a free space 110 (i.e., a canvas region) is formed to have a size larger than the size of the single cell 102. This free space 110 is located at a region other than the specification pattern regions, data recording region, and error correction code recording regions. In the free space 110, the cells 102, which show data, are not mapped. The error correction performed based on error correction codes is not applied to the free space 110. In the examples shown in FIGS. 1, 5, etc., the data recording region and the error correction code recording region are set around the edge of the code region in an annular and rectangular form, and the free space 110 is located in a central portion of the code region. How to arrange the free space 110 will be detailed later.

In the following, a representative example will be explained in which, i) in the type (frame QR) of the information code shown in FIG. 5, a code configuration assigned to a predetermined version drawn as the right figure in FIG. 5 is made to correspond to a code configuration assigned to a further version (i.e., version number) of a QR code smaller in size than the predetermined version as the left figure in FIG. 5, and ii) the positions of respective code words of the information code 100 drawn on the right side of FIG. 5 are made to correspond to the positions of respective code words of another type of code 120 drawn on the left side of FIG. 5 by an arrangement conversion table shown in the lower part of FIG. 5.

In this example, as long as an amount of data can be stored in the other type of code 120 shown on the left side in FIG. 5, such data can expressed in a region which remains after formation of the free space 110 the information code 100 on the right side in FIG. 5. When the information code 100 on the right side of FIG. 5 is read, the code words of this information code 100 can be read such that they are code words of the other type of code 120 on the left side in FIG. 5.

On the right figure in FIG. 5, the regions of the respective code words, which are mapped around the free space 110, are conceptually shown by dashed line frames. Regions in which the format information (i.e., the cells at the predetermined positions 105) are conceptually shown by a predetermined type of hatched lines. The regions in which the format information or the code words are recorded are shown by only squares, omitting practical cell arrangements from being drawn. In addition, although the example shown on the right side in FIG. 5 provides the free space 110 located in the central part of the code region and shown by a grid drawn therein to be matched with cell arrangements, the free space 110 can be configured freely. As shown in FIG. 1, a picture or a design can be added to the free space and a symbol or a pattern may be added. In the present specification, the free space is also referred to as a canvas region as well. Additionally, the information code provided with the free space is also referred to as a frame QR.

Figure 6:
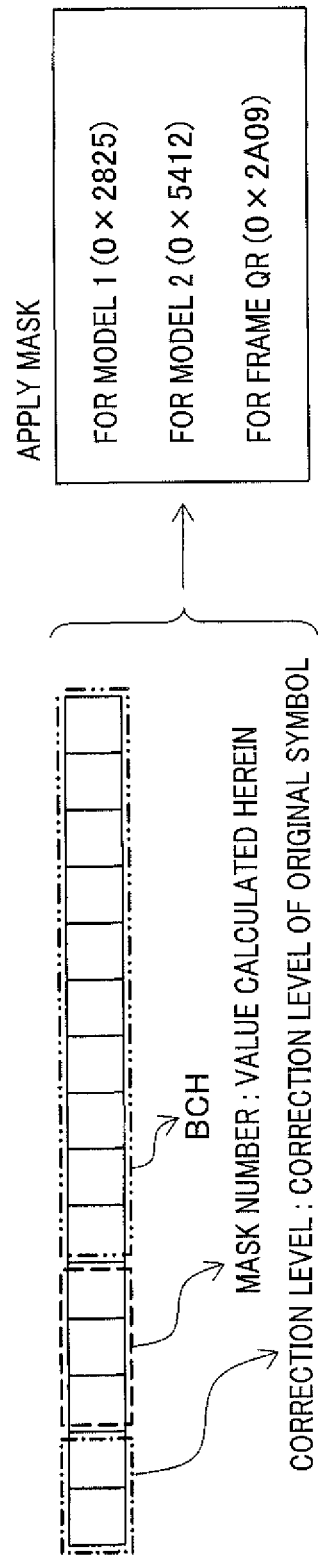
FIG. 6 is an explanatory diagram conceptually describing format data of the information code generated in the information code generation apparatus according to the first embodiment.

The format information (type information) is configured as shown in FIG. 6 for example, and recorded at the predetermined positions 105 (portions with a predetermined type of hatched lines) in the information code 100. This recording is performed on a specified format configuration. The predetermined positions 105 correspond to one example of fixed regions whose positions are previously determined.

This format information includes correction level information for specifying an error correction level and mask number information for specifying a mask number. The correction level information is to specify an error correction level used by the information code 100. The mask number is used to specify what type of masking has been applied to the code word region of the information code 100, where code words of data and error correction are recorded in the code word region.

The format information shown in FIG. 6 is recorded so that a predetermined type of mask pattern (a specified mask) is reflected in the format information. The type of mask indicated by the format information is identified by a method similar to a known QR code, thus making it possible to detect a specified code type as shown on the right side in FIG. 5 (i.e., a "frame QR" type with the free space 110).

In the QR code according to a known standard, when the QR code is configured on a model 1 for example, a mask for the model 1 is applied to the format information shown in FIG. 6, so that data (i.e., a cell arrangement) are produced by the masking and the produced data are recorded at predetermined positions. Similarly, in configuring the QR code on a model 2, a mask for the model 2 is applied to the format information shown in FIG. 6, so that data (i.e., a cell arrangement) are produced by the masking and the produced data are recorded at predetermined positions.

Meanwhile, in the information code 100 of the "frame QR" type shown in FIG. 5 (that is, in the special type of code with the free space 110), a specified mask which is different in type from the models 1 and 2 is applied to the format information shown in FIG. 6. This application produces an expression of data (i.e., an arrangement of cells), and the data are recorded in predetermined positions 105.

For any type selected from the models 1 and 2 on a known standard and a code type (frame QR) of the information code 100, the formal information is configured such that check digits for a correction level (correction level information) for recording and a mask number are included in the format information, and making for the selected type is then applied to the format information. Practically, the mask pattern for each type is used to be subjected to the format information using a known masking process, resulting in that an arrangement of light cells and dark cells, corresponding to a masked bit pattern, is recorded at the predetermined positions.

Accordingly, when the format information is masked by a specified mask (in FIG. 6, this specified mask is exemplified as being for the fame QR) and recorded at the predetermined positions 105, the cell information recorded at the predetermined positions 105 is released from being masked by using the specified mask and then interpreted for revealing the same check digits. Thus it can be determined that the type is the type (QR code) of the information code 100.

In contrast, if the cell data at the predetermined positions in the information code 100 are un-masked based on the masks for the model 1 or 2, the check digits are produced differently from the originally added check digits. It can thus be determined that an information code is not according to the known models 1 and 2.

In this information code 100, when reading the code, the specification patterns (such as the position detecting patterns 104) are detected, and the same method as that for known QR codes is used to specify the direction of the code and the positions of the respective cells, before the format information recorded at the predestined positions are interpreted using the same method as that for the known QR codes. The type of a mask which has been disclosed through the interpretation provides the type of the information code 100, i.e., the type of this code is a special type with the free space 110.

The interpreted format information results in determining both an error correction level used in the information code 100 and the type of a mask applied to the code word region (i.e., a region in which data code words and error correction code words are recorded). In addition, the predetermined positions 105 of the code are previously known to the reader 10 in the present embodiment.

Figure 3:
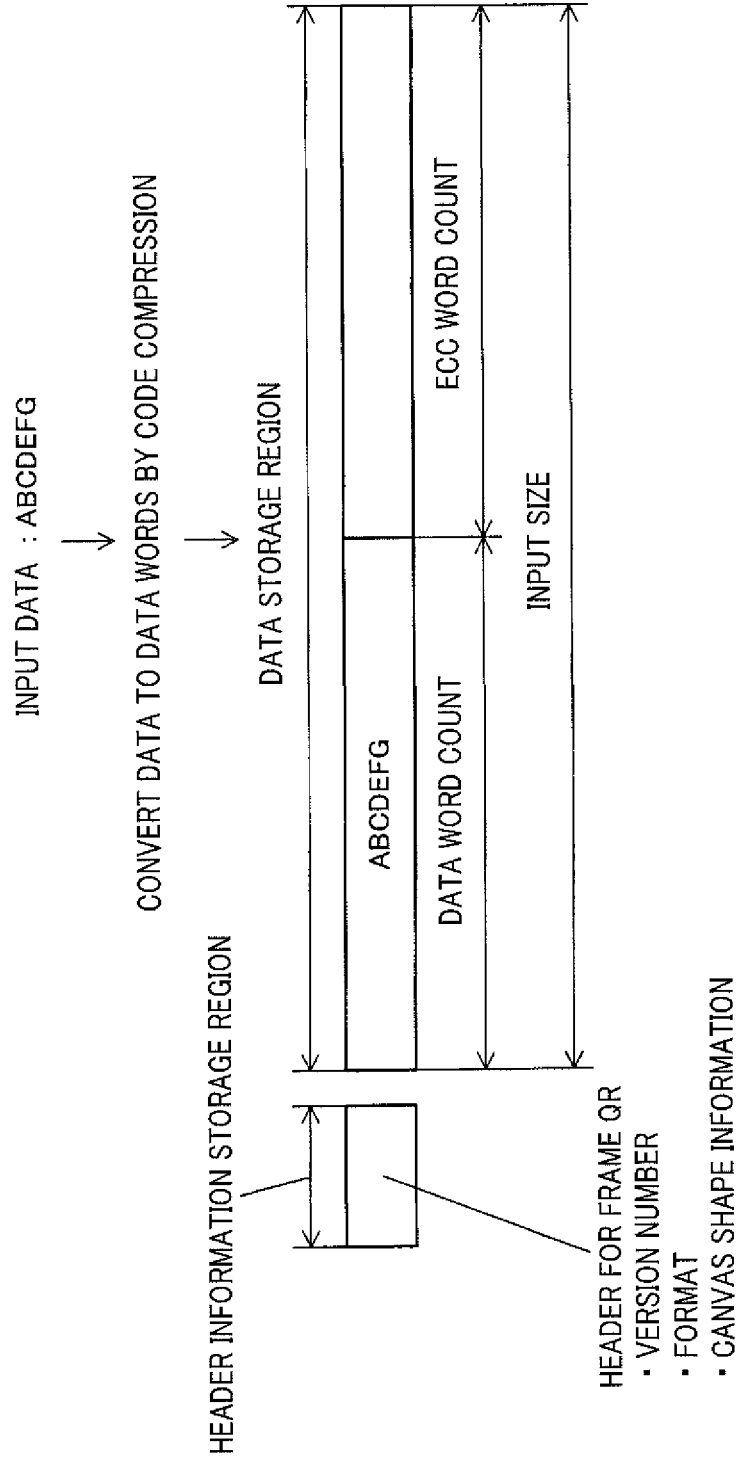
FIG. 3 is an explanatory diagram for conceptually describing a data configuration of an information code generated in the information code generation apparatus according to the first embodiment.

Contents recorded in the information code 100 are formatted into a data arrangement as shown in FIG. 3, for example. Header data are put at the head of the data arrangement, which are followed by input data (i.e., data to be interpreted). In the example shown in FIG. 3, there are recorded, as the header data (the header for the fame QR), specification information are recorded. The specification information is able to specify the type (version and format of the QR code) of the other type of code 120 later described. This other type of code 120 is a code type for interpreting the information code 100 and made to correspond to the information code 100 via the arrangement conversion table (shown in FIG. 5). In the header data, various types of information shown in FIGS. 14A, 14B, and 14C to FIG. 16 are also recorded, which specify a position of the free space, which will be described later. This header data are recorded in part of the data recording region of the information code 100, so that the part of the data recording region functions as a header information storing region. In the present disclosure, the foregoing header data used in the information code 100 is also referred to as a "header for frame QR."

FIG. 3 conceptually shows a case where input data (i.e., data to be interpreted) is "ABCDEFG". In the information code 100, these input data (data to be interpreted) are compressed by using a known technique, converted into data words (i.e., data code words), and recorded in part of the data recording region (which functions as a data storing region). In the present disclosure, both the region in which a plurality of data words (data code words) indicating the contents of both the header data (header for frame QR) and the input data (data to be interpreted) are recorded and the region in which the forgoing format information is recorded compose the data recording region.

As shown in FIG. 3, the input data (i.e., data words being interpreted) are followed by error correction code words (ECC words) which are error correction codes. In the information code 100, a region in which the error correction codes are recorded functions as an error correction code recording region. As a method of producing error correction codes (i.e., error correction code words) based on the data words (i.e., the header data and the input data (which are data to be interpreted) in the example shown in FIG. 3), methods based on known two-dimensional codes (such as QR codes) can be employed.

By way of example, as a method of producing the error correction code words based on the data words (i.e., data code words), a production method for error correction code words regulated by JISX0510:2004 (which is JISX0510: 2004, 8.5 error correction) can be used as one of known methods. This production method for the error correction code words is not limited to the foregoing, and this production may be performed using various other methods.

Moreover, in this information code 100, the respective data words (data code words) expressing the input data (data being interpreted) and the error correction code words are arranged or mapped within the code region on the basis of predetermined arrangement position information. In this configuration, as shown in FIG. 5, arrangement candidate positions for respective code words are defined previously in the code region of the information code 100, and the numbers (addresses) are assigned to the respective arrangement candidate positions. The arrangement position information specifies arrangement of the code words such that the respective code words composing the recording contents shown in FIG. 3 should be arranged at which of the arrangement candidate positions. In the example shown in FIG. 5, the arrangement candidate positions Nos. 1-21 are outlined by way of example, in which the head and last bit portions are numbered for explicit showing in each of the arrangement candidate positions and arrangement candidate positions of Nos. 22 or higher are omitted from being drawn.

Specifically, in the case of the version of the other type of code 120 (in this case, a known QR code having the position detection patterns 124) where the version is specified by the header data shown in FIG. 3, known regulations or rules are applied to determine that each of the code words having an arrangement order should be arranged or mapped at which position in the other type of code 120. In interpreting the other type of code 120, the arrangements defined in this way are used to interpret the code words in the arrangement order.

Furthermore, the arrangement position information (the arrangement conversion table) is provided to make the respective arrangement positions (i.e., arrangement positions of the code words according to the arrangement order) previously decided in the other type of code 120 correspond to the candidate positions (i.e., the arrangement candidate positions of the code words) previously decided in the information code 100, respectively.

To be more precise, in the arrangement position information, correspondence info nation showing "the arrangement position of the first code word in the other type of code 120 corresponds to the first arrangement candidate position in the information code 100", "the arrangement position of the second code word in the other type of code 120 corresponds to the second arrangement candidate position in the information code 100", "the arrangement position of the third code word in the other type of code 120 corresponds to the third arrangement candidate position in the information code 100", and so on, is recorded. As a result, the arrangement positions of the code words numbered in the other type of code 120 are made to respectively correspond to the arrangement candidate positions of the information code 100.

Thus, in interpreting the information code 100, the code words at the arrangement candidate positions in the code region are re-arranged to arrangement positions in the other type of code 120 which arrangement positions are specified by the arrangement position information (i.e., the arrangement conversion table). The other type of code 120 thus re-arranged is then subjected to interpretation based on a known interpretation method (i.e., a known QR code interpretation method).

For example, in the lower part shown in FIG. 5, the code word at the first arrangement candidate position in the information code 100 is arranged at an arrangement position assigned to the first code word in the other type of code 120, and the code word at the second arrangement candidate position in the information code 100 is arranged at an arrangement position assigned to the second code word in the other type of code 120. As exemplified above, the re-arrangement is performed for every code word, and the other type of code (e.g., QR code) whose code words are re-arranged is subject to a known interpretation method.

It is preferable that the arrangement position information (the arrangement conversion table) is owned by each of the information code generating apparatus 2 generating the information code 100 and the information code reader 10 reading the information code 100.

(Information Code Generating Process)

Figure 8:
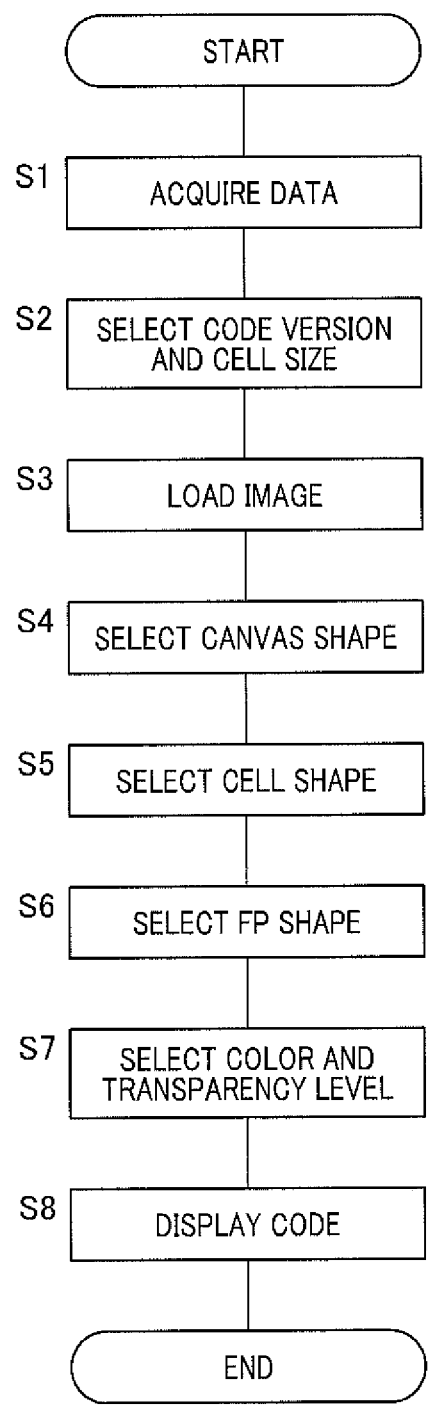
FIG. 8 is a flowchart exemplarily illustrating a flow of generation of the information code in the information code generation apparatus according to the first embodiment.
Figure 9:
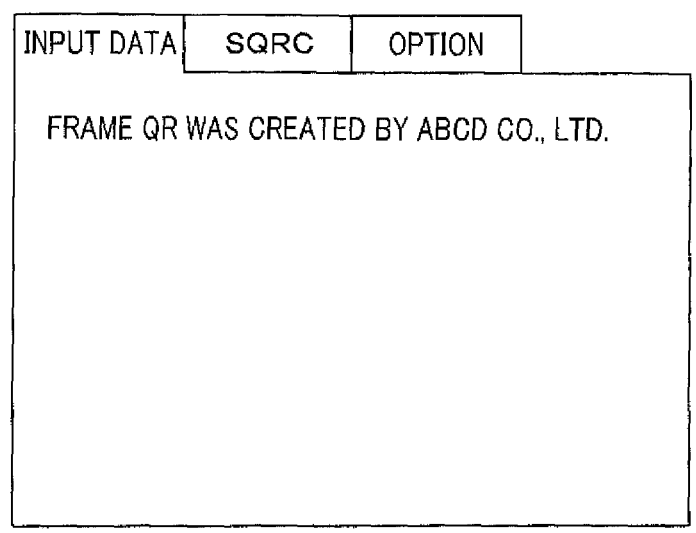
FIG. 9 is an explanatory diagram illustrating an input example of data to be decoded of when the information code is generated by the information code generation apparatus according to the first embodiment.

Next, an information code generating process and an information code generation method will be described with reference to FIG. 8 and the like. Hereafter, an example is given and described in which the other type of code 120 is a QR code (registered trademark) such as that in the left-hand drawing in FIG. 5. In addition, as in the right-hand drawing in FIG. 5, the information code 100 has specification patterns 104 that provide functions similar to those of the specification patterns 124 in the QR code The information code generating process in FIG. 8 is a process performed by the information code generation apparatus 2. The information code generating process is started when a predetermined start condition is met (for example, when a predetermined operation is performed in the operating unit 4). In this process, first, the information code generation apparatus 2 acquires data to be coded (data to be interpreted) from outside (S1). In the process at S1, the information code generation apparatus 2 displays content such as that shown in FIG. 9, for example, on the display unit 6, thereby enabling the user to input characters and the like in an input area by operating the operating unit 4. When characters and the like are inputted in the input area by the operating unit 4 being operated, the information code generation apparatus 2 acquires the inputted data as "data to be interpreted". For example, in the example in FIG. 9, a character string that is "Frame QR was created by ABCD Co., Ltd." is inputted in the input area by the operating unit 4 being operated. At S1, the information code generation apparatus 2 acquires a character string such as this and uses the character string as the "data to be interpreted".

The process at S1 corresponds to a data acquiring process by which data to be interpreted is acquired. In addition, the process at S1 corresponds to an example of a data acquiring step of acquiring data to be interpreted. A program for performing the processes in FIG. 8 (a program stored in the storage unit 5 that is readable by the control unit 3 and enables the processes in FIG. 8 to be performed) functions to enable a computer (specifically, the control unit 3 of the generation apparatus 2) to perform the "data acquiring step of acquiring data to be interpreted" at S1.

In addition, in the present configuration, the control unit 3 and the operating unit 4 correspond to an example of a "data acquiring unit" and function to acquire data to be interpreted (input data from outside). In addition, the present invention is not limited to an example such as this. For example, the control unit 3 and the communication unit 7 may be configured as the "data acquiring unit", and may function to acquire data inputted through communication from outside as the "data to be interpreted". The storage unit 5 configures a recording medium (i.e., a non-transitory computer-readable medium).

After acquiring the input data (data to be interpreted) at S1, the information code generation apparatus 2 selects a code version (model version) and a cell size. The code version (model version) is information that prescribes the number of rows and the number of columns of cells within the code region, the arrangement of specification patterns, the arrangement of code words, the position of format information, and the like. The cell size is information that prescribes the size of a single cell.

Specifically, the cell size is information that prescribes the size in the vertical direction (column direction) and the size in the lateral direction (row direction) of each cell region that is configured to have a rectangular shape. In the present configuration, a plurality of code versions (model numbers) are prepared in advance. For each code version (model number), the number of rows and the number of columns of the cell regions within the code region, the placement of specification patterns within the code region, the arrangement of code words within the code region, the position of format information within the code region, and the like are prescribed. As a result of the code version (model number) and the cell size being determined, the size of the overall code region and the basic structure within the code region are determined.

In addition, in the process at S2, the information code generation apparatus 2 generates a code to be recorded in the data recording region, based on the input data (data to be interpreted) acquired at S1. Specifically, the information code generation apparatus 2 expresses the input data (data to be interpreted) acquired at S1 with a plurality of data words (data code words). In addition, the information code generation apparatus 1 generates unique header data (see FIG. 3: described above) that is used for the type (frame QR) of the information code 100 having the free space 110 (i.e., (or canvas region). The information code generation apparatus 2 sets the header data at the head of a data array that includes the plurality of data words as in FIG. 3. At least information (such as version number information) that enables identification of the type (model number and format) of the other type of code 120, described hereafter, information for identifying the format of the information code to be generated in FIG. 8, as well as the position and shape of the free space (canvas shape information), and the like are recorded in the header data in FIG. 3.

The information for identifying the position and shape of the free space may be recorded as format information in a fixed region within the code region, rather than in the header data. In addition, the information code generation apparatus 2 generates an error correction code by a publicly known method, based on the configuration of the above-described data words (the plurality of data code words that express the header data and the input data). The information code generation apparatus 2 also generates a plurality of error correction words (error correction code words) that express the error correction code.

Figure 10:
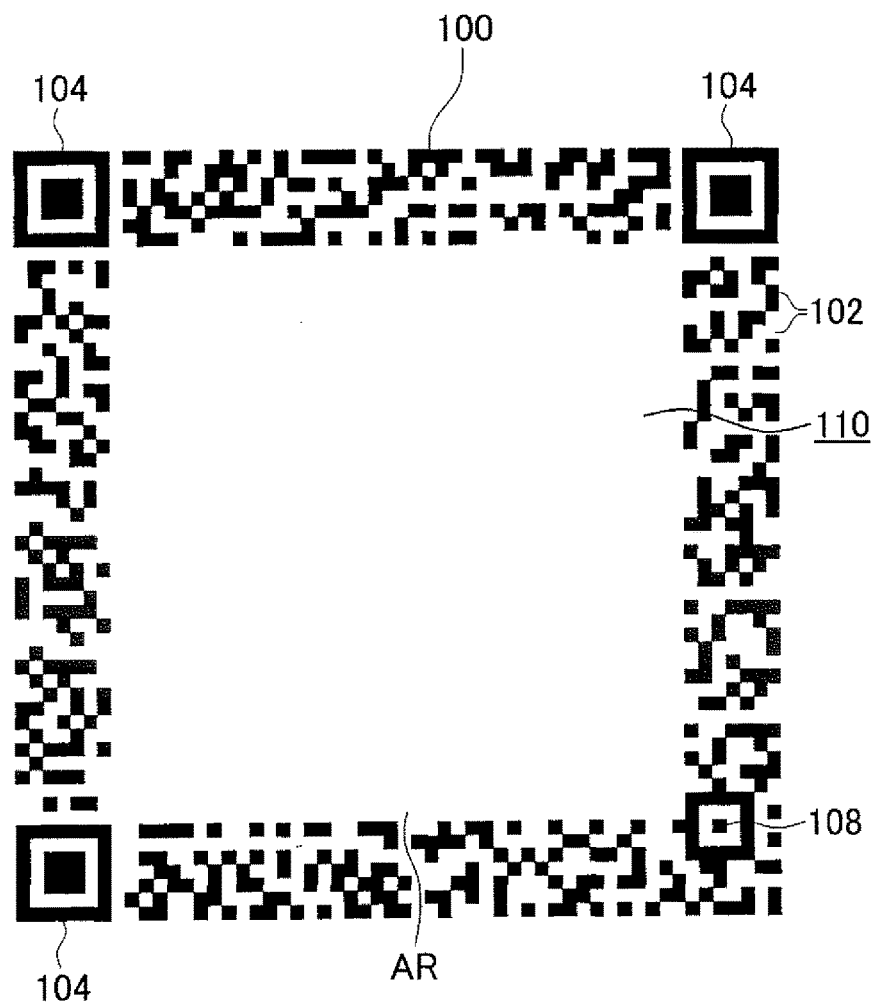
FIG. 10 is an explanatory diagram illustrating an example of a basic graphic of when the information code is generated by the information code generation apparatus according to the first embodiment.

The information code generation apparatus 2 then generates a basic figure of the information code 100 that is specified by the code version (model number) and cell size designated at S2. The basic figure is the figure of the information code 100 described in the above-described field (information code). For example, the basic figure is configured as in FIG. 10. In the information code 100 in FIG. 10, area AR is a free space (a free space before an image to be displayed, described hereafter, is displayed), and is an area in which specification patterns and cells are not arrayed.

The basic figure (FIG. 10) generated and displayed at S2 is the figure of the information code 100 that is generated based on the code version (model number) and cell size selected at S2. Each cell region is arrayed to form the number of rows and the number of columns prescribed by the code version (model number). The specification pattern regions (the regions of the position detection patterns 104 and the region of the alignment pattern 108 in the example in FIG. 10) are arranged in positions prescribed by the code version (model number). In addition, each code word is arranged based on the arrangement prescribed by the code version (model number). In the basic figure in FIG. 10, the position and shape of the free space (area AR) is a default position and default shape that has been determined in advance. In the example in FIG. 10, the free space 110 is arranged at a predetermined center area within the code region as a blank area having a rectangular outer edge.

More specifically, in the information code generation apparatus 2, the above-described arrangement position information (arrangement conversion table) is stored in the storage unit 5. Specifically, each arrangement position (the arrangement position of each code word in sequence) prescribed by the model number of the other type of information code 120 (such as a normal QR code) that is identified by the Ver. Number in FIG. 3 is associated with a candidate position (an arrangement candidate position of each code word) prescribed in advance in the information code 100 of the code version (model number) designated at S2 in FIG. 8.

Figure 4:
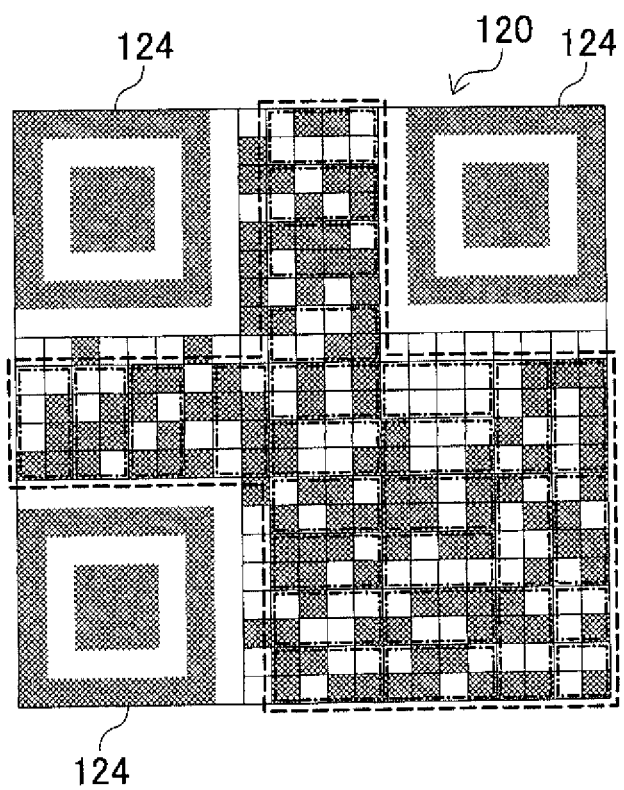
FIG. 4 is an explanatory diagram for describing another type of code corresponding to an information code generated in the information code generation apparatus according to the first embodiment.

In the process at S2, the information code generation apparatus 2 identifies the arrangement position of each code word (each code word in sequence) when the code words to be recorded (data words (data code words) and error correction words (error correction code words)) are expressed by the other type of code 120 (a two-dimensional code that is smaller in size than the information code 100 and is of a size enabling the data words and the error correction words to be stored) shown in FIG. 4 and the left-hand drawing in FIG. 5.

Upon identifying the arrangement positions, the information code generation apparatus 2 arranges each code word in sequence at the arrangement candidate position within the information code 100 that is associated with the arrangement position of each code word in sequence based on the arrangement position information (arrangement conversion table). For example, in the arrangement position information (arrangement conversion table) in FIG. 5, the arrangement position of the first code word in the other type of code 120 is associated with the first arrangement candidate position in the information code 100. Therefore, the first code word among the code words (data words and error correction words) to be recorded is arranged in the first arrangement candidate position within the information code 100.

In addition, the arrangement position of the second code word in the other type of code 120 is associated with the second arrangement candidate position in the information code 100. Therefore, the second code word among the code words to be recorded is arranged in the second arrangement candidate position within the information code 100. When the arrangement position of the N-th code word in the other type of code 120 is associated with an M-th arrangement candidate position in the information code 100 in this way, the N-th code word among the code words to be recorded is arranged in the M-th arrangement candidate position within the information code 100.

In other words, when only data words and error correction words are to be stored, the data words and error correction words can be expressed by the other type of code 120 (configured as a publicly known QR code) that is smaller in size than the information code 100. However, when the data words, the error correction words, and the free space 110 are to be stored, the data words, the error correction words, and the free space 110 are required to be expressed by the information code 100 that is larger in size than the other type of code 120. Therefore, in the present configuration, the data words, the error correction words, and the free space 110 are expressed by the information code 100 (such as in FIG. 10) that is large in size.

The correspondence relationship between the arrangement of the code words when the data words and the error correction words are expressed by the other type of code 120 (publicly known QR code) and the arrangement of the code words when the data words, the error correction words, and the free space 110 are to be stored in the information code 100 that is larger in size than the other type of code 120 is able to be identified by the arrangement conversion table that has been prescribed in advance.

The information code generation apparatus 2 determines a mask pattern to be applied to the code words of which the arrangement positions have been determined, by a publicly known predetermined method (such as a publicly known method used for QR codes). The information code generation apparatus 2 applies the mask by a publicly known mask processing method, such that the determined mask pattern is reflected on the code words of which the arrangement positions have been determined. The information code generation apparatus 2 calculates a check digit based on information (mask number) on the mask pattern that has been set in this way and information on error correction level. The information code generation apparatus 2 generates format information including the error correction level, the mask number, and the check digit as shown in FIG. 6.

Then, the information code generation apparatus 2 performs a mask process on the format information generated as described above, such that the above-described specified mask (frame QR mask) is reflected (see FIG. 6). After applying the mask to the format information, the information code generation apparatus 2 arranges the post-mask-process format information in a predetermined position within the code region (a predetermined position within the code region that is identified by the code version (model number) selected at S2). The information code 100 such as that in FIG. 10 is generated in this way. At this time, the inside of the free space 110 is empty. Information specifying the position and shape (default position and default shape) of the free space 110 in the basic figure in FIG. 10 is included in the header data as the "canvas shape information".

After generating the information code 100 (basic figure) such as that in FIG. 10 in the process at S2, the information code generation apparatus 2 loads an image to be displayed (S3). In this process, the information code generation apparatus 2 acquires data on the image to be displayed that is stored in the storage unit 5 in advance or is acquired from outside at the time of the process at S3. The information code generation apparatus 2 combines the image to be displayed with the above-described basic figure (FIG. 10). The information code generation apparatus 2 can perform the process at S3 by selecting either of two methods prepared in advance. The method may be selected by, for example, the user operating an input unit and designating either method. The selection may also be made by another method (such as automatic selection in which a first method is selected when the size of the code region is a predetermined large size, and a second method is selected when the size is a predetermined small size).

The process at S3 corresponds to an example of an image acquiring process by which data of an image to be displayed that is an image differing from the cells is acquired. In addition, the control unit 3 that performs the process at S3 corresponds to an example of an image acquiring unit and functions to acquire data on an image to be displayed that is an image differing from the cells. In addition, the process at S3 corresponds to an example of an image acquiring step of acquiring data of an image to be displayed that is an image differing from the cells.

A program for performing the processes in FIG. 8 (a program stored in the storage unit 5 that is readable by the control unit 3 and enables the processes in FIG. 8 to be performed) functions to enable a computer (specifically, the control unit 3 of the generation apparatus 2) to perform the "image acquiring step" at S3.

In the first method, the information code generation apparatus 2 acquires the image to be displayed by reading the image to be displayed from the storage unit 5, by input from outside, or the like. The information code generation apparatus 2 then combines the acquired image to be displayed with the basic figure (FIG. 10) in an overlapping manner. The position on the basic figure shown in FIG. 10 at which to combine the image to be displayed can be designated by the user. The image to be displayed may be combined such as to completely fit within the free space 110.

Alternatively, the image to be displayed may be combined such that a portion of the image to be displayed is placed within the free space 110 and the remaining portion of the image to be displayed is placed outside of the free space 110. As a result of a process such as this, the information code generation apparatus 2 generates a code figure such as that in FIG. 11.

This process corresponds to an example of a figure display process by which a code figure that is configured to be provided with an image display region is displayed on the display unit 6. The image display region is a region in which at least a portion of an image to be displayed D is presented. Specifically, the figure display process is a process by which a code figure (FIG. 11) in which the basic figure (FIG. 10) and the image to be displayed D are presented in an overlapping manner is displayed on the display unit 6.

The basic figure (FIG. 10) that is provided with the specification pattern regions, the cell array regions, and the free space 110 is arranged in the code figure. The specification pattern regions are regions in which specification patterns (the position detection patterns 104 and the alignment pattern 108) are arranged. The cell array regions (the data recording region and the error correction code recording region in the basic figure in FIG. 10) are regions in which a plurality of types of cells are arrayed in positions other than the specification pattern regions. The free space 110 is a region in which cells are not arrayed.

Figure 11:
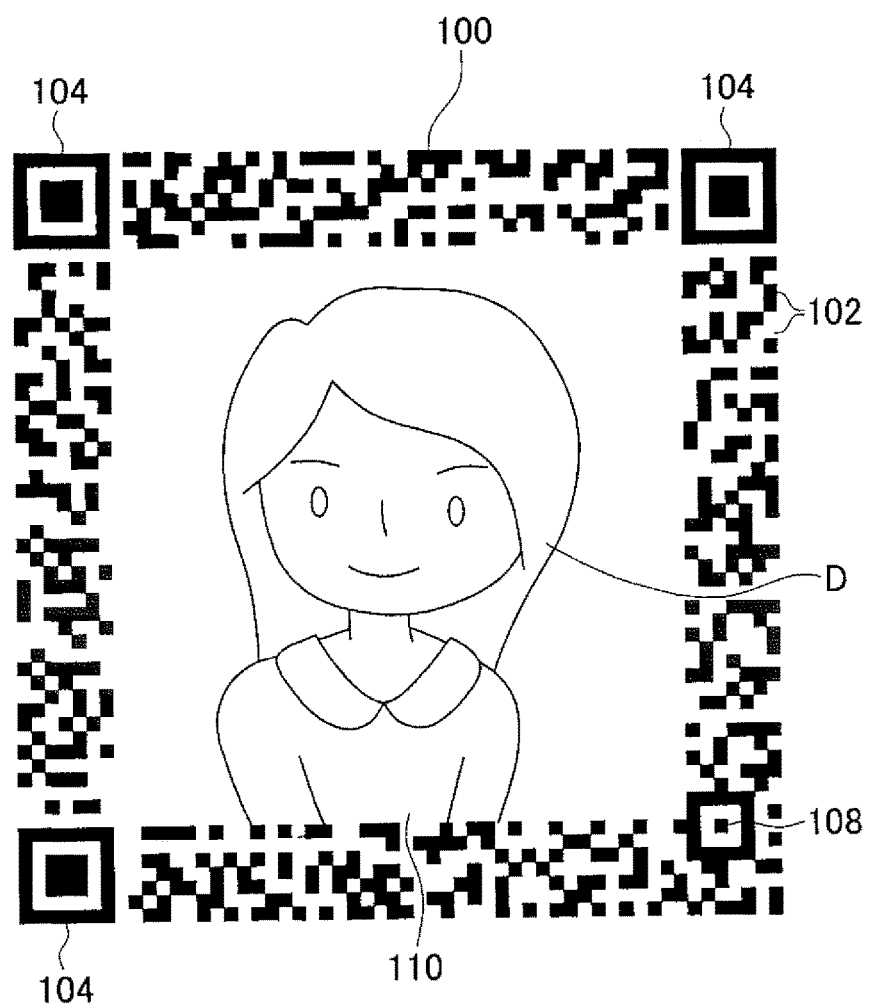
FIG. 11 is an explanatory diagram illustrating an example in which an image to be displayed is inserted into the basic graphic of FIG. 10.

The basic figure (FIG. 10) and the image to be displayed D are overlapped such that at least a portion of the image to be displayed D fits within the free space 110 of the basic figure, such as that described above, and the outer edge portion of the free space 110 serves as the outer edge portion of the image display region D. Furthermore, the figure display process is a process by which a code figure that is configured such that the cells 102 are arranged adjacent to the outer edge portion of the image display region (free space 110) as in FIG. 11 is displayed (see FIG. 11). In the code figure presented in this way, a portion or the entirety of the image to be displayed D is displayed in the free space 110. The free space 110 corresponds to the "image display region".

In the second method, the information code generation apparatus 2 arranges an image to be displayed that has a predetermined outer edge shape that has been prescribed in advance or designated by input, within the free space 110 in the basic figure such as that as in FIG. 10. This process also corresponds to an example of the figure display process by which a code figure that is configured to be provided with an image display region is displayed on the display unit 6.

The image display region is a region in which at least a portion of the image to be displayed D is presented. Specifically, the figure display process is as follows. A basic figure that is provided with the specification pattern regions, the data recording region, the error correction code recording region, and the free space 110 is generated and displayed as in FIG. 10. The specification pattern regions are regions in which specification patterns (the position detection patterns 104 and the alignment pattern 108) are arranged. The data recording region is a region in which data to be interpreted is recorded by a plurality of types of cells. The error correction code recording region is a region in which error correction codes are recorded. The free space 110 is a region in which cells are not arrayed.

Figure 12A:
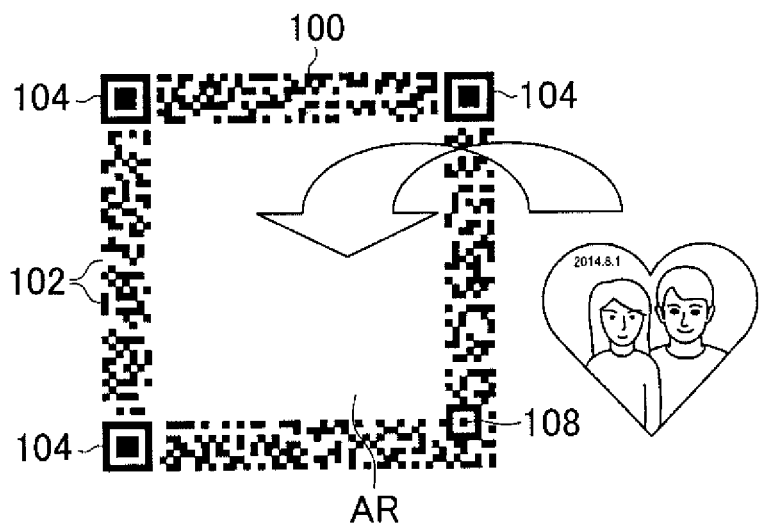
FIG. 12A is an explanatory diagram illustrating an example of an operation of inserting an image to be displayed having a predetermined outer edge shape into the basic graphic of FIG. 10.
Figure 12B:
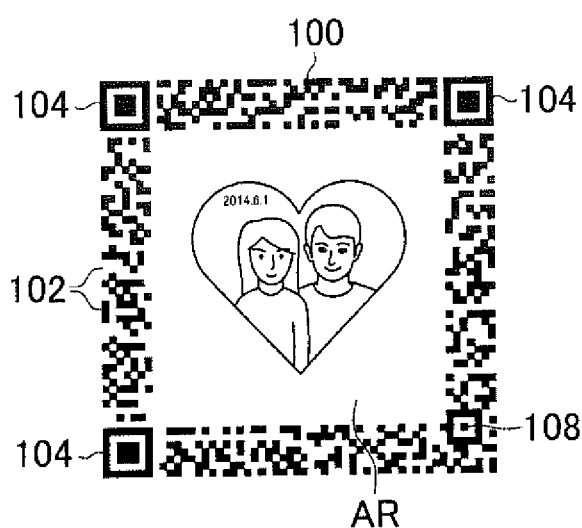
FIG. 12B is an explanatory diagram exemplarily illustrating a code graphic obtained such that the image to be displayed having a predetermined outer edge shape is inserted into the basic graphic of FIG. 10.

As in FIG. 12A and FIG. 12B, the user designates the arrangement of an image display region having a predetermined outer edge shape (a region in which the image to be displayed D is displayed and that has a heart-shaped outer edge shape, in the example in FIG. 12A and FIG. 12B) within the free space 110 of the basic figure such as that described above.

In response to the designation, a code figure of the information code 100 based on the designation (the information code in which the image display region (the region in which the image to be displayed D is displayed) having the predetermined outer edge shape completely fits within the free space 110 of the basic figure in FIG. 10) is displayed on the display unit 6. Regarding the position within the free space 110 at which to display the image to be displayed D, a method can be used in which the user designates the position by operating the operating unit 4. For example, a method can be used in which the user clicks on the image to be displayed D within the display screen of the display unit 6 and moves the image to be displayed D to a desired position within the free space 110 by drag-and-drop.

Figure 12C:
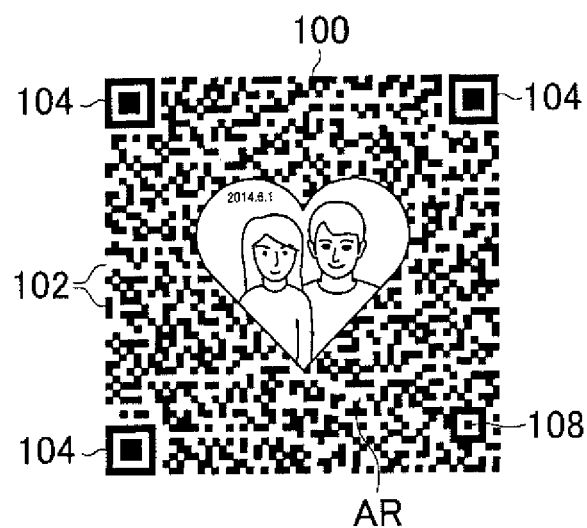
FIG. 12C is an explanatory diagram illustrating an example in which a dummy cell pattern is arranged in a residual region (a region other than the image to be displayed) in a free space in the code graphic of FIG. 12B.

In the second method, after the position of the image to be displayed D is determined as in FIG. 12B, the information code generation apparatus 2 provides a cell array pattern (dummy cell pattern) in the position within the free space 110 excluding the image to be displayed D, as in FIG. 12C. In the cell array pattern, a light colored cell figure and a dark colored cell figure that are respectively composed of the same figures as those of the light colored cells and the dark colored cells configuring the cells 102 are arrayed. The information code generation apparatus 2 thereby generates a code figure such as that in FIG. 12C.

In FIG. 12A to FIG. 12C, the heart-shaped outer edge shape is shown as an example of the predetermined outer edge shape. However, various outer edge shapes such as a polygon, such as a triangle or a square, a star, a circle, or an ellipse can be used as the "predetermined outer edge shape".

As described above, the process at S3 corresponds to an example of the figure display process. In addition, the control unit 3 that performs the process at S3 corresponds to a figure display control unit. The control unit 3 functions to display, on the display unit 6, a code figure that is configured to be provided with an image display region that is a region in which at least a portion of the image to be displayed is present, by either of the above-described first method and second method.

In addition, the process at S3 corresponds to a figure display step of displaying, on the display unit 6, a code figure that is configured to be provided with an image display region that is a region in which at least a portion of the image to be displayed is present. A program for performing the processes in FIG. 8 (a program stored in the storage unit 5 that is readable by the control unit 3 and enables the processes in FIG. 8 to be performed) functions to enable a computer (specifically, the control unit 3 of the generation apparatus 2) to perform the "figure display step" at S3.

At S3, after the code figure such as that in FIG. 12C is generated and displayed by the above-described second method, the position of the image to be displayed D having the predetermined outer edge shape may be changed within the free space 110 of the code figure. For example, after the code figure such as that in FIG. 12C is generated and displayed, drag-and-drop of the image to be displayed D may be made possible within the display screen of the display unit 6 by the operating unit 4 being operated. As a result of an operation such as this, the position of the image to be displayed D within the free space 110 may be changed as in FIG. 24A. In this case, after the position of the image to be displayed D is determined as in FIG. 24A, as shown in FIG. 24B, the information code generation apparatus 2 again provides a cell array pattern (dummy cell pattern) in the position within the free space 110 excluding the image to be displayed D, as in FIG. 24B.

In the cell array pattern, a light colored cell figure and a dark colored cell figure that are respectively composed of the same figures as those of the light colored cells and the dark colored cells configuring the cells 102 are arrayed. The information code generation apparatus 2 can thereby regenerate a code figure such as that in FIG. 24B. When regeneration of the code figure such as this is performed, the process for receiving the above-described input operation (such as the drag-and-drop operation as in FIG. 24A) corresponds to an example of an input receiving process. In addition, the process for regenerating the code figure as in FIG. 24B corresponds to an example of a code generating process.

Figure 24A:
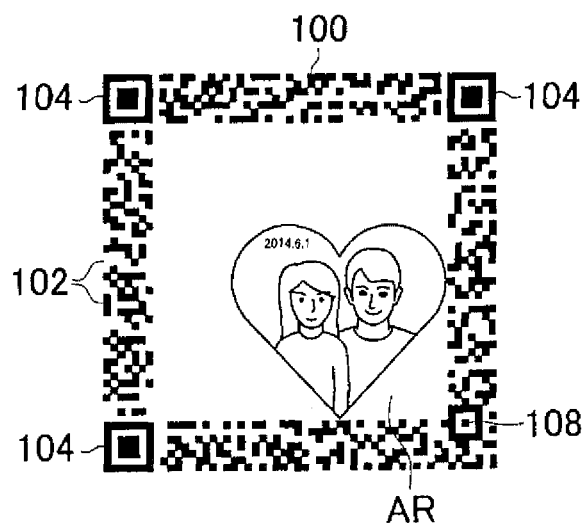
FIG. 24A is an explanatory diagram illustrating an example in which an operation to change the position of the image to be displayed in the free space in the code graphic like FIG. 12C has been performed.
Figure 24B:
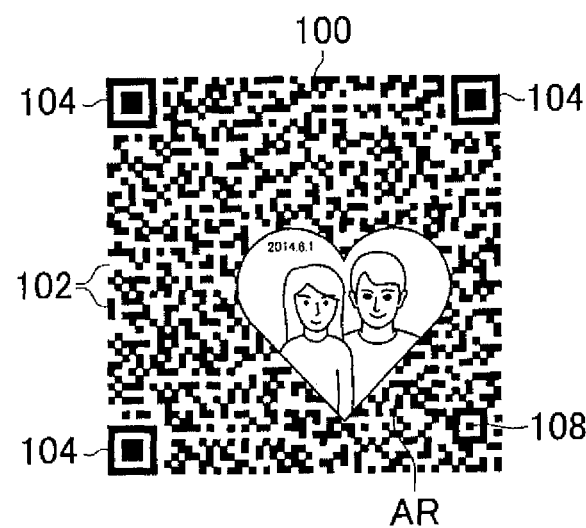
FIG. 24B is an explanatory diagram illustrating an example in which a dummy cell pattern is arranged in a residual region (a region other than the image to be displayed) in the free space in the code graphic to which the position change operation like FIG. 24A has been performed.

That is, after the code figure such as that in FIG. 12C is displayed on the display unit 6 by the figure display process, when an input is made to designate the arrangement content (specifically, the position of the image to be displayed D within the free space 110) of the image display region within the free space 110 as in FIG. 24A by the input receiving process, the code generating process is a process by which the arrangement of the image display region (that is, the arrangement of the image to be displayed D having the predetermined outer edge shape) within the free space 110 is changed based on the arrangement content received through the input receiving process, as in FIG. 24B, and an information code is generated that is configured such that a plurality of types of cells are arrayed in positions within the free space 110 excluding the image display region (the region of the image to be displayed D having the predetermined outer shape) after the change.

After generating and displaying the code figure by the process at S3 in this way, the information code generation apparatus 2 receives a change in the arrangement (canvas shape) of the free space 110 (S4). The processes at S4 to S7 can be performed only when the above-described first method is used. In this case, when the information code (such as the code figure in FIG. 12C or the regenerated code figure in FIG. 24B) is generated by the above-described second method, at S8, the information code that is ultimately generated may be displayed on the display unit 6. Hereafter, an example in which the processes at S4 to S7 are only performed when the first method is used will be described as a representative example. However, the processes at S4 to S7 may also be performed when the second method is used.

In the present configuration, when the code figure such as that in FIG. 11 is generated and displayed by the above-described first method, the arrangement (size, shape of the outer edge portion, and position) of the free space 110 can be changed to various arrangements. At S4, a designation of the arrangement of the free space 110 is received and the arrangement of the free space 110 is changed depending on the designation content.

Here, a method for setting the free space will be described.

In the present configuration, the shape of the free space can be determined by either of a first method (fixed mode) in which the shape is selected from among a plurality of candidate shapes, and a second method (user mode) in which a shape is set based on shape designation information that is inputted to the information code generation apparatus 2 from outside. Regardless of which method is used to determine the free space, information specifying the method used to determine the shape of the free space and information specifying the position of the free space may be recorded in a fixed region as format information or may be recorded as header data.

Figure 7:
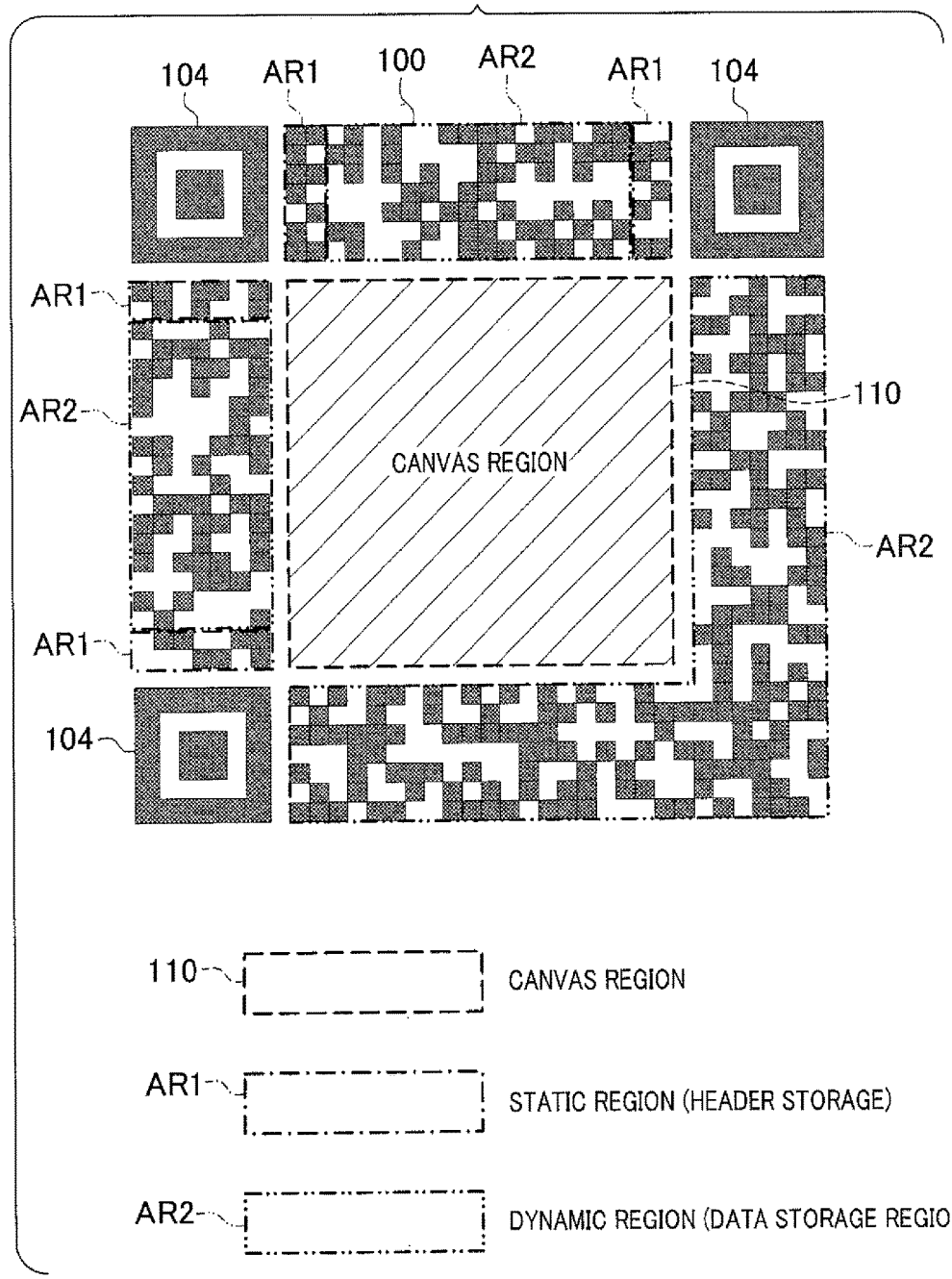
FIG. 7 is an explanatory diagram exemplarily and conceptually illustrating a fixed region (static region) where format information is recorded, and a dynamic region where data to be decoded is recorded.

Hereafter, the case in which the data specifying the shape and position of the free space is recorded in the fixed region as format information will be described as a representative example. When the data specifying the shape and position of the free space is recorded in the fixed region as format information, the position of the fixed region is not particularly limited. For example, as conceptually shown in FIG. 7, an example can be given in which the fixed region is set near the position detection pattern 104. It goes without saying that the fixed region may be provided in a position other than that in this example.

Changes to the setting of the free space may be made in either fixed mode or user mode. For example, when a predetermined first instruction is given through the operating unit 4, setting in fixed mode using a display screen such as that in FIG. 13 is performed. When a predetermined second instruction is given, setting in user mode is performed.

A simplified data configuration of the format information (information enabling identification of the position of the free space) in fixed mode (FIX MODE) is as in FIG. 14A. More specifically, the data configuration is as in FIG. 14B. In addition, the data configuration in user mode (USER MODE) is, for example, as in FIG. 14C. Regarding both modes, the mode is specified by the first MD bit definition value (information specifying the method used to determine the shape of the free space). That is, either of fixed mode (FIX mode) and user mode (USER MODE) can be selected based on the selection of the MD bit definition value.

First, an example in which the free space 110 is set in fixed mode will be described. In the present configuration, when the free space 110 is set in fixed mode (FIX MODE), for example, an instruction is received from the user as in FIG. 13. Upon setting the free space 110 based on the instruction, the information code generation apparatus 2 newly generates the information code 100 that reflects the free space 110 setting.

Fixed mode (FIX MODE) is a mode in which shapes (also referred to, hereafter, as canvas shapes) for the free space that have been defined in advance are used. A free space having a desired shape is set through selection of the position in which to arrange the free shape having a candidate shape and selection of a rotation angle (rotation attitude). As a result of a configuration such as this being used, for example, a canvas shape (free space shape) that matches, as much as possible, the countless illustration shapes designated by the user can be selected while suppressing addition to information volume.

In fixed mode, data specifying the position of the free space includes, as shown in FIG. 15, an MD bit that designates mode, a CEN bit that specifies whether or not to set a center position, an SZ bit that specifies whether or not to change the size, an ANG bit that specifies whether or not to change the rotation angle, a MASK NO. bit that designates the shape of the free space, and the like. Furthermore, a CENTER POS bit that designates a specific position of the center position, a SIZE bit that designates a specific size, and an ANGLE bit that designates a specific rotation angle are included. These pieces of data are generated based on information input by the user on a display screen such as that in FIG. 13.

In the present configuration, regardless of the model number (code Ver.) of the information code 100, a CENTER POS coordinate system (a coordinate system for designating the specific position of the center position) is as follows. As in FIG. 17, based on a block coordinate in which the overall code is vertically and laterally divided into 16 equal parts, the CENTER POS coordinate system amounting to four bits is set in a predetermined coordinate position (a position that is eight blocks away from the boundary (first boundary) of a code to which two position detection patterns are adjacent and a position that is eight blocks away from the boundary (second boundary) of another code to which two position detection patterns are adjacent) shown in FIG. 17. That is, the CENTER POS coordinate system is set having a predetermined size (a size consisting of 16 blocks configured by 4×4 blocks in the example in FIG. 17) at a position that is eight blocks away from the above-described first boundary and a position that is eight blocks away from the second boundary.

When a checkmark is placed in the "center" field on the display screen such as that in FIG. 13, the CEN bit shown in FIG. 16 is set to 1. At this time, a canvas center position is set in the position (reference position) designated by the CENTER POS bit (reference position information specifying a reference position for arranging the free space). The CENTER POS bit is prescribed such as to be a position indicated by a value (X value) in the lateral direction and a value (Y value) in the vertical direction designated in the "center" field shown in FIG. 13.

Figure 17:
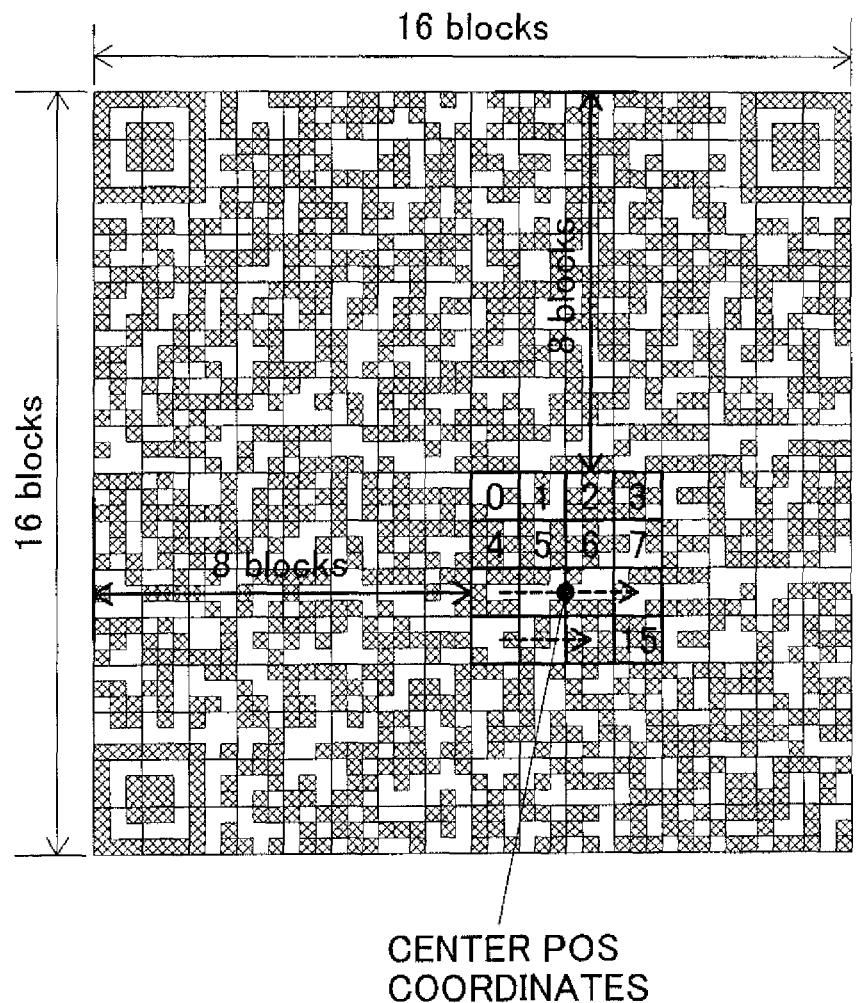
FIG. 17 is an explanatory diagram conceptually describing a set area of a center position.

In the present configuration, for example, in a candidate array such as that in FIG. 17, positions serving as candidates for the center position are prescribed in advance. When a more specific center position is designated by the CENTER POS bit in FIG. 15, any of the center positions among a plurality of candidate positions (candidate blocks) such as those in FIG. 17 is designated (the center position of any block among 16 candidate blocks in the example in FIG. 17). For example, in the example in FIG. 18, an example is shown in which the 1st block is selected from the 16 blocks, and the center position of the 1st block is designated as the "center of the free space". As a result of the center position being changeable in this way, for example, a position change can be made from the basic position of each free space such as from those in FIG. 20(A) to (J) to those in FIG. 21(B) to (H). When a checkmark is not placed in the "center field", or when the change input of the X value and the Y value is 0, the CEN bit may be set to 0. When the CEN bit is 0, for example, CENTER POS=0, and the center position of the 0th block may be designated as the center of the free space.

In addition, as a result of a value for size being inputted on the display screen in FIG. 13, the size of the free space can be changed. For example, when no designation of size is made, the SZ bit is set to zero. When a designation of the size is made, the SZ bit is set to 1. With a single block as the smallest unit, the number of blocks that amount to the canvas radius (a radius of a circumscribing circle including the free space) can be designated by the SIZE bit that designates size. For example, when the SIZE bit is 0, the candidate shape of the free space is arranged such as to inscribe a circle having a radius amounting to a single block. In addition, as in FIG. 18, when the SIZE bit is 5, the candidate shape (a triangle in the example in FIG. 18) of the free space is arranged such as to inscribe a circle having a radius amounting to six blocks. The value of the SIZE bit is determined by a value corresponding to the value designated in the "size" field in FIG. 13. As the value designated in the "size" field in FIG. 13 increases, the value of the SIZE bit increases.

In addition, as a result of the value of the rotation angle (rotation attitude) being inputted on the display screen in FIG. 13, the rotation angle (rotation attitude) of the free space can be changed. For example, when no designation of rotation angle (rotation attitude) is made, the ANG bit is set to 0. When a designation of the rotation angle (rotation attitude) is made, the ANG bit is set to 1. In addition, when the ANG bit is set to 1, the rotation angle of the free space is designated by the ANGLE bit. The designation value is, for example, composed of two bits.

The rotation angle is designated, for example, within a range from 0 degrees to 45 degrees in 15 degree units, based on input in the "rotation" field on the display screen in FIG. 13. That is, based on the designation value of the ANGLE bit (the rotation angle information specifying the rotation angle from a reference arrangement of the candidate shape), any angle among 0°, 15°, 30°, and 45° can be designated. The basic attitude of each candidate shape at 0° is prescribed in advance as in FIG. 20(A) to (J). These basic attitudes correspond to the reference arrangements. As a result of the ANGLE bit being designated in this way, the basic figure such as that in FIG. 20(E) can be rotated as in FIG. 21(A).

In addition, as a result of the shape field being selected on the display screen in FIG. 13, the MASK NO. bit is set to the value of the selected shape. The figure selected on the display screen in FIG. 13, among the candidate figures such as those in FIG. 20, can be designated as the figure of the free space by the value of the MASK NO. bit such as that described above. In the present configuration, a numerical value is assigned to each candidate shape. As a result of any of the numerical values being designated in the MASK NO. bit, the shape of the free space corresponding to the numerical value can be designated. For example, 0 is assigned to a figure such as that in FIG. 20(A), and 1 is assigned to a figure such as that in FIG. 20(E).

When a "triangle" is selected on the display screen in FIG. 13, 1 is designated as the MASK NO. bit, and a figure such as that in FIG. 20(E) is determined as the basic shape of the free space. When as many frequently used shapes as possible are registered as the mask patterns, rotation angle designation and size designation can be more easily omitted. The information volume of the format information or the frame QR header can be more easily reduced. Therefore, the code region can be more efficiently configured.

In this way, at S4, the information code generation apparatus 2 can re-determine the content of the free space. The information code generation apparatus 2 regenerates the format information or the header data such as to reflect the information specifying the content (such as the center position, size, rotation attitude, and shape of the free space within the code region) of the free space determined at S4.

Next, an example of the setting in user mode (USER MODE) will be described.

When the process at S4 is started and the predetermined second instruction is issued through the operating unit 4, the setting is performed in user mode (USER MODE). In this user mode (USER MODE), a plurality of pieces of coordinate designation information (shape designation information) can be inputted by, for example, external input through operation of the operating unit 4 or input by data transmission from an external apparatus (not shown). Such plurality of pieces of coordinate designation information (shape designation information) can be recorded within the code region as information such as that in FIG. 16.

Figure 19A:
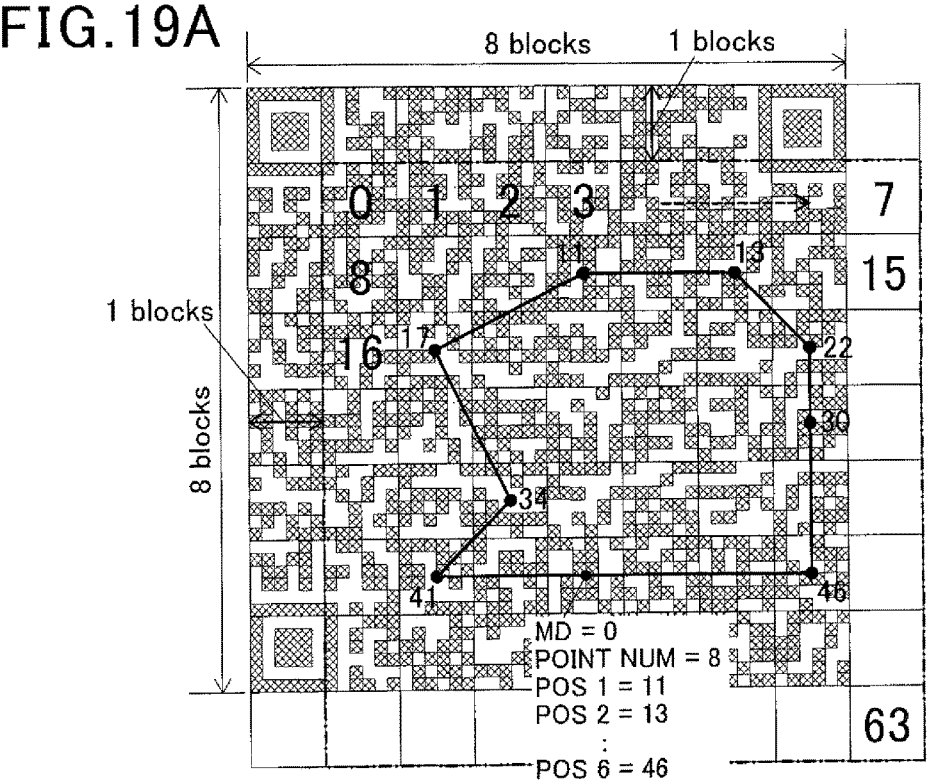
FIGS. 19A and 19B are explanatory diagrams conceptually describing a method of setting the free space in the user mode (manual mode)
Figure 19B:
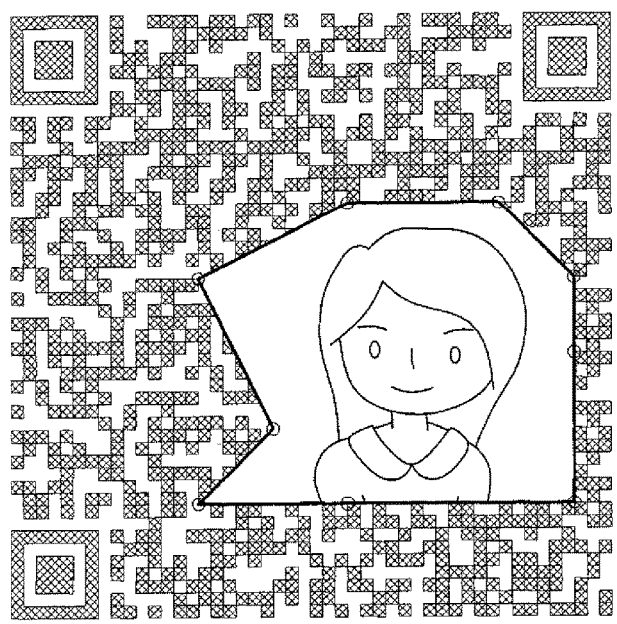

The information such as that in FIG. 16 may be recorded in a fixed region within the code region as format information or may be stored as header data. In this case, each position designated by the plurality of pieces of coordinate designation information (shape designation information) is set as an outer edge portion of the free space, within the code region. Specifically, as in the example in FIGS. 19A and 19B, vertex coordinate positions of a polygon can be arbitrarily designated. As a result of a configuration such as this being used, a canvas shape (free space shape) that matches, as much as possible, the countless illustration shapes designated by the user can be selected while suppressing addition to information volume.

Specifically, the user mode (USER MODE) is a mode in which, for example, a canvas shape definition can be arbitrarily designated by a maximum of 32 points. In the user mode (USER MODE), as in FIG. 19A, the coordinates of each vertex position can be designated on a coordinate system that is divided into 64 blocks (6 bits) consisting of eight blocks down and eight blocks across, regardless of the model number (code Ver.) of the information code 100. When setting is performed in user mode (USER MODE), as in FIG. 16, the MD bit is designated by 1. In addition, the number of coordinates of the vertex positions is designated by a POINT NUM bit shown in FIG. 16. (POS1 bit to POSn bit) that amount to the number designated in the POINT NUM bit is included as the coordinate designation information that designates each coordinate position.

For example, when the number of coordinates of the vertex positions is designated as being 5 by the POINT NUM bit, the vertex positions are indicated by the coordinate information of five vertex positions in the POST bit, the POS2 bit, the POS3 bit, the POS4 bit, and the POS5 bit. As in FIG. 19A, the information (POS1 bit to POSn bit) designating each coordinate position is information designating any of the blocks among the 64 blocks of 8×8 blocks that have been shifted one block in the rightward direction and one block in the downward direction from the above-described coordinate system that is divided into 64 blocks (6 bits). When any of blocks are designated by the POS bit, the center position of the designated block is set as the vertex position.

For example, when the 17th block is designated in the POS1 bit, the vertex position specified by the POS1 bit is the center position of the 17th bit. In this way, when a plurality of blocks are designated by the information (POS1 bit to POSn bit) designating each coordinate position on the coordinate system that is divided into 64 blocks (6 bits), the lines connecting the vertex positions of the blocks serve as the outer edge position of the free space (see FIG. 19A). Here, the coordinate system that is divided into 64 blocks is given as an example. However, various division methods can be used. The coordinate system may be that which is further finely divided or may be that which is divided into fewer parts.

In the present configuration, upon resetting the content of the free space by the process at S4 such as that described above, the information code generation apparatus 2 rearranges the data words (data code words) and the error correction words (error correction code words) generated at S2 based on the above-described arrangement position information (arrangement conversion table). The information code generation apparatus 2 thereby generates a new information code 100 (frame QR). In a configuration in which the content (information specifying the position and shape of the free space and the like) of the free space is recorded in a fixed region as format information, when the new information code 100 (frame QR) is generated, the content of the free space is also updated to reflect the content at S4. In addition, in a configuration in which the content (information specifying the position and shape of the free space and the like) of the free space is recorded in the data recording region as header data, when the new information code 100 (frame QR) is generated, the new information code 100 (frame QR) is generated after the data words (data code words) and the error correction words (error correction code words) generated at S2 have been changed to content (data configuration in which the header data is changed to the content at S4) reflecting the content at S4.

Figure 23:
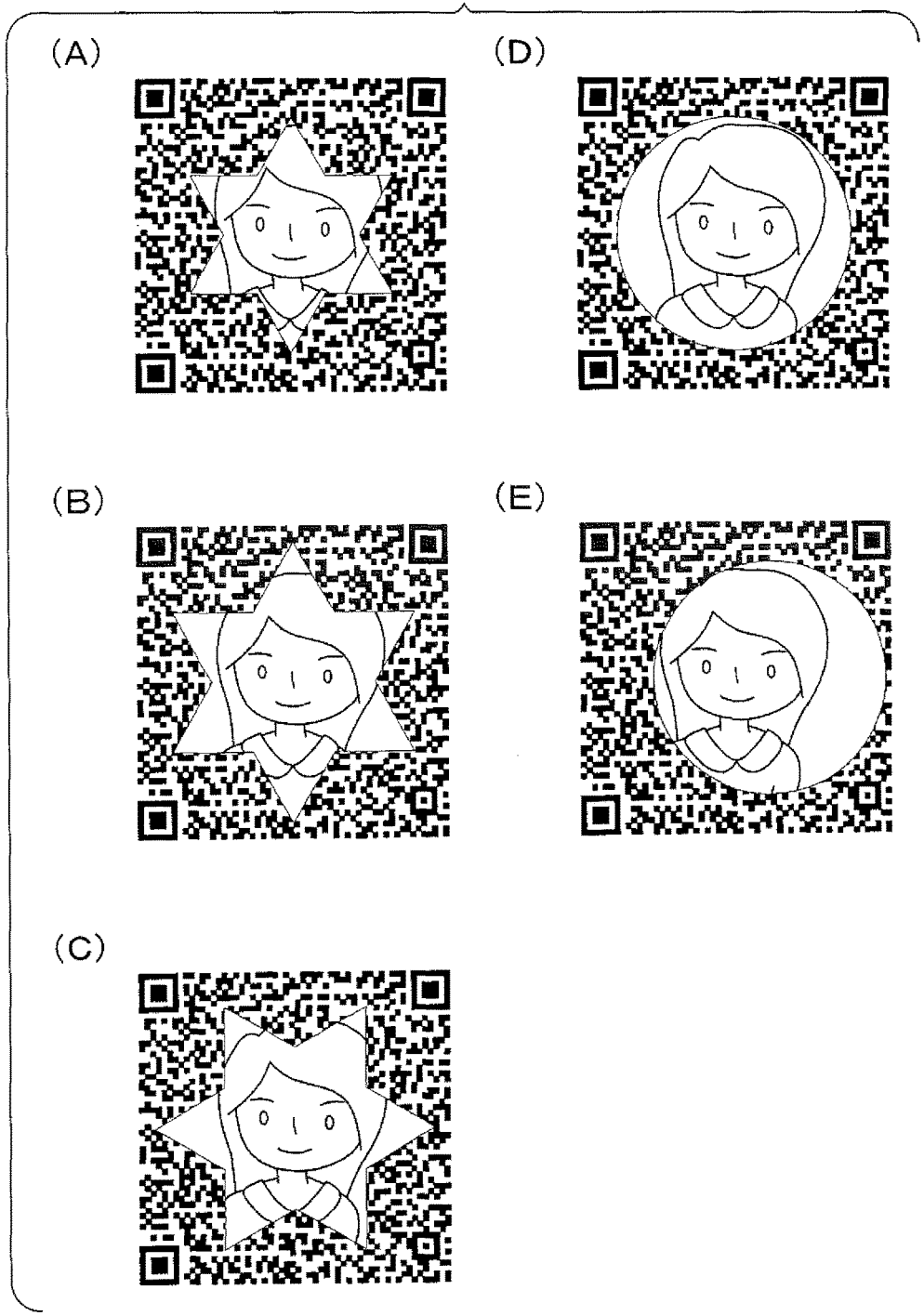
FIG. 23 shows explanatory diagrams illustrating i) examples of image display regions having the same type of outer edge shape and different sizes and ii) examples in which a relative relationship between the free space and the image to be displayed is changed, with the outer edge shapes maintaining the same.

In a method such as that described above, the outer edge shape of the free space can be changed to various shapes as in FIG. 22(A) to (F), the size of the free space can be changed to various sizes as in FIG. 23(A) to (C), and the position of the free space can be changed to various positions as in FIGS. 23(D) and (E). Upon resetting of the free space (canvas shape) at S4, the regenerated information code may be displayed on the display unit 6. In addition, after the information code regenerated in this way is displayed on the display unit 6, the information code generation apparatus 2 may be capable of receiving re-designation of the arrangement of the free space, once or a plurality of times.

The information code generation apparatus 2 may generate and display a new information code based on the received re-designation content. When re-designation of the arrangement of the free space is received a plurality of times, the information code generation apparatus 2 may generate the information code 100 that reflects input each time an input such as that in FIG. 13 is performed, and display the information code 100 each time.

In the present configuration, at least the processes at S4 to S7 correspond to an example of an input receiving process. The input receiving process is a process in which inputted information is received when information designating the arrangement content of the image display region is inputted through the operating unit 4 or the like (input unit) after the code figure is displayed on the display unit 6 by the figure display process. In addition, the control unit 3 corresponds to an example of an input receiving unit.

The control unit 3 functions to receive inputted information when information designating the arrangement content of the image display region is inputted through the operating unit 4 or the like (input unit) after the code figure is displayed on the display unit 6 by the figure display control unit. In addition, at least the processes at S4 to S7 correspond to an example of an input receiving step of receiving inputted information when information designating the arrangement content of the image display region is inputted through the operating unit 4 or the like (input unit) after the code figure is displayed on the display unit 6 at the figure display process. A program for performing the processes in FIG. 8 (a program stored in the storage unit 5 that is readable by the control unit 3 and enables the processes in FIG. 8 to be performed) functions to enable a computer (specifically, the control unit 3 of the generation apparatus 2) to perform the "input receiving step" at S4 to S7.

In addition, at least the process at S4 corresponds to an example of a code generating process that functions to generate an information code in a form in which the image display region is arranged based on the arrangement content received in the input receiving process, and the specification pattern regions and the region to be interpreted are provided in positions other than that of the image display region. The specification pattern region is a region in which a specification pattern that has a shape prescribed in advance is arranged. The region to be interpreted is a region in which data to be interpreted is recorded by a plurality of types of cells.

Specifically, after the code figure is displayed on the display unit in the figure display process at S3, when input information for changing at least either of the shape and size of the outer edge portion of the image display region is received in the input receiving process, in the code generating process, an information code is generated that has a configuration in which the image display region is provided in the new arrangement based on at least either of the shape and size received in the input receiving process, and cells are arranged adjacent to the outer edge portion of the new image display region.

In addition, after the code figure is displayed on the display unit in the figure display process, when input information for changing the position of the outer edge portion of the image display region is received in the input receiving process, in the code generating process, the information code is generated that has a configuration in which the image display region is provided in the new arrangement based on the position received in the input receiving process, and cells are arranged adjacent to the outer edge portion of the new image display region.

Furthermore, after the code figure is displayed on the display unit in the figure display process, when input information for changing the rotation attitude of the outer edge portion of the image display region is received in the input receiving process, in the code generating process, an information code is generated that has a configuration in which the image display region is provided in the new arrangement based on the rotation attitude received in the input receiving process, and cells are arranged adjacent to the outer edge portion of the new image display region.

In addition, in the above-described example, after the code figure including the image display region is displayed on the display unit 6 in the figure display process at S3, when an input to change the outer edge portion of the free space is performed in the input receiving process, in the code generating process, an information code is generated that has a configuration in which the correspondence relationship between the image to be displayed D and the free space in the code figure is changed based on the arrangement content received in the input receiving process. In the example described above, when the relationship between the specification patterns and the image to be displayed D in the code figure generated in the figure display process at S3 is maintained, and the free space is changed as in FIG. 23(A) to (E), the correspondence relationship between the free space and the image to be displayed changes.

In addition, at least the process at S4 corresponds to an example of the code display process in which the information code generated in the code generating process is displayed on the display unit. More specifically, the code display process is a process in which, after the code figure is displayed in the display unit in the figure display process at S3, when input for changing the arrangement content of the image display region is received in the input receiving process, in the code generating process at S4, an information code is generated that has a configuration in which the correspondence relationship between the specification patterns and the image display region in the code figure is changed based on the arrangement content received in the input receiving process.

The control unit that performs the processes in FIG. 8 corresponds to an example of a code generating unit. The control unit functions to generate an information code in a form in which the image display region is arranged based on the arrangement content received in the input receiving process, and the specification pattern regions and the region to be interpreted are provided in positions other than that of the image display region. The specification pattern region is a region in which a specification pattern having a shape prescribed in advance is arranged. The region to be interpreted is a region in which data to be interpreted is recorded by a plurality of types of cells. In addition, the control unit corresponds to an example of a code display control unit and functions to display the information code generated in the code generating unit on the display unit.

In addition, at least the processes at S4 to S7 correspond to an example of a code generating step of generating an information code in a form in which the image display region is arranged based on the arrangement content received at the input receiving step, and the specification pattern regions and the region to be interpreted are provided in positions other than that of the image display region. The specification pattern region is a region in which a specification pattern having a shape prescribed in advance is arranged. The region to be interpreted is a region in which data to be interpreted is recorded by a plurality of types of cells.

A program for performing the processes in FIG. 8 (a program stored in the storage unit 5 that is readable by the control unit 3 and enables the processes in FIG. 8 to be performed) functions to enable a computer (specifically, the control unit 3 of the generation apparatus 2) to perform the "code generating step" at S4 to S7. In addition, at least the processes at S4 to S7 correspond to an example of a code display step of displaying the information code generated at the code generating step on the display unit. A program for performing the processes in FIG. 8 (a program stored in the storage unit 5 that is readable by the control unit 3 and enables the processes in FIG. 8 to be performed) functions to enable a computer (specifically, the control unit 3 of the generation apparatus 2) to perform the "code display step" at S4 to S7.

In addition, at least the process at S4 corresponds to an example of a re-receiving process. The re-receiving process is a process in which, after the information code generated in the above-described code generating process is displayed on the display unit 6 in the above-described code display process, when re-input of information designating the arrangement content of the image display region (such as re-input for changing the position, shape, rotation attitude, and the like of the outer edge portion of the free space) is performed once or a plurality of times through the operating unit 4 or the like (input unit), the re-inputted information is received. In addition, the process at S4 corresponds to an example of a regenerating process.

The regenerating process is a process in which, when the re-inputted information is received once or a plurality of times in the above-described re-receiving process, the information code is generated again in a form in which the image display region is provided in an arrangement based on at least the newest re-inputted information, and the specification pattern regions and the region to be interpreted are provided in positions other than that of the image display region.

Specifically, each time re-inputted information is received in the re-receiving process, an information code is regenerated in a form in which the image display region is provided in an arrangement based on received re-inputted information, and the specification pattern regions and the region to be interpreted are provided in positions other than that of the image display region. Furthermore, the process at S4 corresponds to an example of a re-display process. The re-display process is a process in which, when the information code reflecting the newest re-inputted information is generated in the regenerating process, the generated information code is displayed on the display unit. Specifically, each time the information code reflecting the re-inputted information is regenerated in the regenerating process, the regenerated information code is displayed on the display unit.

After S4, the information code generation apparatus 2 performs a process for receiving the setting of the cell shape (S5). In this process, the information code generation apparatus 2 receives input that designates any cell shape among a plurality of types of cell shapes provided in advance as in FIG. 25(A) to (E). The information code generation apparatus 2 regenerates the information code 100 such as to change the cell shape of the newest information code 100 that is currently generated to the cell shape designated by the input. For example, an information code such as that in FIG. 26 is generated before the process at S5 is performed.

Figure 27:
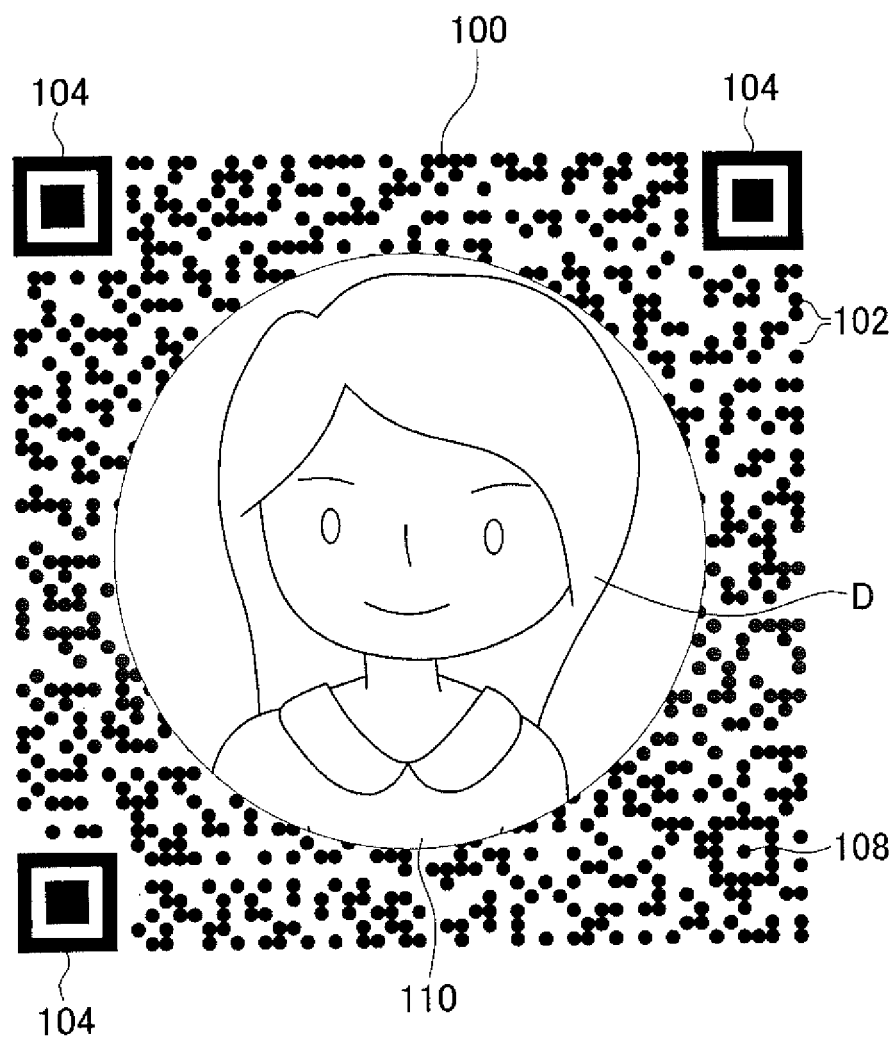
FIG. 27 is an explanatory diagram illustrating an example having a different cell shape from the information code of FIG. 26.

In the process at S5, when a cell shape such as that in FIG. 25(B) is designated by input to the operating unit 4, the information code generation apparatus 2 reflects the designation in the information code and generates an information code such as that in FIG. 27. Then, the information code generation apparatus 2 displays the information code 100 that has been regenerated in this way on the display unit 6. In addition, upon displaying the information code 100 that has been regenerated in this way on the display unit 6, the information code generation apparatus 2 may receive a re-input (that is, a re-designation of the cell shape) of the cell shape through the operating unit 4, and may generate and display a new information code 100 based on the received re-designation content.

Figure 26:
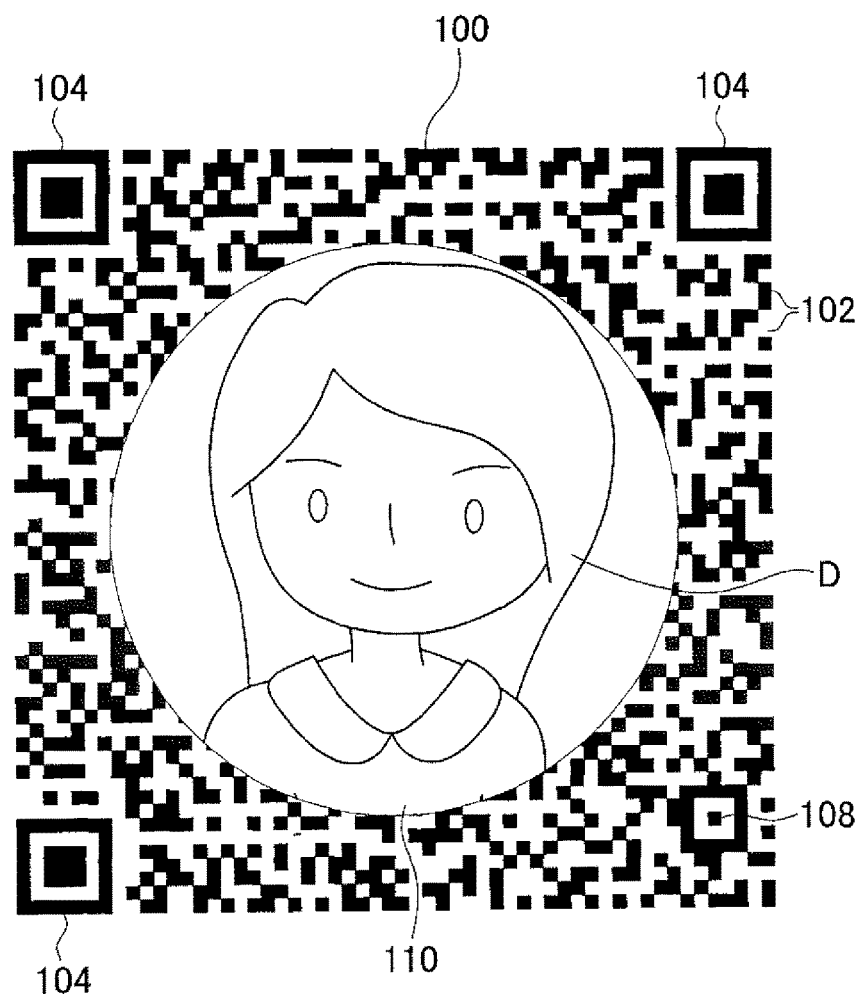
FIG. 26 is an explanatory diagram illustrating an example of the information code generated in the information code generation apparatus according to the first embodiment.

For example, after regenerating and displaying the information code 100 such as that in FIG. 27, when a cell shape such as that in FIG. 25(A) is re-designated by input to the operating unit 4, the information code generation apparatus 2 reflects the designation in the information code 100, and regenerates and displays an information code such as that in FIG. 26.

In this way, in the present configuration, the process at S5 also corresponds to an example of the code generating process. Specifically, after the code figure is displayed on the display unit in the figure display process at S3, when shape designation information that designates the shape of the cell is received through the input unit, in the code generating process, an information code is generated that has a configuration in which the shape of the cells arrayed in the periphery of the image display region is the shape designated by the shape designation information.

After S5, the information code generation apparatus 2 performs a process for receiving the setting of the shape of a specification pattern (such as a position detection pattern) (S6). In this process, the information code generation apparatus 2 receives input for designating any shape among a plurality of types of shapes for the position detection pattern provided in advance as in FIG. 28(A) to (F). Then, the information code generation apparatus 2 regenerates the information code such as to change the shape of the position detection pattern in the newest information code that is currently generated to the shape designated by the input. The information code generation apparatus 2 then displays the information code that has been regenerated in this way on the display unit 6.

Upon displaying the information code that has been regenerated in this way on the display unit 6, the information code generation apparatus 2 may receive a re-designation of the shape of the position detection pattern, and generate and display a new information code based on the received re-designation content.

In this way, in the present configuration, the process at S6 also corresponds to an example of the code generating process. Specifically, after the code figure is displayed on the display unit in the figure display process at S3, when design designation information that designates at least any of the shape, pattern, and color of a specification pattern is inputted through the input unit, in the code generating process at S6, an information code is generated that has a configuration in which the design of the specification pattern is the design designated by the design designation information.

After S6, the information code generation apparatus 2 performs a process for receiving the setting of color and transparency level (S7). In this process, the information code generation apparatus 2 receives designation of the transparency level of all dark colored cells or some of the dark colored cells as in FIG. 30. In addition, the information code generation apparatus 2 receives designation of the respective colors of the dark colored regions and the light colored regions of the specification patterns, the cell array region excluding the specification patterns, and the boundary portion of the free space. Regarding color, for example, as in FIG. 29, a plurality of candidate colors are provided in advance. Any of the colors can be designated.

A plurality of candidate colors can also be mixed to create a new color, as in the lower portion in FIG. 29. Then, when designation of the respective colors of the dark colored regions and the light colored regions of the specification patterns, the cell array region excluding the specification patterns, and the boundary portion of the free space, and designation of the transparency level are received, the information code generation apparatus 2 changes the newest information code that has been generated up to the current point at which the process at S7 is performed, to reflect the content designated by the input, and regenerates the information code.

Figure 31A:
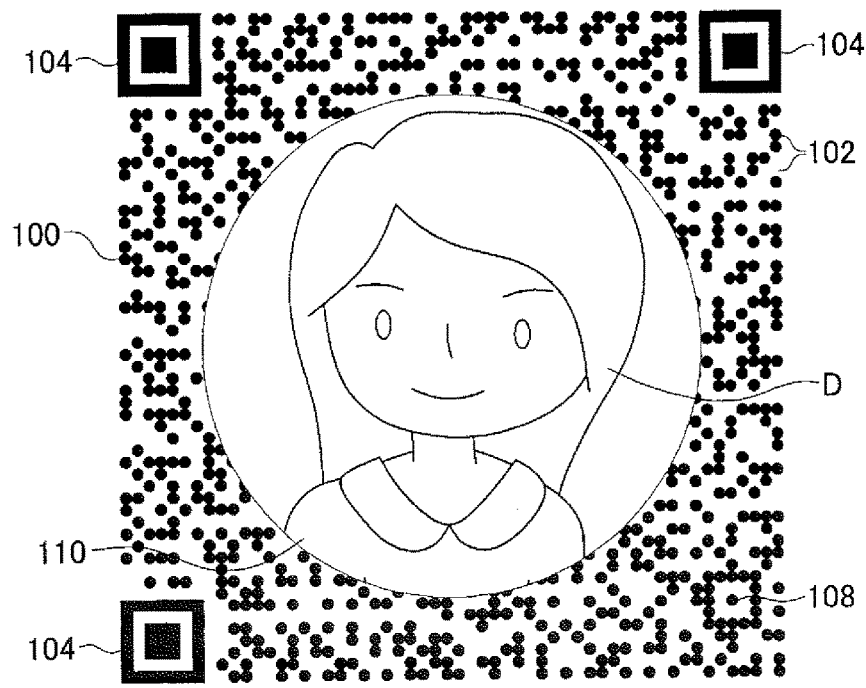
FIGS. 31A and 31B are explanatory diagrams illustrating examples in which the color of the cells is changed after the information code in which circular cells are arrayed is generated.
Figure 31B:
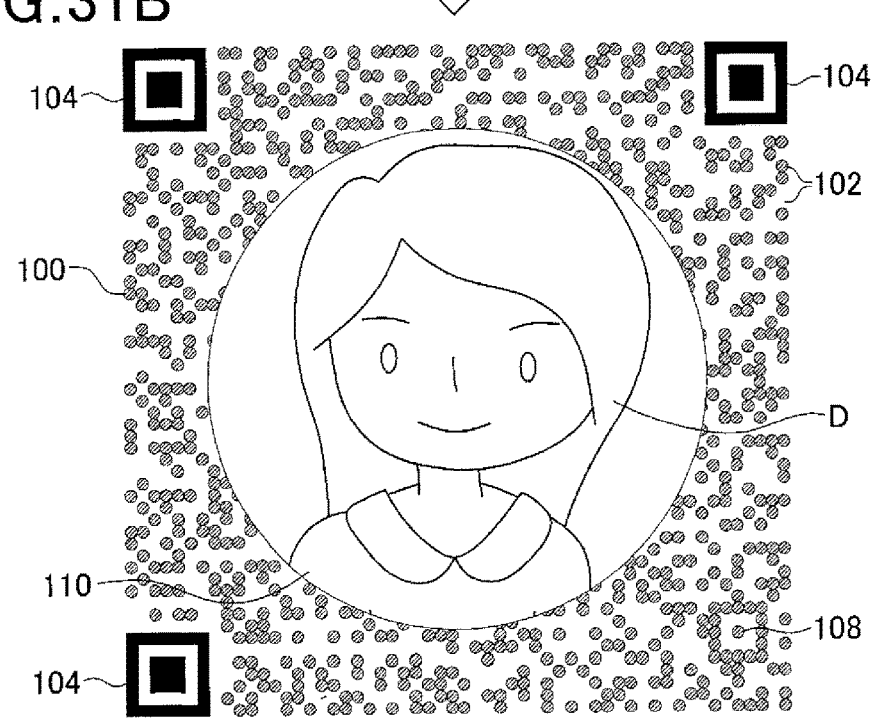

For example, when an information code such as that in FIG. 31A is generated before the process at S7 is performed and designation is performed to change the content of the cell array region excluding the specification patterns in the process at S7, the information code generation apparatus 2 reflects the designation in the information code and regenerates an information code such as that in FIG. 31B.

Figure 32A:
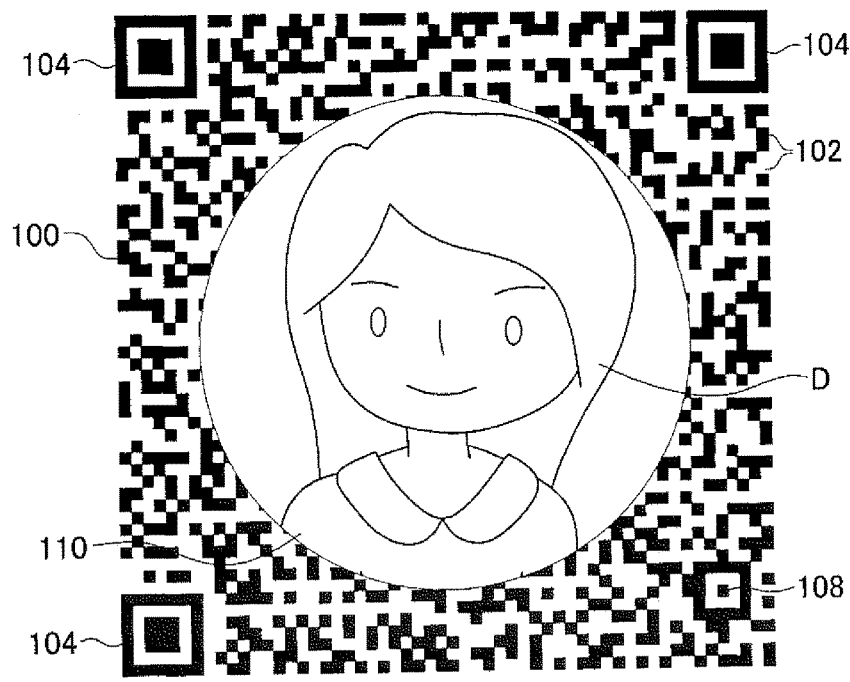
FIGS. 32A and 32B are explanatory diagrams illustrating an example in which the color of the cells is changed after the information code in which rectangular cells are arrayed is generated.
Figure 32B:
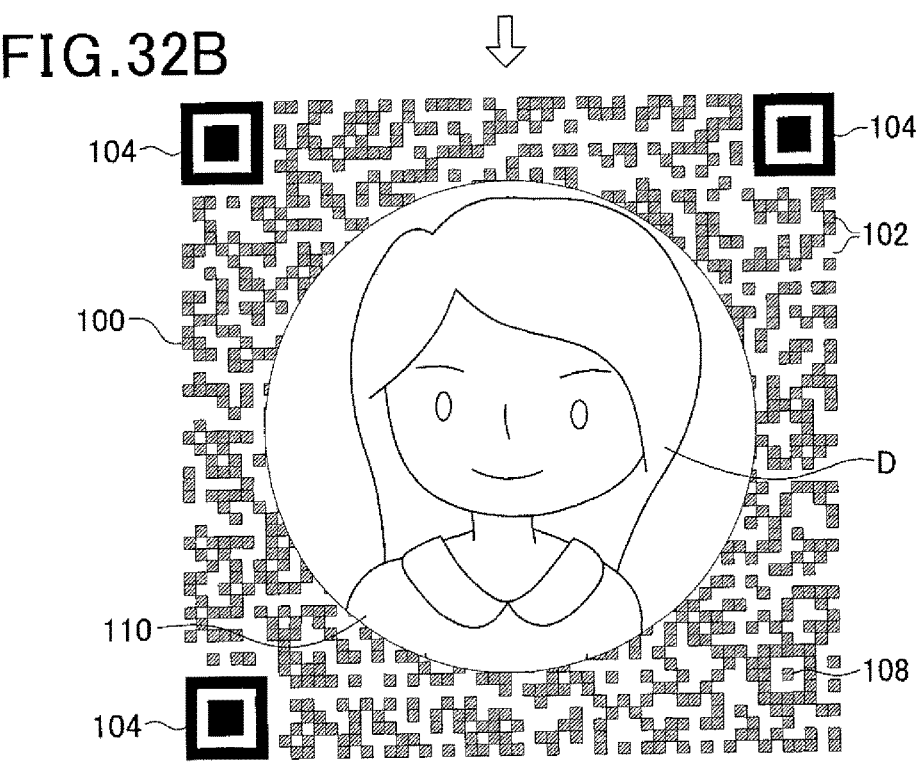

Alternatively, when an information code such as that in FIG. 32A is generated before the process at S7 is performed and designation is performed to change the content of the cell array region excluding the specification patterns in the process at S7, the information code generation apparatus 2 reflects the designation in the information code and regenerates an information code such as that in FIG. 32B. When the information code is regenerated at S7 in this way, the information code generation apparatus 2 displays the regenerated information code on the display unit 6.

In addition, after displaying the information code that has been regenerated in this way on the display unit 6, the information code generation apparatus 2 may receive a re-designation of the color and transparency level, and generate and display a new information code based on the received re-designation content. In addition, in FIG. 30, the respective colors and transparency levels of the dark colored cells (dark region) and the light colored cells (light region) in the specification patterns can be collectively designated as FP Cell. However, a position within the specification pattern region can be partially designated, and the color and transparency level of the designated portion can be changed.

In addition, in FIG. 30, the respective colors and transparency levels of the dark colored cells (dark region) and the light colored cells (light region) within the code region, excluding the specification pattern regions and the free space, can be collectively designated as Data Cell. However, a position within the cell array region such as this can be partially designated, and the color and transparency level of the designated portion can be changed.

In this way, in the present configuration, the process at S7 also corresponds to an example of the code generating process. After the code figure is displayed on the display unit 6 in the figure display process at S3, when transparency level designation information that designates the transparency level is inputted through the operating unit 4 (input unit), in the code generating process at S7, an information code is generated that has a configuration in which the transparency level of at least any of a specification pattern or cells excluding the specification patterns arranged in the periphery of the image display region is set to the transparency level that is designated in the transparency level designation information.

In the present configuration, when cells and the image to be displayed overlap, only the cells are displayed in this area when the transparency level of the cells is low. As the transparency level of the cells increases, the image to be displayed that is overlapping with the cells in this area becomes more clearly displayed. In addition, after the code figure is displayed on the display unit in the figure display process at S3, when color designation information that designates the color of the cells in any position is inputted through the input unit, in the code generating process, an information code is generated that has a configuration in which the color of the cells in the position designated by the color designation information in the periphery of the image display region is set to the color designated in the color designation information.

After completing the processes from S1 to S7 in this way, the information code generation apparatus 2 displays the ultimately generated information code 100 on the display unit (S8). The information code generation apparatus 2 may receive a selection regarding whether or not to perform resetting of the code content after the information code 100 is displayed at S8. When an instruction to perform resetting of the code content is issued, the information code generation apparatus 2 may again perform the processes at S4 and subsequent steps.

Figure 33:
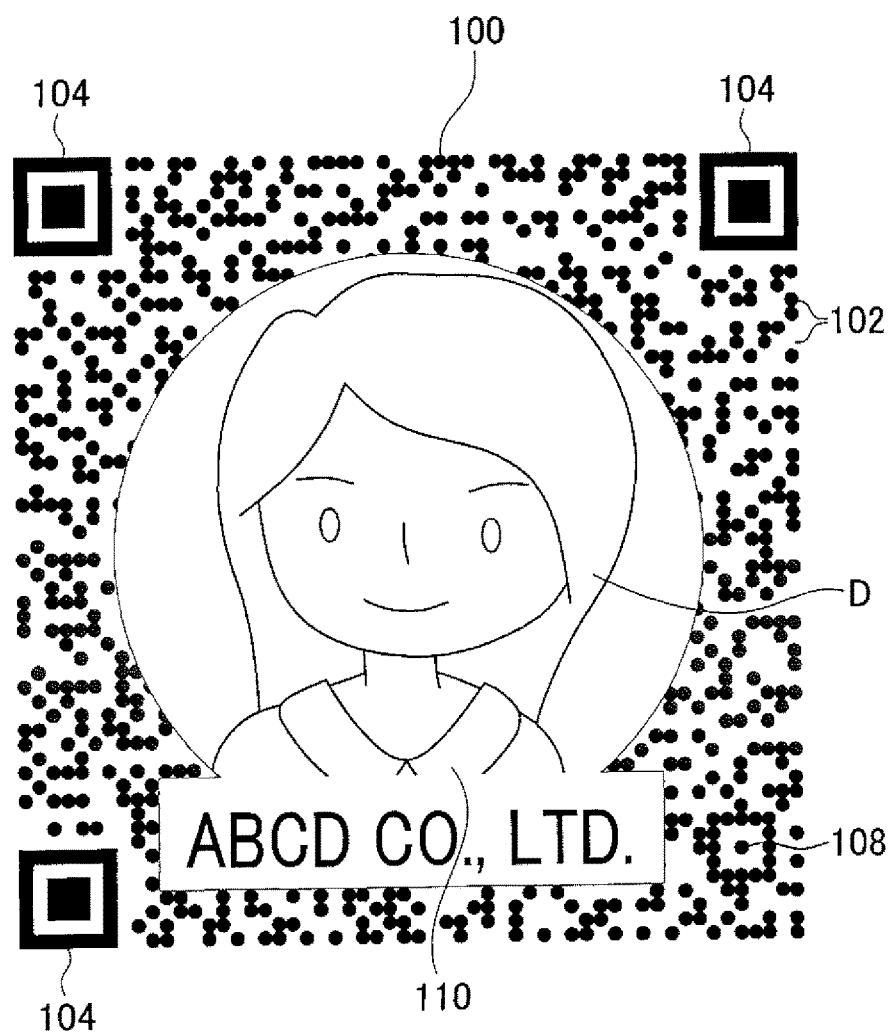
FIG. 33 is an explanatory diagram illustrating an example of the information code in which a plurality of image display regions is provided.

In addition, in the above-described example, an example in which a single free space (that is, a single image display region) is present is many described. However, a plurality of free spaces may be present as in FIG. 33. In this case as well, all that is required is that the position of each free space can be specified, and the user can designate the positional relationship between the free spaces. In the present configuration, the space between the center positions of two free spaces can be designated as "pair spacing". However, the shape, center, size, and rotation values shown in FIG. 13 can be designated for each free space. In this case, the plurality of images to be respectively arranged in the free spaces can be acquired at S3.

In a manner similar to that in the above-described example having a single free space, the arrangement of the image to be displayed that is arranged in each free space may be prescribed, and the shape and position of each free space may be prescribed. In this way, in the present configuration, when data for a plurality of images to be displayed is acquired in the image acquiring process, in the figure display process, a code figure that is configured to be provided with respective image display regions in which the plurality of images to be displayed are at least partially presented can be displayed on the display unit.

Then, after the code figure is displayed on the display unit in the figure display process, when an input designating the correspondence relationship between the plurality of image display regions is received in the input receiving process, in the code generating process, an information code is generated that has a configuration in which the correspondence relationship between the plurality of image display regions is prescribed based on the correspondence relationship received in the input receiving process.

(Information Code Reading Process)

Figure 34:
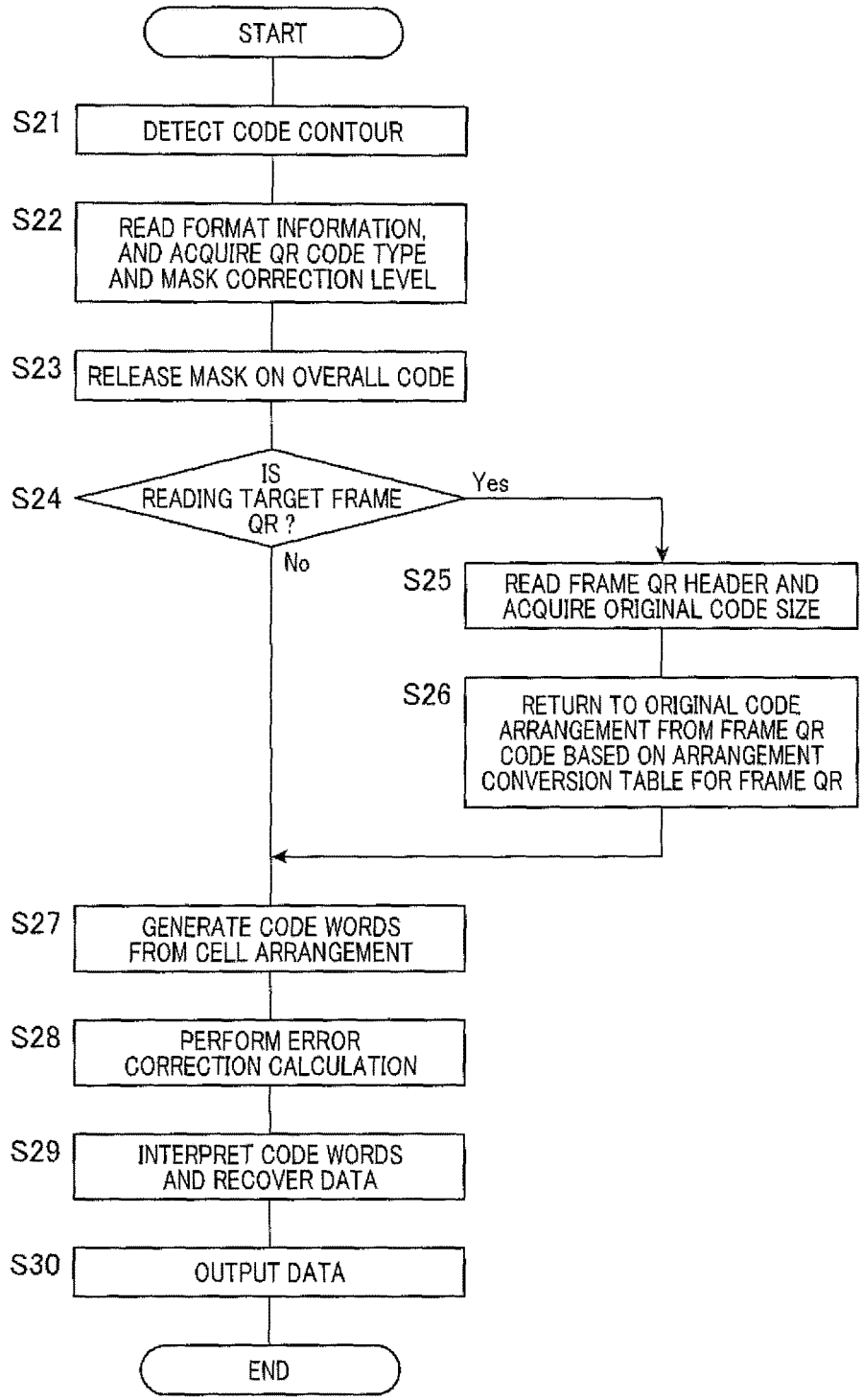
FIG. 34 is a flowchart exemplarily illustrating a flow of reading the information code in the information code reading apparatus that configures the information code usage system of FIG. 1.

Next, a process performed when the information code reading apparatus 10 in FIG. 2 reads the information code shown in the right-hand drawings in FIG. 1 and FIG. 5, and the like will be described. The reading process in FIG. 34 is performed when, for example, the user performs a predetermined operation (such as operating the operating switch 42). First, as shown in S21 in FIG. 34, the information code reading apparatus 10 images the information code 100 and acquires an image of the information code 100.

In addition, the information code reading apparatus 10 detects the contour of the information code 100. Specifically, the information code reading apparatus 10 detects the position detection patterns 104 by a publicly known method (a publicly known method used for QR codes), and detects the contour of the information code 100 by a publicly known method used for QR codes. The light receiving sensor 23 corresponds to an example of an "imaging unit" and functions to image the information code 100 generated by the information code generation apparatus 2.

After S21, the information code reading apparatus 10 interprets information (format information) in a predetermined position of the information code 100 and acquires the type and the mask correction level of the information code (S22). As described above, if the check digit matches when the mask process is released based on the above-described specific mask (mask for frame QR) and the information recorded in a predetermined position 105 is interpreted, the information code reading apparatus 10 can identify that the type is that of the information code 100 (the type having the free space 110).

The information code reading apparatus 10 can also acquire the error correction level and the mask number included in the format information. Then, the information code reading apparatus 10 releases the mask on the overall code (specifically, the code word region) based on the mask number included in the format information acquired at S22 (S23). When the reading target is the information code 100 that has the free space 110 (that is, when mask release using the above-described specific mask (the mask for frame QR) is successful), the information code reading apparatus 10 proceeds to Yes at S24.

The information code reading apparatus 10 identifies the original code size (the model number and format of the other type of code 120) by interpreting the header data (frame QR header: FIG. 3) provided at the head of the data words (S25). The information code reading apparatus 10 then returns the arrangement to that of the original code (the other type of code 120) such as that shown in the left-hand drawing in FIG. 5, from the information code 100 such as that shown in the right-hand drawing in FIG. 5, based on an arrangement conversion table similar to that in FIG. 5 (S26). Specifically, the information code reading apparatus 10 rearranges the respective code words in the arrangement candidate positions in the information code 100 to the arrangement positions within the other type of code 120 respectively associated with the arrangement position candidate positions in the arrangement conversion table.

When determined No at S24 or after S26, the information code reading apparatus 10 identifies and generates each recorded code word from the cell arrangement (the cell arrangement of a QR code that is the reading target when the information code reading apparatus 10 proceeds to No at S24, and the cell arrangement of the other type of code 120 arranged at S26 when after S26) (S27). Then, the information code reading apparatus 10 performs an error correction calculation by a publicly known method based on the error correction code words in the error correction code recording region and interprets the code words in the data recording region (S29). The information code reading apparatus 10 then outputs the data interpreted at S29 by display on the display unit, data transmission, printing, or the like (S30). As the process at S30, the data interpreted at S29 may be output as is or other processes may be added.

In addition, at the time of the reading process in FIG. 34, the information code reading apparatus 10 can acquire information (information specifying the free space) such as that in FIG. 15 and FIG. 16 by reading the format information. As a result of the information (FIG. 15 and FIG. 16) specifying the free space such as this, the specific position of the free space can be identified. Therefore, for example, when the inside of the free space is analyzed (such as by image recognition, image clipping, or another analysis process), the free space can be accurately identified based on the detailed position information of the free space such as this.

In addition, the method used in the reading process is not limited to the above-described example. For example, after recognizing the position detection patterns 104, the information code reading apparatus 10 may identify the specific position of the free space based on the format information and sequentially interpret only the code word regions that do not include the free space, among the code word candidate regions. The regions of all of the code words are determined in advance and can be known by the reading apparatus 10. Therefore, as long as the specific position of the free space can be identified, the reading apparatus 10 can identify the code word regions that do not include the free space. Therefore, the code word regions such as these may be sequentially interpreted.

(Main Effects of the Present Configuration)

In the present configuration, the free space that is a region in which the data to be interpreted is not recorded by cells can be provided in a position other than that of the specification pattern regions within the code region. Convenience can be further improved. In particular, because the free space is a region in which the data to be interpreted is not recorded, limitations attributed to the data recording region can be minimized when the free space is configured. Furthermore, the shape of the free space is determined by at least either of the method in which the shape is selected from a plurality of candidate shapes provided in advance and the method in which the shape is set based on shape designation information inputted to the information code generation apparatus from outside.

Figure 18:
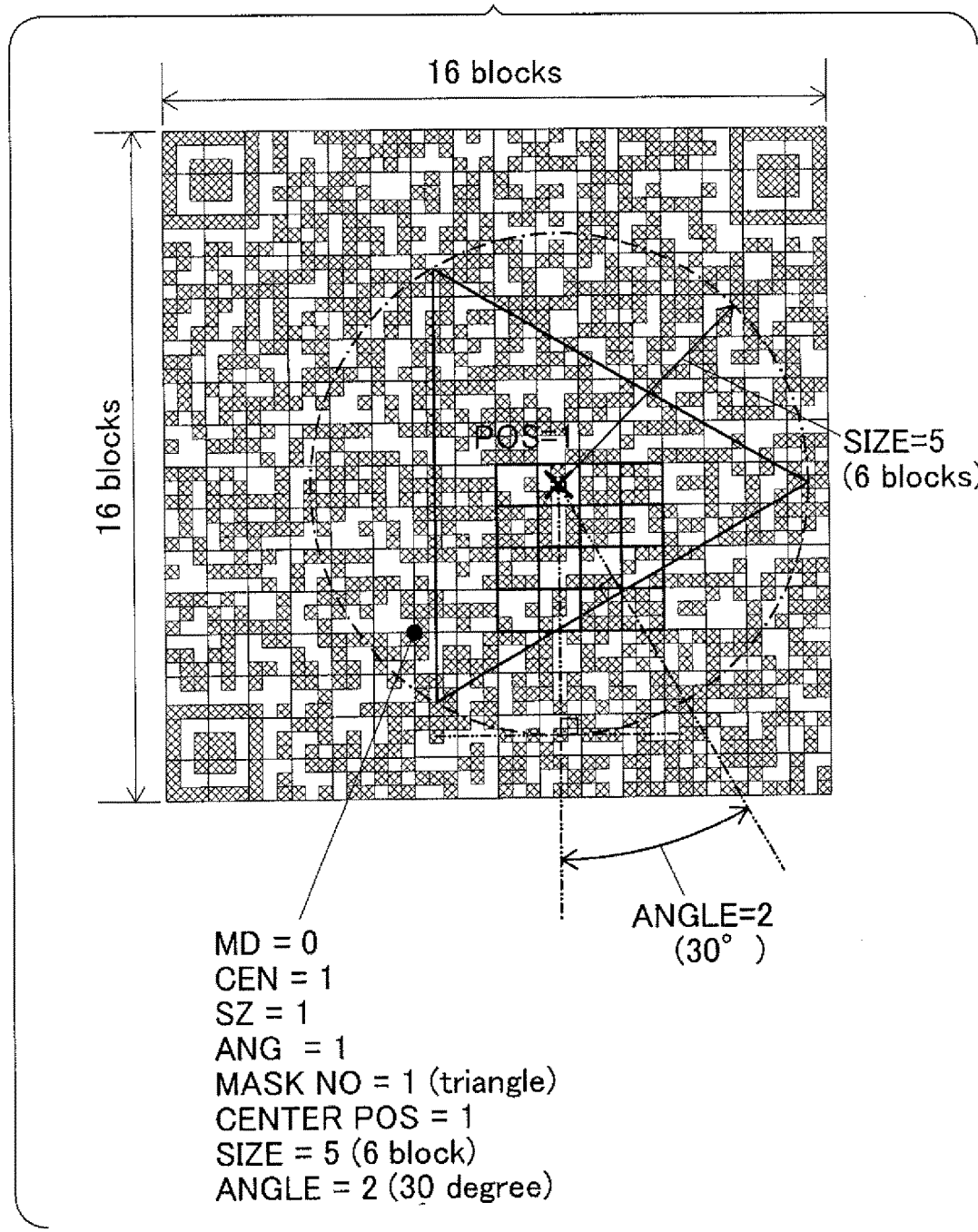
FIG. 18 is an explanatory diagram conceptually describing a method of setting the free space in the fix mode.

Therefore, the shape of the free space is not set to a uniform fixed shape and the degree of freedom in selection of the shape of the free space can be improved. As a result, the shape of the free space can be more easily matched to the display content within the free space. Furthermore, a more efficient data arrangement becomes possible. For example, when a free space such as that in FIG. 18 is uniformly used for a display figure such as that in FIG. 18, this configuration is inefficient in terms of data recording. However, in the present configuration, for example, an efficient arrangement matching the design such as in FIG. 19A, FIG. 19B, and FIG. 20 becomes possible. Data can be more efficiently recorded.

In addition, the information code 100 in which a region other than the data recording region, the error correction code recording region, and the specification pattern regions is secured within the code region can be generated. In particular, the free space 110 is not subjected to error correction based on the error correction code recording region. An error correction code is not required to be set for the free space 110. Therefore, the error correction codes can be efficiently and effectively added for the data recording region.

In addition, the information code generation apparatus 2 includes: a data acquiring unit that acquires data to be interpreted; an arrangement position information recording unit that records arrangement position information specifying respective arrangement positions when a plurality of data words expressing the data to be interpreted are arranged in the code region; and a data recording region generating unit that generates a data recording region such that, when the free space 110 is provided within the code region, format information is recorded in a specific format configuration in a predetermined position within the code region and each data word expressing the data to be interpreted, acquired by the data acquiring unit, is arranged based on the arrangement position information recorded in the arrangement position information recording unit.

Meanwhile, the information code reading apparatus 10 includes: a correspondence information recording unit that records correspondence information that is information corresponding to the arrangement position information recorded in the arrangement position information recording unit and is information specifying the respective arrangement positions of a plurality of data words in the code region; a determining unit that determines whether or not a predetermined position in the code region has a specific format configuration when the information code 100 is imaged by an imaging unit; and an interpreting unit that identifies the position of each data word within the code region based on the correspondence information recorded in the correspondence information recording unit and interprets the data to be interpreted when the determining unit determines that the predetermined position has a specific format configuration.

In this configuration, the information code reading apparatus 10 recognizes the format configuration of the predetermined position 105 by the determining unit. As a result, the information code reading apparatus 10 can determine whether or not the reading target is the characteristic information code 100 (the information code 100 including the free space 110) generated by the information code generation apparatus 2. When determined that the predetermined position 105 has the specific format configuration, the information code reading apparatus 10 can identify the position of each data word within the code region based on the information (correspondence information) enabling identification of the respective arrangement positions of the plurality of code words in the code region, and interpret the data to be interpreted.

In addition, when the free space 110 is to be provided within the code region, the data recording region generating unit of the information code generation apparatus 2 configures the cell array of the predetermined position 105 in a state in which a predetermined type of mask pattern is reflected. Then, when the information code 100 is imaged by the imaging unit, the determining unit of the information code reading apparatus 10 determines whether or not the predetermined type of mask pattern is reflected in the predetermined position 105. The interpreting unit of the information code reading apparatus 10 interprets the data to be interpreted under a condition that the predetermined type of mask pattern is reflected in the predetermined position 105.

As a result of this configuration, whether or not the reading target is the characteristic information code 100 (the information code 100 including the free space 110) generated by the information code generation apparatus 2 can be determined with certainty, by the type of mask pattern applied to the predetermined position 105. The "specific format configuration" can be more easily actualized while suppressing data volume of the format information.

In addition, the arrangement position information (correspondence information) is information that associates and prescribes each data word in sequence when the data to be interpreted is expressed by a plurality of data words and each arrangement position within the code region of each data word in sequence. Specifically, the arrangement position information is information that, when the data words in sequence presented in the respective arrangement positions in the code region are expressed in another type of code 120 that differs from the information code 100, determines the respective corresponding positions within the other type of code 120.

Then, when the determining unit determines that the predetermined position 105 has the specific format configuration, the interpreting unit interprets the other type of code 120 in a configuration in which the data words in sequence that are presented in respective arrangement positions in the code region are converted to respective corresponding positions within the other type of code 120 prescribed by the correspondence information. As a result of this configuration, the characteristic information code 100 (the information code 100 including the free space 110) can be favorably read using the scheme for reading the other type of code 120.

In addition, in the present configuration, information designating the arrangement content of the image display region is received after the code figure configured to be provided with the image display region is displayed on the display unit. As a result of this method, the user can designate the manner in which to set the image display region, upon visually grasping the arrangement of the image display region in the code figure that is first displayed. An information code reflecting the designation can then be generated. That is, the user can newly designate the arrangement of the image display region upon visually grasping the initial state of the image display region within the code region. Therefore, the arrangement of the image display region in the generated information code can be more easily matched to the desires of the user.

In addition, in the figure display process, a code figure that has a shape in which the specification patterns are provided in predetermined positions within the code boundary portion and the image display region is provided in a position differing from that the specification patterns is displayed on the display unit. After the code figure is displayed on the display unit in the figure display process, when an input for changing the arrangement content of the image display region is received in the input receiving process, in the code generating process, an information code is generated that has a configuration in which the correspondence relationship between the specification patterns and the image display region in the code figure is changed based on the arrangement content received in the input receiving process.

In this invention, the user becomes capable of designating the manner in which the change the correspondence relationship between the specification patterns and the image display region, upon visually grasping the correspondence relationship from the code figure that is first displayed. In this way, after the relationship between a figure (specification pattern) that serves as an indicator and the image display region is displayed in advance, the correspondence relationship of the image display region to the figure (specification pattern) can be changed by input. As a result, the balance between the image display region and the overall code, and the balance between the image display region and the specification patters can be more easily matched to the desires of the user.

In addition, a re-receiving process is included in which, after the information code generated in the code generating process is displayed on the display unit in the code display process, when re-input of information designating the arrangement content of the image display region is performed once or a plurality of times through the input unit, the re-inputted information is received. A regenerating process is included in which, after the re-inputted information is received once or a plurality of times in the re-receiving process, the information code is regenerated in a form in which the image display region is provided in the arrangement based on at least the newest re-inputted information, and the specification pattern regions and the region to be interpreted are provided in positions other than that of the image display region. A re-display process is included in which, when the information code reflecting the newest re-inputted information is generated in the regenerating process, the generated information code is displayed on the display unit.

In this invention, after the arrangement of the image display region is designated and the information code is generated, the user can re-designate the arrangement of the image display region upon visually grasping the display of the generated information code. That is, the user can actually view the information code generated to reflect the desires of the user and further correct the arrangement of the image display region. Therefore, a configuration that more closely matches the desires of the user can be more easily acquired.

In addition, in the regenerating process, each time the re-inputted information is received in the re-receiving process, the information code is regenerated in a form in which the image display region is provided in an arrangement based on the received re-inputted information, and the specification pattern regions and the region to be interpreted are provided in positions other than that of the image display region. In the re-display process, each time the information code reflecting the re-inputted information is regenerated in the regenerating process, the regenerated information code is displayed on the display unit.

In this invention, after the information code reflecting the desires of the user is generated and displayed, each time an instruction regarding the arrangement of the image display region is issued again, the information code can be regenerated and displayed. As a result of a method such as this, the user can issue an instruction for achieving a more desirable arrangement upon visually confirming the manner in which the arrangement of the image display region has changed by each instruction. Therefore, detailed changes to achieve an arrangement that matches the desires can be more appropriately made.

In addition, in the figure display process, the code figure having a configuration in which cells are arrayed adjacent to the outer edge portion of the image display region is displayed. After the code figure is displayed on the display unit in the figure display process, when input information for changing at least either of the shape and size of the outer edge portion of the image display region is received in the input receiving process, in the code generating process, an information code is generated that has a configuration in which the image display region is provided in a new arrangement based on at least either of the shape and size received in the input receiving process, and cells are arranged adjacent to the outer edge portion of the new image display region.

In this method, when the information code in which the cells are arranged adjacent to the outer edge portion of the information display region is generated, the user can newly designate at least either of the shape and size of the outer edge portion of the image display region while visually grasping the image display region and the cell array in the periphery thereof. Therefore, the arrangement (particularly the size and shape of the outer edge portion of the image display region) of the image display region within the information code, and the shape and size of the contour surrounding the image display region can be more quickly matched to the desires of the user.

In addition, in the figure display process, the code figure having a configuration in which the cells are arrayed adjacent to the outer edge portion of the image display region is displayed. After the code figure is displayed on the display unit in the figure display process, when input information for changing the position of the outer edge portion of the image display region is received in the input receiving process, in the code generating process, an information code is generated that has a configuration in which the image display region is provided in a new arrangement based on the position received in the input receiving process, and cells are arranged adjacent to the outer edge portion of the new image display region.

In this method, when the information code in which the cells are arranged adjacent to the outer edge portion of the information display region is generated, the user can newly designate the position of the outer edge portion of the image display region while visually grasping the image display region and the cell array in the periphery thereof. Therefore, the arrangement (particularly the position of the outer edge portion of the image display region) of the image display region within the information code and the position of the contour surrounding the image display region can be more quickly matched to the desires of the user.

In addition, in the figure display process, the code figure having a configuration in which the cells are arrayed adjacent to the outer edge portion of the image display region is displayed. After the code figure is displayed on the display unit in the figure display process, when input information for changing the rotation attitude of the outer edge portion of the image display region is received in the input receiving process, in the code generating process, an information code is generated that has a configuration in which the image display region is provided in a new arrangement based on the rotation attitude received in the input receiving process, and cells are arrayed adjacent to the outer edge portion of the new image display region.

In this method, when the information code in which the cells are arranged adjacent to the outer edge portion of the information display region is generated, the user can newly designate the rotation attitude of the outer edge portion of the image display region while visually grasping the image display region and the cell array in the periphery thereof. Therefore, the arrangement (particularly the rotation attitude of the outer edge portion of the image display region) of the image display region within the information code and the attitude of the contour surrounding the image display region can be more quickly matched to the desires of the user.

In addition, after the code figure is displayed on the display unit in the figure display process, when input that designates the correspondence relationship between a plurality of image display regions is received in the input receiving process, in the code generating process, an information code is generated that has a configuration in which the correspondence relationship between a plurality of image display regions is prescribed based on the correspondence relationship that is received in the input receiving process.

As a result of this method, when a plurality of image display regions are provided, a positional relationship that more closely reflects the desires of the user can be more easily prescribed.

In addition, in the figure display process, a code figure in which a basic figure and an image to be displayed are presented in an overlapping manner is displayed on the display unit. The basic figure that is provided with the specification pattern regions, the cell array region, and the free space is arranged inside the code boundary portion. The cell array region is a region in which a plurality of types of cells are arrayed in positions other than those of the specification pattern regions. The free space is a region in which cells are not arrayed.

The basic figure and the image to be displayed are overlapped such that at least a portion of the image to be displayed fits within the free space and the outer edge portion of the free space serves as the outer edge portion of the image display region. After the code figure that includes the image display region is displayed on the display unit in the figure display process, when an input to change the outer edge portion of the free space is inputted in the input receiving process, in the code generating process, an information code is generated that has a configuration in which the correspondence relationship between the image to be displayed and the free space in the code figure is changed based on the arrangement content received in the input receiving process.

As a result of this method, a characteristic information code in which a portion within the code region is a region (free space) in which cells are not arranged can be generated. An image can be displayed in the free space of the information code in a manner in which the image is not easily affected by the cells. In addition, when a characteristic information code such as this is generated, the user can newly designate the outer edge portion of the free space (image display region) while visually grasping the free space (image display region) and the cell array in the periphery thereof. Therefore, the correspondence relationship between the image to be displayed and the free space can be more easily matched to the desires of the user.

In addition, in the image acquiring process, an image to be displayed that has a predetermined outer edge shape that is prescribed in advance or designated by input can be acquired. In the figure display process, a code figure is displayed on the display unit in a form in which the specification pattern regions are provided in predetermined positions within the code boundary portion, and the image display region having a predetermined outer edge shape is provided in a position other than those of the specification pattern regions.

After the code figure that includes the image display region having the predetermined outer edge shape is displayed on the display unit in the figure display process, when an input to designate the arrangement content of the image display region having the predetermined outer edge shape is inputted in the input receiving process, in the code generating process, an information code is generated that has a configuration in which the correspondence relationship between the specification patterns and the image display region in the code figure is changed based on the arrangement content received in the input receiving process.

In this method, the user can newly designate the arrangement of the image display region while visually confirming the arrangement of the image to be displayed that has the predetermined outer edge shape. Therefore, the arrangement (such as the balance between the predetermined outer edge shape and the overall code) of the image display region within the information code can be more quickly matched to the desires of the user.

In addition, in the figure display process, a code figure is displayed on the display unit. The code figure has a configuration in which the specification pattern regions, the data recording region, and the free space are provided inside the code boundary portion, and the image display region having a predetermined outer edge shape is provided within the free space. The data recording region is a region in which data to be interpreted is recorded by a plurality of types of cells. The free space is a region in which cells are not arrayed.

After the code figure is displayed on the display unit in the figure display process, when an input to designate the arrangement content of the image display region within the free space is inputted in the input receiving process, in the code generating process, an information code is generated that has a configuration in which the arrangement of the image display region within the free space is changed based on the arrangement content received in the input receiving process, and a plurality of types of cells are arrayed in positions other than that of the image display region that has been changed in the free space.

In this method, a characteristic information code in which a portion within the code region is a region (free space) in which cells are not arranged can be generated. An image can be displayed in the free space of the information code in a manner in which the image is not easily affected by the cells. In addition, when a characteristic information code such as this is generated, the user can newly designate the arrangement of the image display region upon visually confirming the arrangement of the image to be displayed that has the predetermined outer edge shape within the free space.

Therefore, the arrangement of the image display region within the information code can be more quickly matched to the desires of the user.

In addition, after the code figure is displayed on the display unit in the figure display process, when transparency level designation information that designates the transparency level is inputted through the input unit, in the code generating process, an information code can be generated that has a configuration in which the transparency level of at least either of the specification patterns arranged in the periphery of the image display region or cells other than the specification patterns are set to the transparency level designated in the transparency level designation information.

As a result of this method, the transparency level of at least either of the specification patterns and the cells other than the specification patterns can be more easily matched to the desires of the user. In particular, the user can set the transparency level of the specification patterns or the cells other than the specification patterns upon visually grasping the state of the image display region within the code region. Therefore, the balance in transparency levels between the image display region and the periphery can be more easily matched to the desires of the user.

In addition, after the code figure is displayed on the display unit in the figure display process, when the transparency level designation information that designates the transparency level in any position is inputted through the input unit, in the code generating process, an information code is generated that has a configuration in which the transparency level in the position designated in the transparency level designation information in the periphery of the image display region is set to the transparency level designated in the transparency level designation information.

In this method, a position desired by the user can be designated and the transparency level in this position can be set. Therefore, the degree of freedom when the user sets the transparency level can be increased. The transparency level can be more easily matched to the desires of the user.

In addition, after the code figure is displayed on the display unit in the figure display process, when color designation information that designates the color of the cells in any position is inputted to the input unit, in the code generating process, an information code is generated that has a configuration in which the color of the cells in the position designated in the color designation information in the periphery of the image display region is set to the color designated in the color designation information.

In this method, the position desired by the user can be designated and the color of the cells in this position can be set. In particular, the user can set, in further detail, the pattern and color in the periphery of the image display region upon visually grasping the state of the image display region within the code region. Therefore, the balance between the image display region and the pattern and color in the periphery can be more easily matched to the desires of the user.

In addition, after the code figure is displayed on the display unit in the figure display process, when shape designation information that designates the shape of the cell is inputted through the input unit, in the code generating process, an information code is generated that has a configuration in which the shape of the cells arrayed in the periphery of the image display region is the shape designated in the shape designation information.

As a result of this method, the shape of the cells arrayed in the periphery of the image display region can be more easily matched to the desires of the user. In particular, the user can set the cell shape in the periphery of the image display region upon visually grasping the image display region within the code region. Therefore, the balance between the image display region and the pattern and color in the periphery can be more easily matched to the desires of the user.

In addition, after the code figure is displayed on the display unit in the figure display process, when design designation information that designates at least any of the shape, pattern, and color of the specification patterns is inputted to the input unit, in the code generating process, an information code is generated that has a configuration in which the design of the specification pattern regions is the design designated in the design designation information.

As a result of this method, the design of the specification pattern region is more easily matched to the desires of the user. In particular, the user can set the design of the specification pattern upon visually grasping the state of the image display region within the code region. Therefore, the design of the overall code including the image display region and the specification patterns can be more easily matched to the desires of the user.

Second Embodiment

Next, a second embodiment will be described.

An information code usage system according to the second embodiment has the same hardware configuration as that according to the first embodiment. A configuration such as that in FIG. 1 and FIG. 2, described above, is used.

Figure 35A:
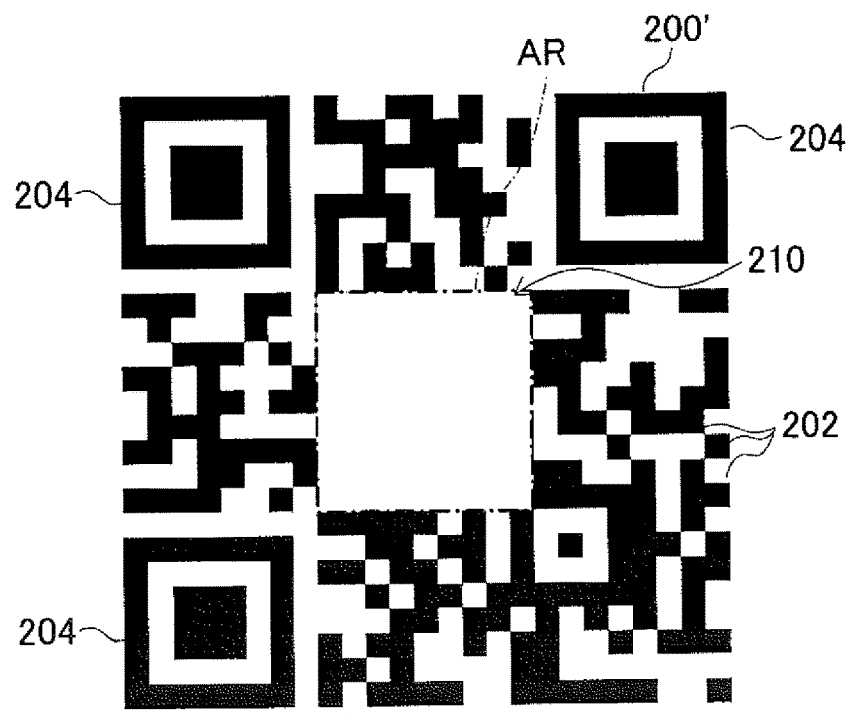
FIGS. 35A and 35B are explanatory diagrams for describing an information code generated in an information code generation apparatus according to a second embodiment.
Figure 35B:
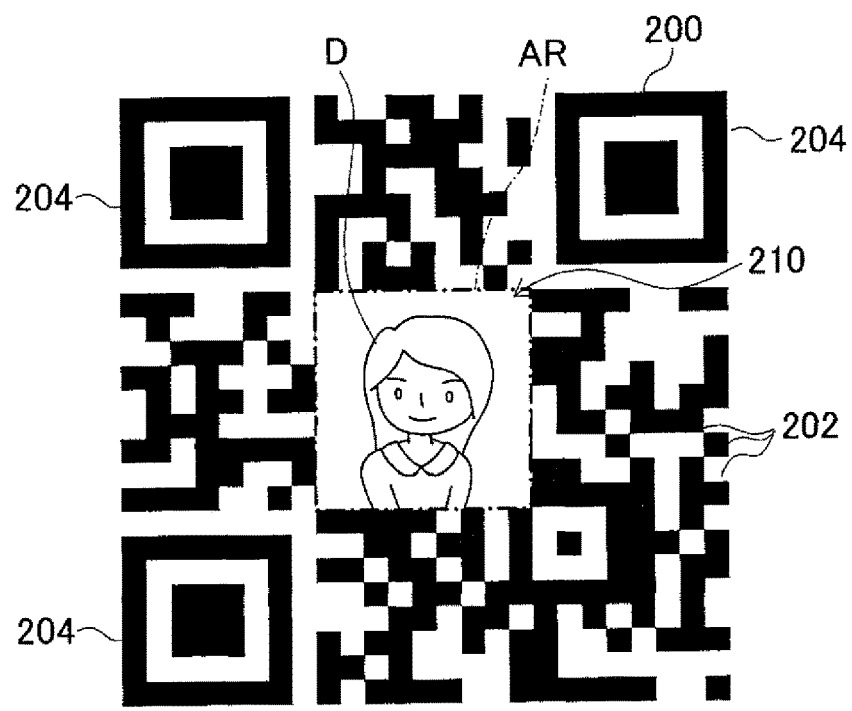

In the information code usage system according to the second embodiment, the information code generation apparatus 2 (see FIG. 1 and the like) generates an information code 200 such as that in FIG. 35B. In this configuration as well, the specification pattern regions and the data recording region are provided within the code region. The specification pattern region is a region in which a specification pattern (such as a position detection pattern 204) that has a shape prescribed in advance is arranged.

The data recording region is a region in which data is recorded by a plurality of types of cells. A free space 210 (i.e., canvas region) having a predetermined size that is larger than the size of a single cell is provided in a position within the code region other than those of the specification pattern regions. The free space 210 is a region in which at least either recording of data or display of a design can be performed by a method differing from the method used to record data in the data recording region. The shape of the free space 210 can be selected by a method similar to that according to the first embodiment.

In this configuration, aside from the configuration of the free space 210, the configuration is that of a publicly known QR code (registered trademark). First, as in FIG. 35A, the specification pattern regions, the data recording region, and an error correction code recording region are provided within the code region. The error correction code recording region is a region in which error correction codes are recorded by a plurality of types of cells. The method for recording data code words in the data recording region and the method for recording error correction code words in the error correction code recording region are the same as those for the publicly known QR code (registered trademark). For example, the arrangement of the position detection patterns 204 within the code region, the arrangement of the data code words within the data recording region, and the arrangement of the error correction code words in the error correction code recording region are set based on a format prescribed by JIS X0510.

However, as in FIG. 35A, an information code 200' is generated in which the code words in a portion of the region is configured as code words expressed only by white cells. An area AR that is expressed only by the white cells in this way serves as the free space 210. As in FIG. 35B, at least any of a figure, a pattern, a color, a design composed of a combination thereof, or information expressed by a single or plurality of symbols is displayed within the free space 210. When a design D is displayed in the free space 210 as in FIG. 35B, although the configuration differs from that of the original data display such as that in FIG. 35A, data error in the free space 210 can be corrected by publicly known error correction using the error correction codes recorded in the error correction code recording region.

In addition, in the information code 200 shown in FIG. 35B, the position of the free space 210 is specified in advance. Therefore, when a design or information is added and displayed within the free space 210, the error position of this display is known in advance. Therefore, the error correction codes within the error correction code recording region can also be configured such that erasure correction is performed with the position of the free space 210 as the error position. In this case, information indicating the position of the free space 210 (position data enabling identification of the position of the free space generated by a method such as that according to the first embodiment or the second embodiment) may be recorded in the data recording region in advance.

Alternatively, information indicating the position of the free space 210 may be recorded within the reading apparatus 10 (FIG. 1) in advance. As a result, the reading apparatus 10 is able to identify the position of the free space 210 (that is, the position of the data code word in which an error has occurred) at the time of reading. The reading apparatus 10 can then perform erasure correction using the error correction codes recorded in the error correction code recording region such as to correct the error in the data code words present in the free space 210 of which the position has been identified in this way.

Third Embodiment

Next, a third embodiment will be described.

An information code usage system according to the third embodiment also has the same hardware configuration as that according to the first embodiment. A configuration such as that in FIG. 1 and FIG. 2, described above, is used.

Figure 36A:
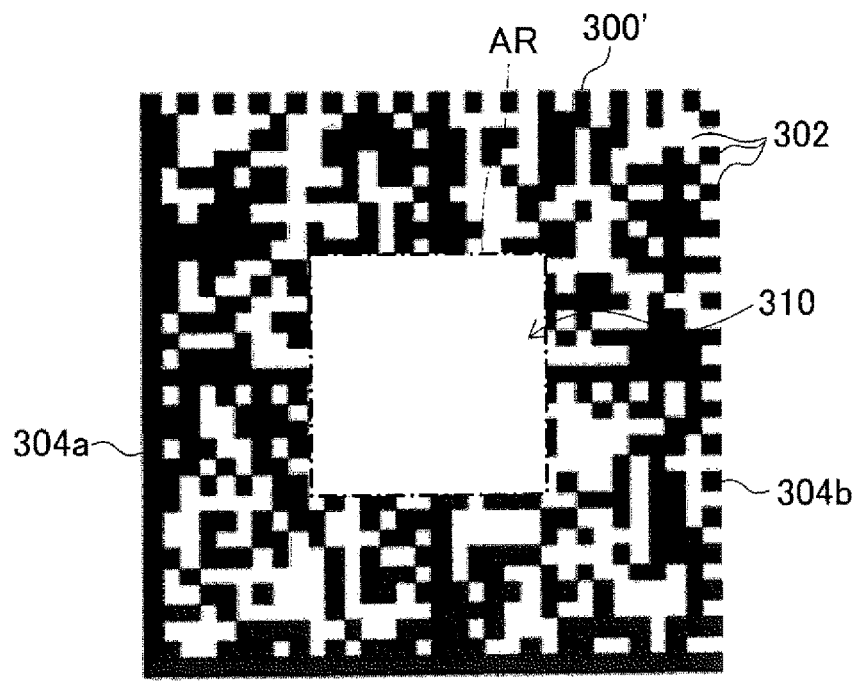
FIGS. 36A and 36B are explanatory diagrams for describing an information code generated in an information code generation apparatus according to a third embodiment.
Figure 36B:
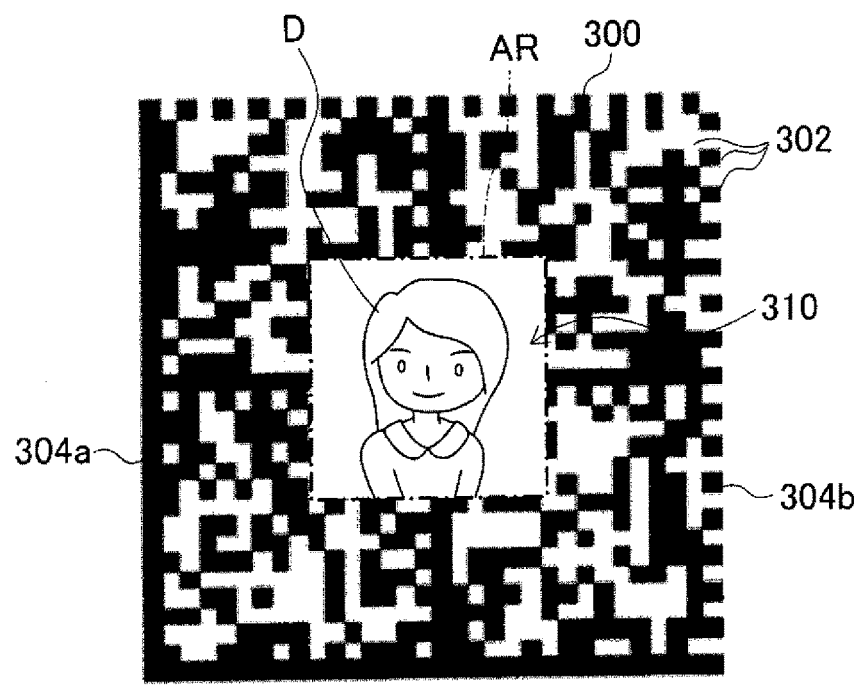

In the information code usage system according to the third embodiment, the information code generation apparatus 2 (see FIG. 1 and the like) generates an information code 300 such as that in FIG. 36B. In this configuration as well, the specification pattern regions and the data recording region are provided within the code region. The specification pattern region is a region in which a specification pattern having a shape prescribed in advance (an L-shaped alignment pattern 304a, and timing cells 304b in which light colored cells and dark colored cells are alternately arranged one cell at a time and forms an L-shaped region along the boundary of the code region) is arranged.

The data recording region is a region in which data is recorded by a plurality of types of cells. A free space 310 (i.e., canvas region) having a predetermined size that is larger than the size of a single cell is provided in a position within the code region other than those of the specification pattern regions. The free space 210 is a region in which at least either recording of data or display of a design can be performed by a method differing from the method used to record data in the data recording region. The shape of the free space 310 can be selected by a method similar to that according to the first embodiment.

In this configuration, aside from the configuration of the free space 310, the configuration is that of a publicly known Data Matrix code. First, as in FIG. 36A, the specification pattern regions, the data recording region, and an error correction code recording region are provided within the code region. The error correction code recording region is a region in which error correction codes are recorded by a plurality of types of cells. The method for recording data code words in the data recording region and the method for recording error correction code words in the error correction code recording region are similar to that for the publicly known Data Matrix code. The arrangement of an alignment pattern 304a and timing cells 304b within the code region, the arrangement of the data code words within the data recording region, and the arrangement of the error correction code words in the error correction code recording region are set based on, for example, the ECC 200 version.

However, as in FIG. 36A, an information code 300' is generated in which the code words in a portion of the region is configured as code words expressed only by white cells. An area AR that is expressed only by the white cells in this way serves as the free space 310. As in FIG. 36B, at least any of a figure, a pattern, a color, a design composed of a combination thereof, or information expressed by a single or plurality of symbols is displayed within the free space 310. When a design D is displayed in the free space 310 as in FIG. 36B, although the configuration differs from that of the original data display such as that in FIG. 365A, data error in the free space 310 can be corrected by publicly known error correction using the error correction codes recorded in the error correction code recording region.

In addition, in the information code 300 shown in FIG. 36B, the position of the free space 310 is specified in advance. Therefore, when a design or information is added and displayed within the free space 310, the error position of this display is known in advance. Therefore, the error correction codes within the error correction code recording region can also be configured such that erasure correction is performed with the position of the free space 310 as the error position. In this case, information indicating the position of the free space 310 (position data enabling identification of the position of the free space generated by a method such as that according to the first embodiment or the second embodiment) may be recorded in the data recording region in advance.

Alternatively, information indicating the position of the free space 310 may be recorded within the reading apparatus 10 (FIG. 1) in advance. As a result, the reading apparatus 10 is able to identify the position of the free space 310 (that is, the position of the data code word in which an error has occurred) at the time of reading. The reading apparatus 10 can then perform erasure correction using the error correction codes recorded in the error correction code recording region such as to correct the error in the data code words present in the free space 310 of which the position has been identified in this way.

Fourth Embodiment

Next, a fourth embodiment will be described. First, a representative example according to the fourth embodiment will be described.

Figure 37:
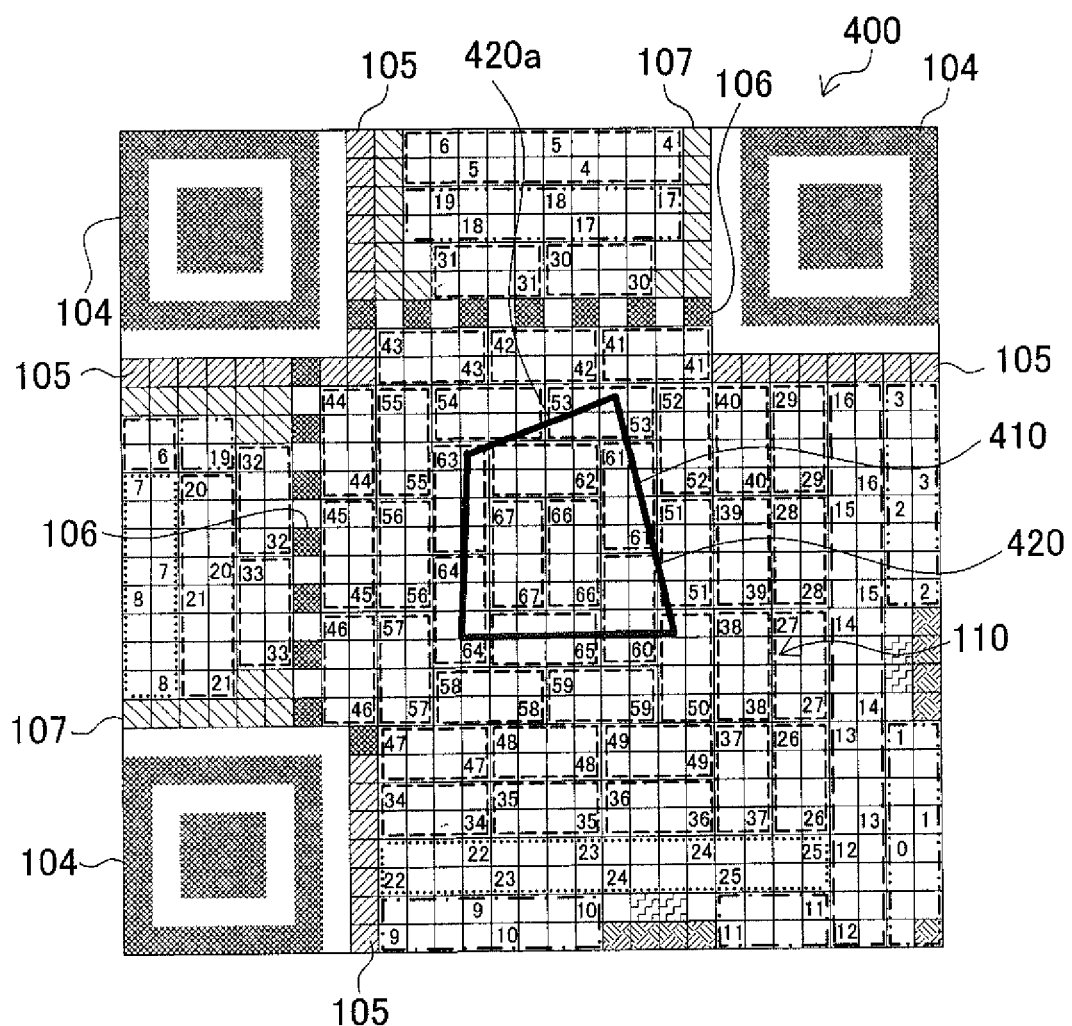
FIG. 37 is an explanatory diagram conceptually describing a structure of an information code used in an information code usage system according to a representative example of a fourth embodiment.

An information code usage system according to the fourth embodiment also has the same hardware configuration as that according to the first embodiment. A configuration such as that in FIG. 1 and FIG. 2, described above, is used. The generation apparatus 2 such as that in FIG. 1 generates an information code 400 (an information code in which cells that serve as units for displaying information are arrayed within a predetermined code region) such as that in FIG. 37. The reading apparatus 10 such as that in FIG. 1 and FIG. 2, can read the generated information code 400. FIG. 37 conceptually shows an arrangement example of the specification pattern regions, format region, model number region, code word regions, and free space in the information code 400 generated in the system according to the fourth embodiment. In the information code 400 shown in FIG. 37, specific cell arrays in the region of the predetermined position 105, the region 107, and each code word region are omitted. However, light colored cells and dark colored cells are arrayed in these regions.

In the information code 400 shown in FIG. 37 as well, the specification pattern regions, the data recording region, and the error correction code recording region are provided within the code region. The specification pattern region is a region in which a specification pattern (such as a position detection pattern 104 or a timing pattern 106) that has a shape prescribed in advance is arranged. The data recording region is a region in which data is recorded by a plurality of types of cells 102. The error correction code recording region is a region in which error correction codes are recorded by a plurality of types of cells 102.

A free space 410 (i.e., canvas region) having a predetermined size that is larger than the size of a single cell 102 is provided in a position within the code region other than those of the specification pattern regions, the data recording region, and the error correction code recording region. The free space 210 is a region in which at least either recording of data or display of a design can be performed by a method differing from the method used to record data in the data recording region. The free space 410 is configured as a region that is not subjected to error correction based on the error correction codes. In the example in FIG. 37, the internal configuration of the free space 410 is omitted. However, various illustrations, characters, figures, other symbols, and the like can be displayed within the free space 410.

Here, a method for generating the information code 400 will be described.

In the present configuration as well, a plurality of model numbers are provided for the type of information code 400. For each model number, the number of rows and the number of columns of cells, the shapes and positions of the specification patterns, the position of the format information, and the candidate positions of code words (addresses) are prescribed in advance. When the generation apparatus 2 generates the information code 400, model number information is arranged in a determined position (a reserved region 107 in the example in FIG. 37) within the code region.

Meanwhile, the reading apparatus 10 has the above-described information (the number of rows and the number of columns of cells, the shapes and positions of the specification patterns, the position of the format information, and the candidate positions of code words (addresses)) for each model number. Therefore, when the reading apparatus 10 reads the information code 400, the reading apparatus 10 analyzes the code image of the information code 400, and reads the model number information arranged in the predetermined position. As a result, the reading apparatus 10 can know the number of rows and the number of columns of cells, the shapes and positions of the specification patterns, the position of the format information, and the candidate positions of code words (addresses) in the information code 400

When the information code 400 is generated, any model number is selected from a plurality of model numbers provided in advance. As a result, the basic configuration (the positions of the position detection patterns 104 that serve as a specification pattern, the number of rows and the number of columns of cells, and the candidate positions for code words) within the code region is determined. For example, for the model number of the configuration shown in FIG. 37, the cell array consists of 29 rows and 29 columns.

A specification pattern (the position detection pattern 104) having the same structure as the finder pattern in the QR code (registered trademark) is disposed in three corner portions prescribed in advance. In a predetermined position near the position detection pattern 104, a region (predetermined position 105) in which format information is recorded is provided. In addition, in the matrix region composed of 29 rows and 29 columns, code word candidate positions are prescribed in advance in positions other than those of the position detection patterns 104 and the predetermined positions 105. An address from 0 to 67 is assigned to each candidate position.

The configuration within the code region is prescribed in advance by the configuration corresponding to the model number in this way. Therefore, when the model number is identified, the position in which a code word in the sequence is arranged can be identified. The information on the determined model number is recorded in a fixed position prescribed in advance in the array of the model number. For example, in the example in FIG. 37, the information on the model number is recorded in the region 107 specified by a predetermined type of shading.

After the model number is determined and the basic configuration within the code region is determined, the shape and position of the free space 410 is determined. Any method according to the above-described embodiments can be used as the method for determining the shape of the free space 410. For example, in a manner similar to the first method (fixed mode) according to the first embodiment, the shape may be determined by a method in which the shape is selected from a plurality of candidate shapes provided in advance.

Alternatively, in a manner similar to the second method (user mode) according to the first embodiment, the shape may be determined by a method in which the shape is set based on shape designation information inputted to the information code generation apparatus 2 from outside. In addition, the position of the free space 410 may be determined to be a fixed position determined in advance. Alternatively, the position of the free space 410 may be determined by the user inputting information that designates the position.

Then, after the free space 410 is determined, the information code 400 is generated that has a configuration in which the code words in the data recording region and the code words in the error correction code recording region are respectively arranged in code word candidate positions outside of the determined position of the free space 410. For example, for the model number of a configuration such as that in FIG. 37, the position detection patterns 104 are arranged in three corner positions. With reference to the positions of the position detection patterns 104, the candidate positions of 68 code words given the numbers 0 to 67 are prescribed in advance. In a layout such as this, when the free space 410 is determined as in FIG. 37, the code word candidate positions that are at least partially within the free space 410 are eliminated from arrangement target positions.

The code words are sequentially arranged such as to skip the eliminated code word positions. For example, in the example in FIG. 37, the free space 410 is set such as to be within the 50th, 51st, 53rd, 54th, and 60th to 67th code word candidate positions. Therefore, the code words are not arranged in the 50th, 51st, 53rd, 54th, and 60th to 67th code word candidate positions. That is, after the code words are arranged in sequence in the 0th to 49th positions, the 50th and 51st positions are skipped. A code word is arranged in the 52nd position thereafter. Then, the 53rd and 54th positions are skipped, and the code words are arranged in sequence in the 55th to 59th positions. As a result, the data code words that are the encoded data to be interpreted and the error correction code words that express the error correction codes can be arranged with certainty in the candidate positions outside of the free space 410.

After the specification pattern regions (the regions of the position detection patterns 104 and other specification patterns), the format region (the region of the predetermined position 105), the model number region 107, each code word region, and the like are determined in this way, the specific content of the free space 410 is determined. In the present configuration, when the information code generation apparatus 2 generates the information code word 400, the information code 400 is generated that has a configuration in which a differentiated display portion is provided in the boundary portion of the free space 410 or adjacent to the boundary portion.

The differentiated display portion has a display format differing from the display format of the cells in the data recording region. For example, in the example in FIG. 37, a differentiated display portion 420 is configured by a contour line 420a that has a predetermined line shape. The contour line 420a is configured, for example, as a line in a predetermined color that differs in at least any of hue, concentration, and luminance from the color of the cell 102. The line type is a publicly known line type, such as a solid line, a broken line, a single-dot chain line, or a double-dot chain line. Within the boundary portion clarified by the contour line 420a in this way, various designs, information, and the like can be displayed.

The method for arranging the data code words and the error correction code words, described above, can also be similarly applied to other embodiments. For example, the code words can be arranged by a similar method in the first embodiment as well. In this case, in the plurality of code word candidate positions prescribed in advance, the data code words may be arranged in sequence, from the address with the smallest number, in remaining code word candidate positions excluding the position of the free space determined by the method according to the first embodiment. The error correction code words may then be arranged thereafter. In the case according to the first embodiment, the position of the free space is recorded in the code as data. Therefore, as long as the position of the free space can be identified by the data, the positions of the code words can also be identified.

Next, reading of the information code 400 will be described.

When the reading apparatus 10 reads the information code 400 generated in this way, first, the reading apparatus 10 images the information code 400 with the light receiving sensor 23. In this example as well, the light receiving sensor 23 corresponds to an example of the imaging unit.

Then, the reading apparatus 10 extracts the code region from the captured image of the information code 400 that has been acquired and interprets the data in the data recording region. The method for extracting the code region from the captured image of the information code 400 is similar to reading of a publicly known QR code (registered trademark). After the regions of the three position detection patterns 104 are identified, the outer edge of the code region of which the position detection patterns 104 serve as corners is identified.

In addition, the timing pattern 106 is provided as a specification pattern. The number of rows and the number of columns can be identified from the array of the timing pattern 106. In addition, the model number can be known by reading of the region 107 prescribed in advance. As a result of the model number being known, the candidate position of each code word can be identified. In addition, as a result of the region of the predetermined position 105 being read, the format information can be known.

In this way, after recognizing the specification pattern regions, the format region, the model number region, and the code word candidate positions are identified, the reading apparatus 10 recognizes the free space 410. Specifically, the reading apparatus 10 detects the contour line 420a having the predetermined line shape from the captured image of the information code 400 imaged by the light receiving sensor 23 (imaging unit). For example, when the contour line 420 is composed of a predetermined color differing from the color of the cells 102, the reading apparatus 10 can detect the contour line 420a by extracting the area having the predetermined color.

The reading apparatus 10 recognizes the area within the contour line 420a detected in this way as the free space 410. In addition, when the contour line 420a is a line that has a concentration higher than that of the light colored cells and a concentration lower than that of the dark colored cells, a method may also be used in which an area having a luminance that is higher than a predetermined first threshold (a threshold differentiating between the luminance of the dark colored cells and the luminance of the contour line) and lower than a predetermined second threshold (a threshold differentiating between the luminance of the light colored cells and the luminance of the contour line) is detected.

After detecting the free space 410 in this way, the reading apparatus 10 identifies the candidate positions that remain after candidate positions that are within the position of the free space, among the code word candidate positions known through reading of the model number region, are eliminated. The reading apparatus 10 interprets the code words (data code words and error correction code words) that are arranged in the remaining candidate positions in sequence from that having the smallest number. In this way, the reading apparatus 10 can interpret the data recorded in the data recording region and also identify the position of the free space 410.

Fifth Embodiment

Next, a fifth embodiment will be described.

An information code usage system according to the fifth embodiment has the same hardware configuration as that according to the first embodiment. A configuration such as that in FIG. 1 and FIG. 2, described above, is used.

Figure 38:
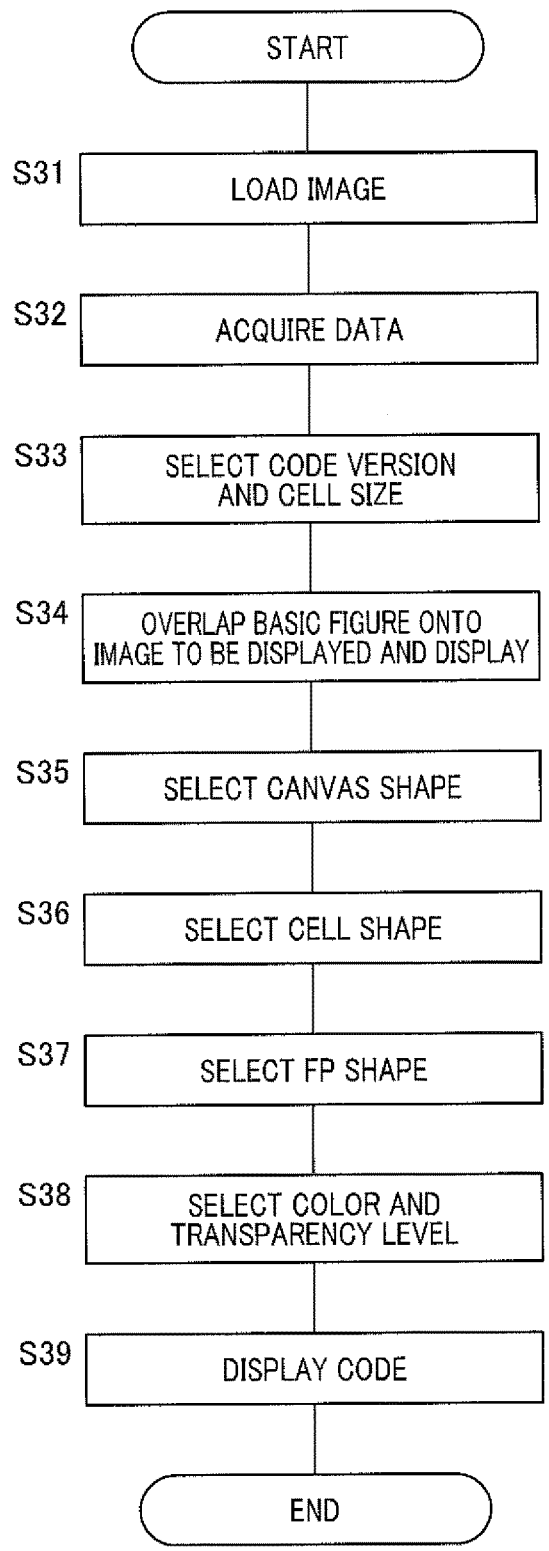
FIG. 38 is a flowchart exemplifying a flow of generation of an information code in the information code generation apparatus provided according to a fifth embodiment.

In the information code usage system according to the fifth embodiment, the information code generation method differs from that according to the first embodiment mainly in that the information code generating process is performed based on a flowchart in FIG. 38.

The information code generating process according to the present embodiment will be described in detail hereafter.

Figure 39:
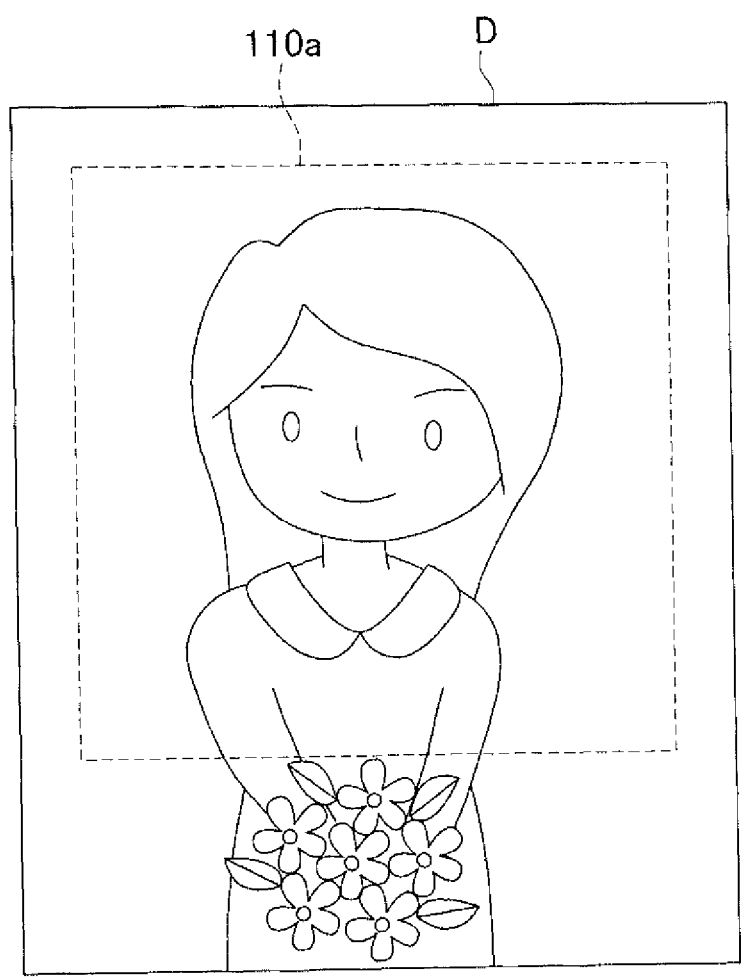
FIG. 39 is an explanatory diagram showing display of an image being displayed, which is taken by the information code generation apparatus in the fifth embodiment.

When the information code generation apparatus 2 starts the information code generating process, first, the information code generating apparatus 2 leads an image to be displayed (S31). In this process, the information code generating apparatus 2 displays an image to be displayed that is stored in the storage unit 5 in advance or is acquired from outside, on the display unit 6. In the process at S31, the information code generating apparatus 2 displays the image to be displayed D such as that in FIG. 39, for example, on the display unit 6. At this time, a frame 110a that corresponds to the outer edge portion of the free space 110 in the basic figure (information code 100) that is subsequently generated can be displayed on the display unit 6 together with the image to be displayed D.

As a result, a comparison can be easily made between the image to be displayed D before being overlapped with the basic figure and the image to be displayed D after being overlapped with the basic figure. Therefore, the user who has viewed the image to be displayed D and the frame 110a can input an instruction to change the position, size, and the like of the image to be displayed D in relation to the frame 110a, based on operation of the operating unit 4. The correspondence relationship between the image to be displayed D and the free space 110 can be more easily matched to the desires of the user.

Figure 40A:
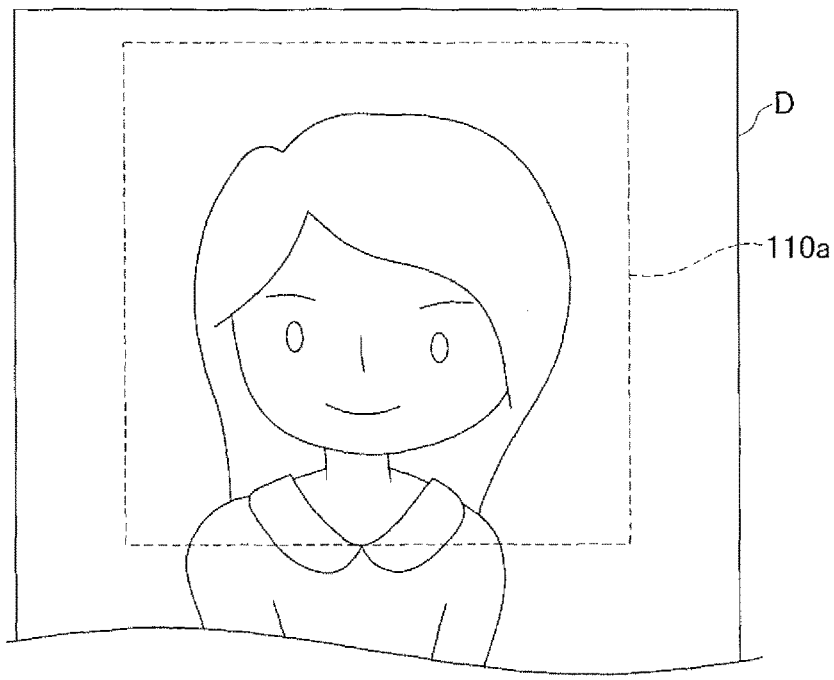
FIG. 40A is an explanatory diagram showing a display state where the image shown in FIG. 39 is displayed in an enlarged manner.
Figure 41A:
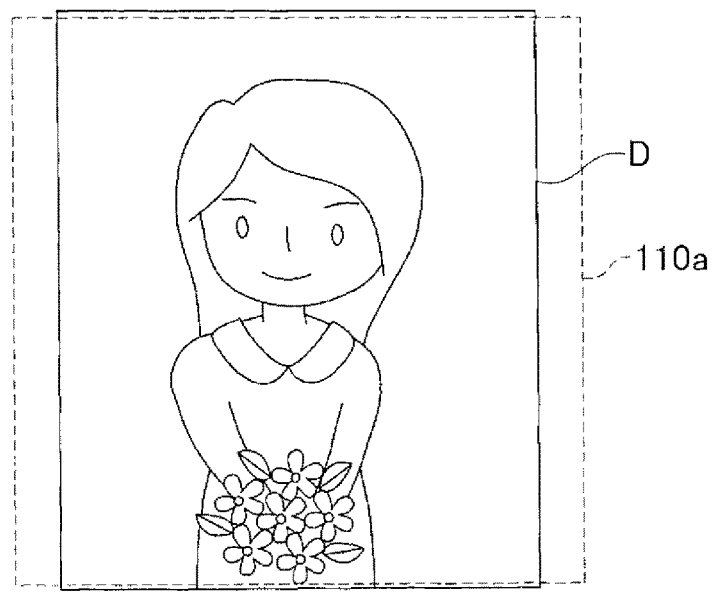
FIG. 41A is an explanatory diagram showing a display state where the image shown in FIG. 39 is displayed in a reduced manner.

For example, as shown in the example in FIG. 40A, the user can input an instruction to enlarge the image to be displayed D in relation to the frame 110a, based on operation of the operating unit 4. In addition, for example, as shown in the example in FIG. 41A, the user can input an instruction to reduce the image to be displayed D in relation to the frame 110a, based on operation of the operating unit 4. In the process at S31, a frame corresponding to the outer edge portion of the basic figure may be displayed on the display unit 6 together with the image to be displayed D.

The process at S31 corresponds to an example of the image acquiring process in which data of an image to be displayed, which is an image differing from the cells, is acquired. In addition, the control unit 3 that performs the process at S31 corresponds to an example of the image acquiring unit. The control unit 3 functions to acquire data of an image to be displayed, which is an image differing from the cells.

In addition, the process at S31 corresponds to the image acquiring step of acquiring data of an image to be displayed, which is an image differing from the cells. A program for performing the processes in FIG. 38 (a program stored in the storage unit 5 that is readable by the control unit 3 and enables the processes in FIG. 38 to be performed) functions to enable a computer (specifically, the control unit 3 of the generation apparatus 2) to perform the "image acquiring step" at S31.

After loading the image to be displayed at S31, the information code generating apparatus 2 acquires data to be encoded (data to be interpreted) from outside (S32). In the process at S32, in a manner similar to the process at above-described S1, for example, the information code generating apparatus 2 displays content such as that in FIG. 9 on the display unit 6, enabling the user to operate the operating unit 4 to input characters and the like in an input region. Then, when characters and the like are inputted in the input region by operation of the operating unit 4, the information code generating apparatus 2 acquires the inputted data as the "data to be interpreted".

The process at S32 corresponds to the data acquiring step of acquiring data to be interpreted. In addition, the process at S32 corresponds to an example of a data acquiring step of acquiring data to be interpreted. A program for performing the processes in FIG. 38 (a program stored in the storage unit 5 that is readable by the control unit 3 and enables the processes in FIG. 38 to be performed) functions to enable a computer (specifically, the control unit 3 of the generation apparatus 2) to perform the "data acquiring step of acquiring data to be interpreted" at S32.

After acquiring the input data (data to be interpreted) at S32, in a manner similar to the process at above-described S2, the information code generation apparatus 2 selects a code version (model version) and a cell size (S33). In addition, in the process at S33, the information code generation apparatus 2 generates a code to be recorded in the data recording region based on the input data (data to be interpreted) acquired at S32. Then, the information code generation apparatus 2 generates the basic figure of the information code 100 specified by the code version (model number) and cell size designated at S33, in a manner similar to the process at above-described S2.

After generating the basic figure of the information code 100 such as that in FIG. 10 in the process at S33, the information code generation apparatus 2 displays the code figure on the display unit 6 by displaying the basic figure of the information code 100 such as to overlap the image to be displayed D in a manner in which the outer edge portion of the free space 110 matches the frame 110a (S34: see FIG. 11). At this time, the information code generation apparatus 2 displays the area of the image to be displayed D within the frame 110a as the image display region and removes the area outside of the frame 110a.

Figure 40B:
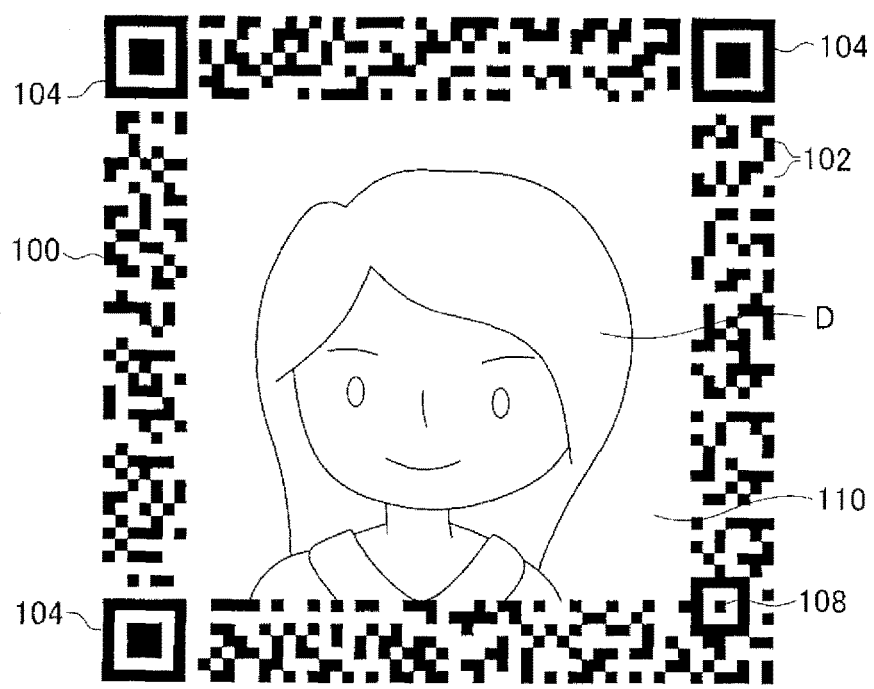
FIG. 40B is an explanatory diagram showing a display state where a basic figure is overlapped on the image shown by the image state of FIG. 40A.
Figure 41B:
FIG. 41B is an explanatory diagram showing a display state where a basic figure is overlapped on the image shown by the image state of FIG. 41A.

For example, as shown in the example in FIG. 40A, when the image to be displayed D is enlarged in relation to the frame 110a, as shown in the example in FIG. 40B, the information code generation apparatus 2 displays the code figure on the display unit 6 such that the basic figure of the information code 100 is displayed such as to overlap the image to be displayed D that is displayed in an enlarged state compared to that in FIG. 11. In addition, for example, as shown in the example in FIG. 41A, when the image to be displayed D is reduced in relation to the frame 110a, as shown in the example in FIG. 41B, the information code generation apparatus 2 displays the code figure on the display unit 6 such that the basic figure of the information code 100 is displayed such as to overlap the image to be displayed D that is displayed in a reduced state compared to that in FIG. 11.

After generating and displaying the code figure in the process at S34 in this way, the information code generation apparatus 2 receives changes to the arrangement (canvas shape) of the free space 110 in a manner similar to the process at above-described S4 (S35). Subsequently, in the processes at S36 to S38, the information code generation apparatus 2 performs processes similar to those at above-described S5 to S7. The information code generation apparatus 2 displays the ultimately generated information code 100 on the display unit (S39).

In this way, in the present configuration, after displaying the image to be displayed D on the display unit 6, the information code generation apparatus 2 displays the code figure on the display unit 6 by displaying the basic figure of the information code 100 such as to overlap the image to be displayed D that is displayed on the display unit 6. As a result, a comparison can be easily made between the image to be displayed D before being overlapped with the basic figure and the image to be displayed D after being overlapped with the basic figure. Therefore, the correspondence relationship between the image to be displayed D and the free space 110 (such as enlarged display (FIG. 40B) and reduced display (FIG. 41B)) can be more easily matched to the desires of the user.

OTHER EMBODIMENTS

The present invention is not limited to the embodiments described above and described in the drawings. For example, the following embodiments are also included within the technical scope of the present invention.

In the configuration in FIG. 1 and the like, an example is described in which the information code generation apparatus 2 and the information code reading apparatus 10 are configured as separate apparatuses. However, the information code generation apparatus 2 may be configured as the information code reading apparatus 10.

According to the above-described embodiments, an example in which the free space 110 is provided in the center portion of the code region is described. However, the arrangement of the free space 110 is not limited to this example. For example, in FIG. 1 and the like, a configuration in which a figure is added to the free space is indicated. However, various other designs can be used as long as the configuration is composed of a figure, pattern, color, or a combination thereof.

In addition, when information is displayed instead of a design or together with a design, the content of the information can vary. For example, the content of the information may be the name of a provider (such as a business owner or an individual) that provides the data recorded in the information code 100 or the address of a website of the provider. Alternatively, the content of the information may be a product name, a position name, or the like related to the data recorded in the information code 100.

According to the above-described embodiments, the QR code is given as an example of the other type of code. Specification patterns of the QR code are given as examples of the specification patterns used in the information code 100. However, two-dimensional codes of types other than the QR code may also be used. For example, the Data Matrix code may be used as the other type of code. The specification patterns used in the information code 100 may be the specification patterns of the data matrix code.

Figure 42:
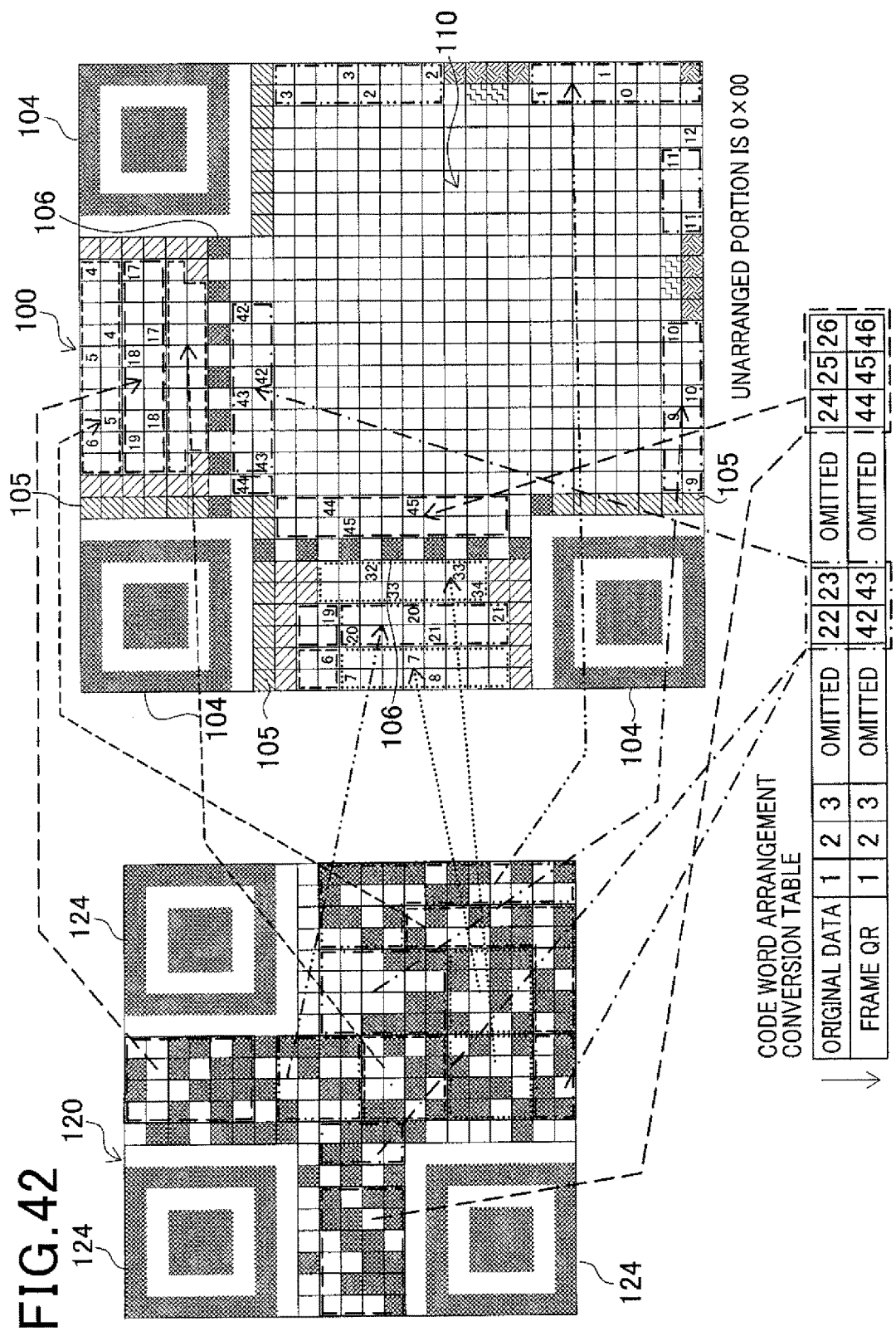
FIG. 42 is an explanatory diagram for describing a correspondence relationship between an arrangement of data words in the information code generated in the information code generation apparatus that configures the information code usage system of FIG. 1, and an arrangement of data words in another type of code, and is a diagram in which the correspondence relationship is changed to a different correspondence relationship from FIG. 5.

The correspondence relationship in the arrangement conversion table set as in FIG. 5 can be arbitrarily changed as in FIG. 42. For example, when the arrangement conversion table set as in FIG. 5 in the information code generation apparatus 2 and the information code reading apparatus 10 is changed as in FIG. 42, in the generated information code 100, the arrangement of the 22nd to 26th code words is changed from an arrangement (an arrangement in which the code words are recorded in the 22th to 26th arrangement candidate positions) such as that in the right-hand drawing in FIG. 5 to an arrangement (an arrangement in which the code words are recorded in the 42nd to 46th arrangement candidate positions) such as that in the right-hand drawing in FIG. 42.

As a result, the position and shape of the free space 110 also changes. That is, in this configuration, the position and shape of the free space 110 can be adjusted by the arrangement conversion table being adjusted. The free of freedom in the configuration of the free space can be further improved.

REFERENCE SIGNS LIST

1 information code usage system
2 information code generation apparatus
3 control unit (image acquiring unit, data acquiring unit, figure display control unit, input receiving unit, code generating unit, and code display control unit)
4 operating unit (input unit)
6 display unit
10 information code reading apparatus
100, 200, 300, 400 information code
102, 202, 303 cell
104, 204 position detection pattern (specification pattern)
106 timing pattern (specification pattern)
108 alignment pattern (specification pattern)
304*a* alignment pattern (specification pattern)
304*b* timing cell (specification pattern)
D image to be displayed

What is claimed is:

1. A method for generating an information code using an information code generation apparatus that includes a display and an input device, the method comprising:
   an image acquiring process, performed by a processor, of acquiring data indicative of an image to be displayed, the information code having a code region on a medium which carries the information code, the image being different from cells to be arranged in the code region, the cells each serving as a unit for displaying information in the code region of the information code;
   a data acquiring process, performed by the processor, of acquiring data to be encoded into the information by arranging the cells in the code region;
   a figure display process, performed by the processor, of displaying, on a display, a code figure configured to be provided with an image display region in which at least a portion of the image is presented;
   an input receiving process, performed by the processor, of receiving inputted information when, after the code figure is displayed on the display in the figure display process, information designating an arrangement content of the image display region is inputted through the input device;
   a code generating process, performed by the processor, of generating the information code in which:
      (i) the image display region is arranged based on the arrangement content indicated by the received inputted information in the input receiving process, the image display region not being error-corrected by error correction codes, at least part of the image display region being presented in the code region, and
      (ii) a specification pattern region, a data recording region, and an error correction code recording region are provided at a position in the information code, the position being other than the image display region in the information code, the specification pattern having a shape prescribed in advance, the data recording region having the information recorded by a plurality of types of the cells, the error correction code recording region having the error correction codes recorded by the cells; and a code display process, performed by the processor, of displaying the information code generated in the code generating process on the display.

2. The method according to claim 1, wherein:
in the figure display process, the code figure having a shape in which the specification pattern is provided and the image display region is provided in a position differing from that of the specification pattern is displayed on the display; and
after the code figure is displayed on the display in the figure display process, when an input to change the arrangement content of the image display region is received in the input receiving process, in the code generating process, the information code is generated that has a configuration in which a correspondence relationship between the specification pattern and the image display region in the code figure is changed based on the arrangement content received in the input receiving process.

3. The method according to claim 1, comprising:
a re-receiving process for receiving re-inputted information when, after the information code generated in the code generating process is displayed on the display in the code display process, a re-input of information designating the arrangement content of the image display region is performed once or a plurality of times through the input device;
a regenerating process for generating the information code again in a form in which the image display region is provided in an arrangement based on at least the newest re-inputted information and the specification pattern region and the data recording region are provided in positions other than that of the image display region, when the re-inputted information is received once or a plurality of times in the re-receiving process; and
a re-display process for displaying the generated information code on the display when the information code reflecting the newest re-inputted information is generated in the regenerating process.

4. The method according to claim 3, wherein:
in the regenerating process, each time the re-inputted information is received in the re-receiving process, the information code is regenerated in a form in which the image display region is provided in an arrangement based on the received re-inputted information, and the specification pattern region and the data recording region are provided in positions other than that of the image display region; and
in the re-display process, each time the information code reflecting the re-inputted information is regenerated in the regenerating process, the regenerated information code is displayed on the display.

5. The method according to claim 1, wherein:
in the figure display process, the code figure that is configured such that the cells are arranged adjacent to an outer edge portion of the image display region is displayed; and
after the code figure is displayed on the display in the figure display process, when input information that changes at least any of the shape and size of the outer edge portion of the image display region is received in the input receiving process, in the code generating process, the information code is generated that has a configuration in which the image display region is provided in a new arrangement based on at least either of the shape and size received in the input receiving process, and the cells are arrayed adjacent to the outer edge portion of the new image display region.

6. The method according to claim 1, wherein:
in the figure display process, the code figure that is configured such that the cells are arranged adjacent to an outer edge portion of the image display region is displayed; and
after the code figure is displayed on the display in the figure display process, when input information that changes a position of the outer edge portion of the image display region is received in the input receiving process, in the code generating process, the information code is generated that has a configuration in which the image display region is provided in a new arrangement based on the position received in the input receiving process, and the cells are arrayed adjacent to the outer edge portion of the new image display region.

7. The method according to claim 1, wherein:
in the figure display process, the code figure that is configured such that the cells are arranged adjacent to an outer edge portion of the image display region is displayed; and
after the code figure is displayed on the display in the figure display process, when input information that changes the rotation attitude of the outer edge portion of the image display region is received in the input receiving process, in the code generating process, the information code is generated that has a configuration in which the image display region is provided in a new arrangement based on the rotation attitude received in the input receiving process, and the cells are arrayed adjacent to the outer edge portion of the new image display region.

8. The method according to claim 1, wherein:
when data for a plurality of images to be displayed are acquired in the image acquiring process, in the figure display process, the code figure that is configured to be provided with the image display regions that respectively present, at least partially, the plurality of images to be displayed is able to be displayed on the display; and
after the code figure is displayed on the display in the figure display process, when an input for designating a correspondence relationship between the plurality of image display regions is received in the input receiving process, in the code generating process, the information code is generated that has a configuration in which the correspondence relationship between the plurality of image display regions is set based on the correspondence relationship received in the input receiving process.

9. The method according to claim 1, wherein:
in the figure display process, the code figure is displayed on the display, the code figure in which a basic figure that is provided with the specification pattern region, a cell array region in which a plurality of types of cells are arrayed in a position other than that of the specification pattern region, and a free space that differs from the specification pattern region and the cell array region is arranged, and the basic figure and the image to be displayed are overlapped such that at least a portion of the image to be displayed fits within the free space and an outer edge portion of the free space serves as an outer edge portion of the image display region; and
after the code figure including the image display region is displayed on the display in the figure display process, when an input to change the outer edge portion of the free space is inputted in the input receiving process, in the code generating process, the information code is generated that has a configuration in which a correspondence relationship between the image to be displayed and the free space in the code figure is changed based on the arrangement content received in the input receiving process.

10. The method according to claim 9, wherein:
in the figure display process, the code figure is displayed on the display such that, after the image to be displayed is displayed on the display, the basic figure is displayed such as to overlap the image to be displayed that is displayed on the display.

11. The method according to claim 1, wherein:
in the image acquiring process, the image to be displayed that has a predetermined outer edge shape, which is prescribed in advance or is designated by input via the input device, is acquired;
in the figure display process, the code figure that has a shape in which the specification pattern region is provided and the image display region having the predetermined outer edge shape is provided in a position other than that of the specification pattern region is displayed on the display; and
after the code figure including the image display region having the predetermined outer edge shape is displayed on the display in the figure display process, when an input to designate the arrangement content of the image display region having the predetermined outer edge shape is inputted in the input receiving process, in the code generating process, the information code is generated that has a configuration in which a correspondence relationship between the specification pattern and the image to be displayed in the code figure is changed based on the arrangement content received in the input receiving process.

12. The method according to claim 11, wherein:
in the figure display process, the code figure is displayed on the display, the code figure being configured such that the specification pattern region, the data recording region in which the data is recorded by a plurality of types of cells, and a free space that differs from the specification pattern region and the data recording region are provided, and the image display region having the predetermined outer edge shape is provided within the free space; and
after the code figure is displayed on the display in the figure display process, when an input to designate the arrangement content of the image display region is inputted in the input receiving process, in the code generating process, the information code is generated that has a configuration in which the arrangement of the image display region within the free space is changed based on the arrangement content received in the input receiving process and a plurality of types of cells are arrayed in positions in the free space other than that of the image display region after the change.

13. The method according to claim 1, wherein:
after the code figure is displayed on the display in the figure display process, when transparency level designation information that designates a transparency level is inputted through the input device, in the code generating process, the information code is generated that has a configuration in which the transparency level of at least either of the specification pattern arranged in the periphery of the image display region and the cells other than the specification pattern is set to the transparency level designated in the transparency level designation information.

14. The method according to claim 13, wherein:
after the code figure is displayed on the display in the figure display process, when the transparency level designation information that designates a transparency level in any position is inputted through the input device, in the code generating process, in the code generating process, the information code is generated that has a configuration in which the transparency level in the position designated in the transparency level designation information in the periphery of the image display region is set to the transparency level designated in the transparency level designation information.

15. The method according to claim 1, wherein:
after the code figure is displayed on the display in the figure display process, when color designation information that designates a color of the cells in any position is inputted through the input device, in the code generating process, the information code is generated that has a configuration in which the color of the cells in the position designated in the color designation information in the periphery of the image display region is set to the color designated in the color designation information.

16. The method according to claim 1, wherein:
after the code figure is displayed on the display in the figure display process, when shape designation information that designates a shape of the cells is inputted through the input device, in the code generating process, the information code is generated that has a configuration in which the shape of the cells arrayed in the periphery of the image display region is set to the shape designated in the shape designation information.

17. The method according to claim 1, wherein:
after the code figure is displayed on the display in the figure display process, when design designation information that designates at least any of a shape, pattern, and color of the specification pattern is inputted through the input device, in the code generating process, the information code is generated that has a configuration in which the design of the specification pattern region is set to the design designated in the design designation information.

18. A non-transitory computer readable medium storing instructions of a program to be executed by a processor, the instructions comprising:
acquiring data indicative of an image to be displayed, the information code having a code region on a medium which carries the information code, the image being differing from cells to be arranged in the code region, the cells each serving as a unit for displaying information in the code region of the information code;
acquiring data to be encoded into the information by arranging the cells in the code region;
displaying, on a display, a code figure that is configured to be provided with an image display region, which is a region in which at least a portion of the image is presented;
receiving inputted information when, after the code figure is displayed on the display at the figure display step, information designating an arrangement content of the image display region is inputted through the input device;
generating the information code in which:

(i) the image display region is arranged based on the arrangement content indicated by the received inputted information, the image display region not being error-corrected by error correction codes, at least part of the image display region being presented in the code region, and (ii) a specification pattern region, a data recording region, and an error correction code recording region are provided at a position in the information code, the position being other than the image display region in the information code, the specification pattern having a shape prescribed in advance, the data recording region having the information recorded by a plurality of types of the cells, the error correction code recording region having the error correction codes recorded by the cells; and displaying the generated information code on the display.

19. An information code generation apparatus comprising:

a display;
an input device; and
a processor programmed to:
acquire data indicative of an image to be displayed, the information code having a code region on a medium which carries the information code, the image being differing from cells to be arranged in the code region, the cells each serving as a unit for displaying information in the code region of the information code;
acquire data to be encoded into the information by arranging the cells in the code region;
display, on the display, a code figure configured to be provided with an image display region in which at least a portion of the image is presented;
receive inputted information when, after the code figure is displayed on the display in the figure display process, information designating an arrangement content of the image display region is inputted through the input device;
generate the information code in which:

(i) the image display region is arranged based on the arrangement content indicated by the received inputted information in the input receiving process, the image display region not being error-corrected by error correction codes, at least part of the image display region being presented in the code region, and (ii) a specification pattern region, a data recording region, and an error correction code recording region are provided at a position in the information code, the position being other than the image display region in the information code, the specification pattern having a shape prescribed in advance, the data recording region having the information recorded by a plurality of types of the cells, the error correction code recording region having the error correction codes recorded by the cells; and display the generated information code on the display.

20. The information code generation apparatus according to claim 19, wherein the processor is further configured to:

receive re-inputted information when, after the information code generated in the code generating process is displayed on the display in the code display process, a re-input of information designating the arrangement content of the image display region is performed once or a plurality of times through the input device;

generate the information code again in a form in which the image display region is provided in an arrangement based on at least the newest re-inputted information and the specification pattern region and the region to be interpreted are provided in positions other than that of the image display region, when the re-inputted information is received once or a plurality of times in the re-receiving process; and display the generated information code on the display when the information code reflecting the newest re-inputted information is generated in the regenerating process.

* * * * *